United States Patent
Saito et al.

(10) Patent No.: US 9,625,332 B2
(45) Date of Patent: Apr. 18, 2017

(54) TORQUE MEASUREMENT DEVICE-EQUIPPED ROTATION TRANSMISSION APPARATUS

(71) Applicant: NSK Ltd., Shinagawa-ku, Tokyo (JP)

(72) Inventors: Tomoharu Saito, Fujisawa (JP); Yasuyuki Matsuda, Fujisawa (JP); Daisuke Gunji, Fujisawa (JP); Masafumi Hikida, Fujisawa (JP); Kazutaka Tanaka, Fujisawa (JP); Tohru Ueda, Fujisawa (JP); Yuka Kaneko, Fujisawa (JP); Tetsu Takehara, Fujisawa (JP); Hiroyasu Yoshioka, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/916,668

(22) PCT Filed: Sep. 3, 2014

(86) PCT No.: PCT/JP2014/073245
§ 371 (c)(1),
(2) Date: Mar. 4, 2016

(87) PCT Pub. No.: WO2015/033976
PCT Pub. Date: Mar. 12, 2015

(65) Prior Publication Data
US 2016/0195442 A1 Jul. 7, 2016

(30) Foreign Application Priority Data

Sep. 4, 2013 (JP) ................................. 2013-183072
Oct. 10, 2013 (JP) ................................. 2013-212583
(Continued)

(51) Int. Cl.
*G01L 3/10* (2006.01)
*G01L 25/00* (2006.01)

(52) U.S. Cl.
CPC .............. G01L 3/104 (2013.01); G01L 3/109 (2013.01); *G01L 3/101* (2013.01); *G01L 25/003* (2013.01)

(58) Field of Classification Search
CPC ......... G01L 3/104; G01L 3/101; G01L 3/109; G01L 25/003; G01N 2291/2696
(Continued)

(56) References Cited

U.S. PATENT DOCUMENTS 4,686,510 A * 8/1987 Baker ..................... G01L 3/109
250/231.16
4,697,168 A * 9/1987 Baker ..................... G01L 3/109
341/15
(Continued)

FOREIGN PATENT DOCUMENTS

JP 01-254826 A 10/1989
JP 02-017311 Y2 5/1990
(Continued)

OTHER PUBLICATIONS

International Search Report from International Patent Application No. PCT/JP2014/073245, Sep. 30, 2014.

*Primary Examiner* — Max Noori
(74) *Attorney, Agent, or Firm* — Shapiro, Gabor and Rosenberger, PLLC

(57) ABSTRACT

In order to implement a structure capable of improving the resolution of torque measurement while preventing the plastic deformation of a torsion bar (15), an input-side stopper (61) having an uneven shape (gear shape) in the circumferential direction is provided in a portion of an input-side rotating body (55) that includes an input shaft (13) and an input gear (7), and an output-side stopper (63)
(Continued)

having an uneven shape (gear shape) in the circumferential direction is provided in a portion of an output-side rotating body (56) that includes an output shaft (14) and an output gear (8). The input-side stopper (61) and the output-side stopper (63) are combined so as to be engaged to be able to transmit torque only when the torsional angle within the elastic range of the torsion bar (15) reaches a predetermined amount.

8 Claims, 55 Drawing Sheets

(30) Foreign Application Priority Data

| | | |
|---|---|---|
| Oct. 29, 2013 | (JP) | 2013-224610 |
| Nov. 5, 2013 | (JP) | 2013-229682 |
| Nov. 6, 2013 | (JP) | 2013-229873 |
| Nov. 6, 2013 | (JP) | 2013-229952 |
| Nov. 7, 2013 | (JP) | 2013-231070 |
| Aug. 8, 2014 | (JP) | 2014-162281 |

(58) Field of Classification Search
USPC ............. 73/862.08, 862.325–862.326, 73/862.328–862.329
See application file for complete search history.

(56) References Cited

U.S. PATENT DOCUMENTS

| | | | | |
|---|---|---|---|---|
| 4,881,414 A | * | 11/1989 | Setaka | B62D 6/10 324/207.18 |
| 2005/0258824 A1 | * | 11/2005 | Uehira | B62D 6/10 324/207.25 |

FOREIGN PATENT DOCUMENTS

| | | |
|---|---|---|
| JP | 03-007797 Y2 | 2/1991 |
| JP | 07-018767 B2 | 3/1995 |

\* cited by examiner

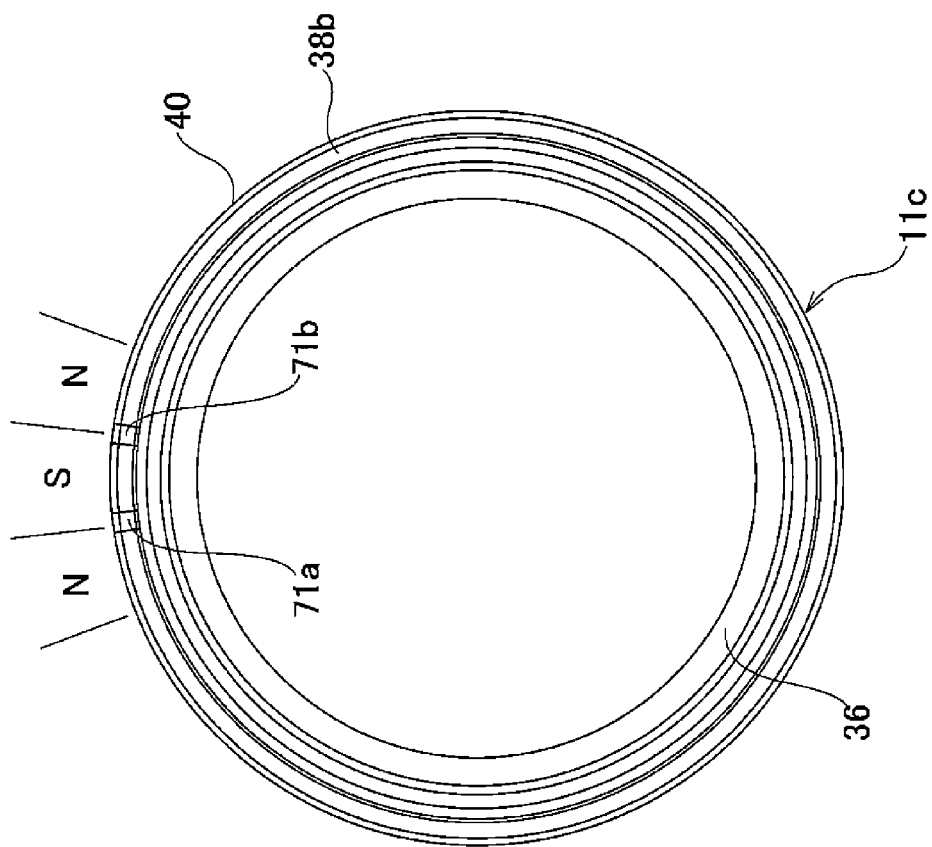
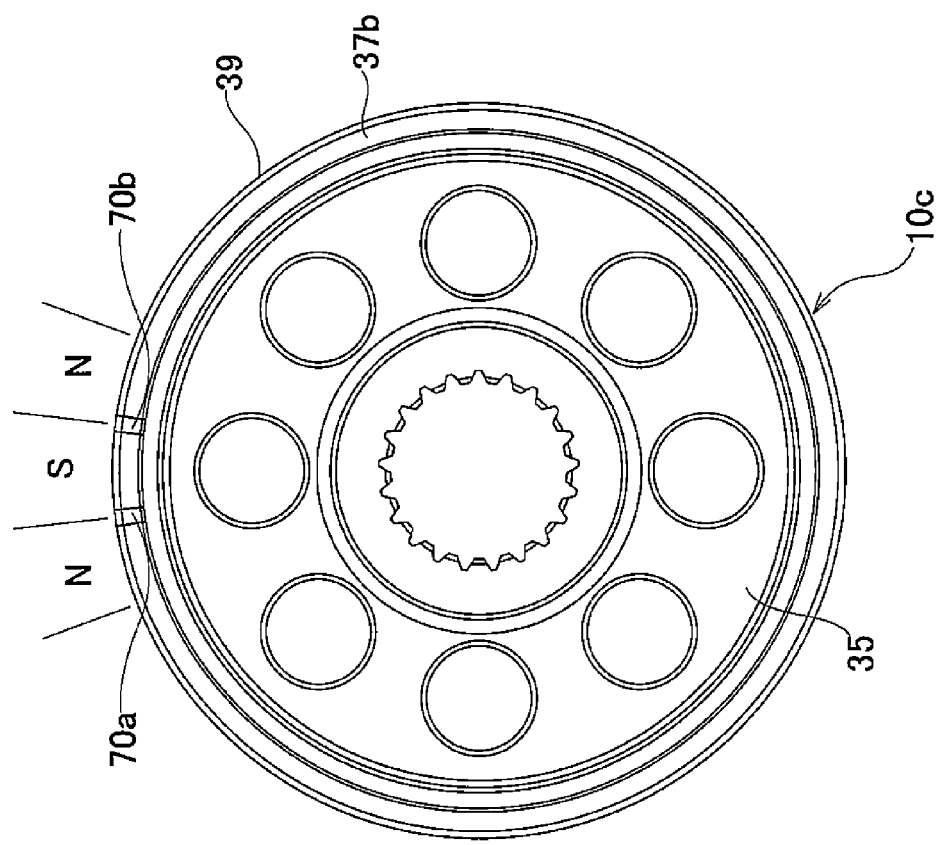
Fig. 13(A)
Fig. 13(B)

(A) When torque is not being transmitted (B) When torque is being transmitted

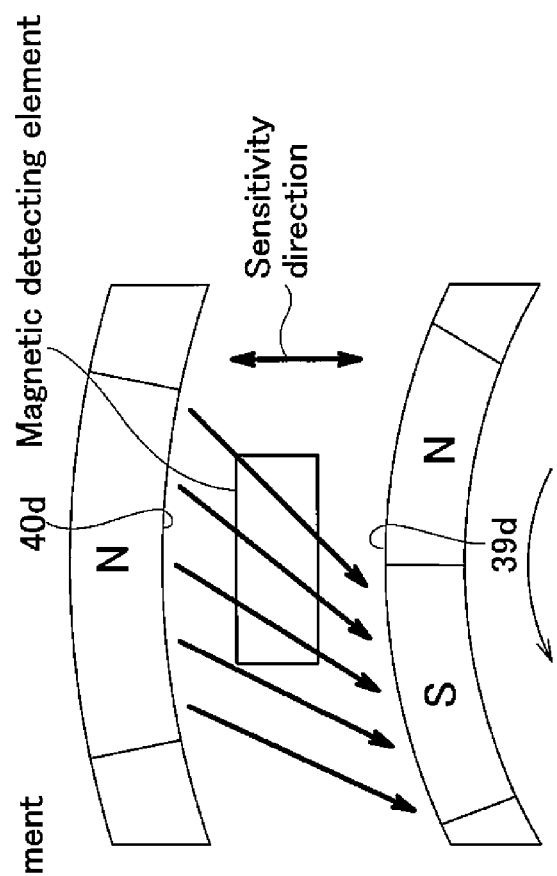
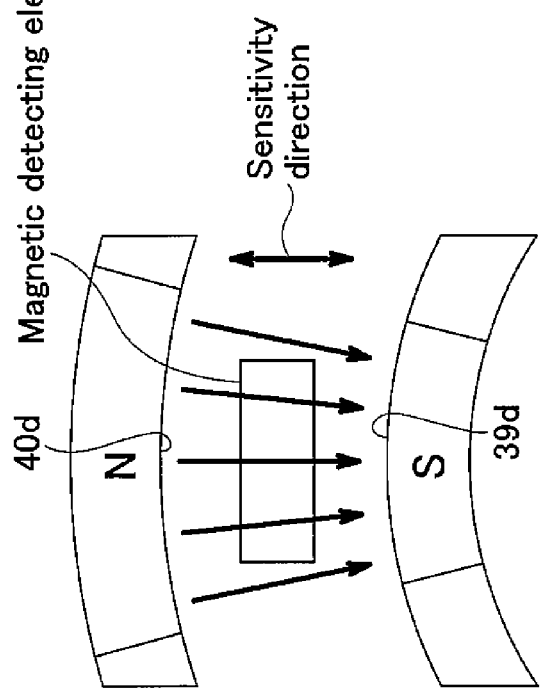

TORQUE MEASUREMENT DEVICE-EQUIPPED ROTATION TRANSMISSION APPARATUS

TECHNICAL FIELD

The present invention relates to a torque measurement device-equipped rotation transmission apparatus that is assembled in an automatic transmission of an automobile or the like, and is able to transmit torque by a rotating shaft as well as measure the torque that the rotating shaft transmits.

BACKGROUND ART

In order to adequately perform transmission control of an automatic transmission for an automobile, the rotational speed of a rotating shaft of the automatic transmission for an automobile, and the torque that is transmitted by that rotating shaft are measured, and the measurement results are used as information for transmission control. As a device for measuring this torque, JPH01254826 (A) discloses a device that converts the elastic torsional deformation amount of a rotating shaft that is transmitting torque to a phase difference between output signals of a pair of sensors, and measures the torque based on that phase difference.

FIG. 58 illustrates a first example of conventional construction of a device for measuring torque that is transmitted by a rotating shaft based on the phase difference between output signals from a pair of sensors. In this torque measurement device, a pair of encoders 2 is fitted and fastened to the outside of a rotating shaft 1 at two locations in the axial direction. The magnetic characteristics of the outer-circumferential surface of the pair of encoders 2, which are detected sections, change in an alternating manner in the circumferential direction and at a uniform pitch. The pitches at which the magnetic characteristics of the outer-circumferential surface of the pair of encoders change in the circumferential direction are the same as each other. A pair of sensors 3 is supported by a housing (not illustrated in the figure) in a state so that detecting sections of the sensors 3 face the outer-circumferential surfaces of the pair encoders 2. The sensors 3 change the output signals in correspondence to the change in the magnetic characteristics of the portions that the detecting sections face.

The output signals from the sensors 3 change periodically as the pair of encoders 2 rotate together with the rotating shaft 1. The frequency and period of the change of the output signal from the sensors 3 are values that correspond to the rotational speed of the rotating shaft 1. Therefore, the rotational speed of the rotating shaft 1 can be found based on the frequency or period of the change in the output signals from the sensors 3. As the rotating shaft 1 undergoes elastic torsional deformation as the rotating shaft 1 transmits torque, the encoders 2 move relatively to each other in the direction of rotation. As a result, the phase-difference ratio (=phase difference/1 period) between the output signals of the pair of sensors 3 changes. Here, the phase-difference ratio between the output signals from the pair of sensors 3 is a value that corresponds to the elastic torsional deformation amount of the rotating shaft 1. Therefore, the torque that is transmitted by the rotating shaft 1 can be found based on the phase-difference ratio between the output signals from the pair of sensors 3.

When this first example of conventional construction is applied to an automatic transmission for an automobile, there is a problem that, due to the high torsional rigidity of the rotating shaft 1, it is difficult to maintain a sufficient elastic torsional deformation amount of the rotating shaft 1, and thus the resolution of the torque measurement becomes low. Moreover, the pair of sensors 3 are located so as to be separated in the axial direction, so there are also problems in that it becomes difficult to arrange two harnesses 4 that run from the pair of sensors 3, and it becomes necessary to provide a pair of supporting and fastening members for supporting the sensors 3 in the housing with a highly precise relative positional relationship.

FIG. 59 illustrates a second example of conventional construction that is disclosed in JPH01254826 (A) in which, together with extending the detected sections of a pair of encoders 2a that are fastened at two locations in the axial direction of the rotating shaft 1 toward the center in the axial direction, the detecting sections of a pair of sensors of one sensor unit 5 that is arranged in the center in the axial direction of the rotating shaft 1 face detected sections of the pair of encoders 2a. However, when this second example of conventional construction is applied to an automatic transmission for an automobile, the torsional rigidity of the rotating shaft 1 is high, so it is not possible to eliminate the problems of not being able to maintain a sufficient elastic torsional deformation amount of the rotating shaft, and the resolution of the torque measurement becoming low.

JPH02017311(U) discloses construction in which a pair of rotating shafts with encoders fastened around the outer-circumferential surfaces are arranged on the same straight line, and the end sections of the pair of rotating shafts are connected to both end sections of a torsion bar that more easily undergoes elastic torsional deformation. In the case of the construction disclosed in JPH02017311 (U), the relative displacement amount in the direction of rotation of the pair of encoders is large, and it is possible to improve the resolution of the torque measurement by that amount. However, when this kind of construction is applied to a counter shaft of an automatic transmission for an automobile, sufficiently increasing the resolution of the torque measurement is difficult. In other words, an input gear and an output gear are fastened to two locations in the axial direction of the counter shaft, and the portion of the counter shaft that undergoes elastic torsional deformation during transmission of torque is only the portion that is between the input gear and the output gear. In this kind of construction, it is necessary to place a torsion bar between the input gear and the output gear, however, the space in the axial direction between the input gear and the output gear is small, so it is not possible to make the dimension in the axial direction of the torsion bar sufficiently long. Therefore, it is not possible to maintain a sufficient amount of elastic torsional deformation of the torsion bar that occurs when transmitting torque, and thus it becomes difficult to sufficiently improve the resolution of the torque measurement.

RELATED LITERATURE

[Patent Literature]
[Patent Literature 1] JPH01254826 (A)
[Patent Literature 2] JPH02017311 (U)

SUMMARY OF INVENTION

Problem to be Solved by Invention

Taking the situation described above into consideration, the object of the present invention is to achieve construction of a torque measurement device-equipped rotation transmission apparatus capable of measuring transmitted torque using a pair of encoders and one sensor unit, and to increase the resolution of the torque measurement regardless of how large or small the space in the axial direction between a pair of gear is.

Means for Solving Problems

The torque measurement device-equipped apparatus of the present invention includes a rotating-shaft unit, a connecting shaft, a first characteristic-changing member, a second characteristic-changing member, one sensor unit, a first stopper section, and a second stopper section.

The rotating-shaft unit includes: a first rotating body that includes a hollow first rotating shaft that is rotatably supported by a portion that does not rotate even during use, and a first gear that is provided around the outer-circumferential surface of the first rotating shaft; a second rotating body that includes a hollow second rotating shaft that is arranged concentrically with the first rotating shaft, and that is rotatably supported by the portion that does not rotate even during use, and a second gear that is provided around the outer-circumferential surface of the second rotating shaft; and a hollow torsion bar that is arranged on the inner-diameter side of the first rotating shaft and second rotating shaft concentrically with the first rotating shaft and second rotating shaft, and has one end section that is connected to the first rotating shaft so that relative rotation is not possible, another end section that is connected to the second rotating shaft so that relative rotation is not possible, and a middle section in the axial direction that undergoes elastic torsional deformation when torque is being transmitted, and has an axial dimension greater than the space in the axial direction between the first gear and the second gear.

The connecting shaft is arranged on the inner-diameter side of the torsion bar concentrically with the torsion bar, and has one end section that is connected to the first rotating shaft so that relative rotation is not possible, and another end section that protrudes in the axial direction from the second rotating shaft and the other end section of the torsion bar.

The first characteristic-changing member is fastened to the other end section of the connecting shaft concentrically with the connecting shaft, and has a circular ring shaped first detected section. The second characteristic-changing member is fastened to the distal end section of the second rotating shaft with respect to the first rotating shaft concentrically with the second rotating shaft, and has a circular ring shaped second detected section that is arranged so as to closely face the first detected section in the axial direction or radial direction. When the middle section in the axial direction of the torsion bar undergoes elastic torsional deformation when the rotating shaft unit transmits torque, the first characteristic-changing member and second characteristic-changing member move relatively to each other in the direction of rotation. More specifically, the first detected section and second detected section can be constructed so as to be adjacent in the axial direction or at least partially overlap in the radial direction, with both facing in the radial direction, or so as to be adjacent in the radial direction or at least partially overlap in the axial direction, with both facing in the axial direction.

The sensor unit is supported by the portion that does not rotate even during use, and generates an output signal that changes according to the rotation of the first detected section and second detected section. According to the change in the output signal from the sensor unit caused by the relative displacement of the first characteristic-changing member and second characteristic-changing member in the direction of rotation, it is possible to measure the torque that the rotating-shaft unit transmits. The change in the output of the sensor unit, more specifically includes the change in the phase difference between the two output signals when the sensor unit generates output signals that correspond to the first detected section and second detected section, or the change in the size of the output signal, change in the duty ratio, change in impedance and the like when the sensor unit generates one overall output signal.

The first stopper section is provided on part of the first rotating body. The second stopper section is provided on part of the second rotating body, and only when the torsional angle of the torsion bar that is within the elastic range reaches a specified amount, the second stopper section engages with the first stopper section so that torque can be transmitted.

Preferably, the outer-circumferential surface of the middle section in the axial direction of the connecting shaft is guided and supported by the inner-circumferential surface of the torsion bar.

Preferably, a sliding bearing is provided between the inner-circumferential surface of the other end section of the second rotating shaft and the outer-circumferential surface of the connecting shaft or fitting section of the first characteristic-changing member that fits with the connecting shaft.

Preferably, a rim section is provided around the outer-circumferential surface of the one end section of the connecting shaft, and by press-fitting (fitting and fastening with an interference fit) the rim with the inner-circumferential surface of the distal end section of the first rotating shaft with respect to the second rotating shaft, the connecting shaft is supported so that relative rotation with respect to the first rotating shaft is not possible.

Preferably, the second rotating shaft is rotatably supported with respect to the portion that does not rotate even during use by a rolling bearing that is provided between a portion of the outer-circumferential surface of the second rotating shaft that is near the distal end with respect to the first rotating shaft and the portion that does not rotate even during use; the sensor unit includes a sensor cover that is fastened to and supported by an end section of an outer ring of the rolling bearing that is on the distal end side of the second rotating shaft; and the first characteristic-changing member and second characteristic-changing member are arranged in a space inside the sensor cover. In this case, preferably a seal device is provided between a space where plural rolling bodies of the rolling bearing are provided and the space inside the sensor cover so as to separate these spaces.

Preferably, the second rotating shaft is rotatably supported with respect to the portion that does not rotate even during use by a rolling bearing that is provided between a portion of the outer-circumferential surface of the second rotating shaft that is near the distal end with respect to the first rotating shaft and the portion that does not rotate during use; and the second characteristic-changing member is fastened around the outside of an end section of an inner ring of the rolling bearing that is fastened around the outside of a portion near the distal end of the second rotating shaft that is on the distal end side of the second rotating shaft. In this case, more preferably, the second detected section of the second characteristic-changing member and at least one end section in the axial direction of the first detected section of the first characteristic are arranged on the outer-diameter side of the distal end section of the second rotating shaft or another component that is fastened around the outside of that distal end section in a position that overlaps in the radial direction the distal end of the second rotating shaft or the other component.

When implementing the present invention, it is possible for the first characteristic-changing member to be a first encoder of which the magnetic characteristics of the first detected section change in an alternating manner at a uniform pitch in the circumferential direction, and it is possible for the second characteristic-changing member to be a second encoder of which the magnetic characteristics of the second detected section change in an alternating manner at a uniform pitch in the circumferential direction. In this case, the sensor unit can include a first sensor having a detecting section that faces toward the first detected section and changing the output signal according to the change in magnetic characteristics of the first detected section, and a second sensor having a detecting section that faces toward the second detected section and changing the output signal according to the change in magnetic characteristics of the second detected section. Alternatively, the first encoder and second encoder can be arranged so that at least part overlap in the radial direction, and the sensor unit can be arranged in a center position in the radial direction between the first detected section and second detected section.

Alternatively, one of the first characteristic-changing member and second characteristic-changing member can include a torque-detection uneven member that is made of a magnetic material and has a detected section that is formed into an uneven shape in the circumferential direction, and the other of the first characteristic-changing member and second characteristic-changing member can include a torque-detection perforated member that is made of a nonmagnetic material having electrical conductivity, and has a detected section provided with plural holes that are uniformly spaced in the circumferential direction, and is arranged in a portion between the torque-detection uneven member and the sensor unit in a state so as to overlap in the radial direction with the detected section of the torque-detection uneven member. In this case, the sensor unit can include a coil sensor unit provided with coils as detecting sections, and changing the impedance according to the change in phase in the circumferential direction of the first detected section and second detected section.

When implementing the present invention, it is possible to provide regulating sections in positions in the radial direction of the first characteristic-changing member and second characteristic-changing member that are the same as each other with the center axes of the first characteristic-changing member and second characteristic-changing member aligned. When the first detected section and second detected section are constructed so that the magnetic characteristics change in an alternating manner at a uniform pitch in the circumferential direction, the regulating sections of either one of the first characteristic-changing member and second characteristic-changing member are preferably provided at two locations that are uniformly spaced in the circumferential direction by one magnetized pitch. In this case, preferably all of the regulating sections are formed at the magnetized boundaries.

When implementing the present invention, preferably a first male involute spline section is formed on the outer-circumferential surface of the one end of the torsion bar, a first female involute spline section is formed in a portion of the inner-circumferential surface of the first rotating shaft that faces the first male involute spline section, and the first male involute spline section and the first female involute spline section engage in an involute spline engagement; a second male involute spline section is formed on the outer-circumferential surface of the other end of the torsion bar, and a second female involute spline section is formed in a portion of the inner-circumferential surface of the second rotating shaft that faces the second male involute spline section, and the second male involute spline section and the second female involute spline section engage in an involute spline engagement.

In this case, more preferably, plating layers made of a metal that is softer than the metal of the first rotating shaft and the second rotating shaft are provided on the surface layer of the first male involute spline section and the surface layer of the second male involute spline section; and those plating layers are pressed and crushed in the circumferential direction between the tooth surfaces of the first involute spline section and the first female spline section, and between the tooth surfaces of the second involute spline section and second female spline section.

When implementing the present invention, construction is possible in which the first rotating shaft and second rotating shaft are supported by the portion that does not rotate even during using by rolling bearings. Moreover, in that case, the inner rings of the rolling bearings can be integrally formed with the first rotating shaft and second rotating shaft.

When implementing the present invention, the first characteristic-changing member and second characteristic-changing member can be made of a magnetic material, and the first detected section and the second detected section can have the same number of sections with material removed and solid sections that alternate at a uniform pitch in the circumferential direction, and are arranged so that when torque is not being transmitted, the phases in the circumferential direction are the same as each other; and at least part of the first detected section and second detected section overlap in the radial direction or axial direction. In this case, the combination of sections with material removed and the solid sections can be a combination of concave sections and convex sections, or a combination of notches and tongue pieces, or a combination of through holes and column sections, or the like.

In this case, as the sensor unit, it is possible to use a sensor unit that includes a stator made of a magnetic material, and plural coils that are formed using one conducting wire, and uses the output current or output voltage from the conducting wire with a driving voltage applied to the conducting wire as an output signal. The stator includes: plural core sections that are long in the direction of overlap of the first detected section and second detected section, and are arranged at a uniform pitch in the circumferential direction with the tip-end surfaces of each facing the first detected section and the second detected section from one side in the direction of overlap of the first detected section and second detected section; and a circular ring shaped rim that connects the base ends of these core sections. The coils are wound one at a time around each of the core sections, and the directions of the windings are opposite each other between coils that are adjacent in the circumferential direction.

Alternatively, the first characteristic-changing member and second characteristic-changing member can be made of a magnetic metal, and first detected section and the second detected section can have the same number of sections with material removed and solid sections (combination of concave sections and convex section, combination of notches and tongue pieces, combination of though holes and column sections, or the like) that alternate at a uniform pitch in the circumferential direction, and comb-tooth shaped, facing in opposite directions; and when torque is not being transmitted, are arranged so that the solid sections alternately enter into the opposing sections with material removed with gaps in between in the circumferential direction. In this case, the duty ratio of the output signal from the sensor unit changes according to the change in intervals of the gaps that changes according to the change in phase in the circumferential direction between the first detected section and the second detected section.

Effect of Invention

In the case of the torque measurement device-equipped rotation transmission apparatus of the present invention, the output signal from the sensor unit changes with corresponding to the rotational speed of the first characteristic-changing member and second characteristic-changing member (first detected section and second detected section) that rotate together with the first rotating shaft and second rotating shaft of the rotating-shaft unit. Therefore, when necessary, it is possible to measure the rotational speed based on the output signal from the sensor unit. Moreover, when torque is being transmitted between the first gear and the second gear by the rotating-shaft unit, the first gear and the second gear (first rotating shaft and second rotating shaft, first characteristic-changing member and second characteristic-changing member) move relatively to each other in the direction of rotation as the middle section in the axial direction of the torsion bar undergoes elastic torsional deformation. As a result of the relative displacement in the direction of rotation between the first characteristic-changing member and the second characteristic-changing member, the output signal from the sensor unit changes according to the amount of this relative displacement (size of the torque). Therefore, it is possible to measure the torque based on the output signal from the sensor unit.

Moreover, with the present invention, the torsion bar is located on the inner-diameter side of the first rotating shaft and second rotating shaft, and the dimensions in the axial direction of the torsion bar is greater than the space in the axial direction between the first gear and the second gear. Therefore, it is possible to sufficiently maintain the amount of elastic torsional deformation of part in the axial direction of the torsion bar that occurs when torque is being transmitted. As a result, differing from construction in which the rotating-shaft unit is constructed by one rotating shaft, it is possible to make the relative deformation amount in the direction of rotation between the first gear and the second gear that occurs when torque is being transmitted sufficiently large regardless of the size of the space in the axial direction between the first gear and the second gear. Therefore, it is possible to sufficiently improve the resolution of torque measurement.

Moreover, in the case of the present invention, by adjusting the dimensions in the radial direction and the dimensions in the axial direction of the middle section in the axial direction of the torsion bar in the design stage, it is possible to easily adjust the torsional rigidity of the middle section in the axial direction. Therefore, when compared with construction in which the rotating-shaft unit is constructed by one rotating shaft, it is possible to easily plan and design the relationship (gain) between the torque and the relative deformation amount in the direction of rotation between the first characteristic-changing member and second characteristic-changing member.

Moreover, in the case of the present invention, only one sensor unit is used, so there only needs to be one harness from this sensor unit, which makes it easier to place the harness. Moreover, the sensor unit only needs to be fastened to and supported by one place in a portion of the housing that does not rotate even during use, so it is possible to easily process that portion.

Furthermore, in the case of the present invention, when the torque that is transmitted between the first rotating body and the second rotating body increases, and the torsional angle that is within the elastic range of the torsion bar reaches a specified amount, a first stopper section and a second stopper section engage. Part of the torque is transmitted by way of the engagement section between the first stopper section and the second stopper section, and the remaining part of the torque is transmitted by way of the torsion bar. When the first stopper section and the second stopper section are engaged, the torsional angle of the torsion bar stops increasing. Therefore, the torsion bar is prevented from undergoing plastic deformation regardless of the size of the torque. Consequently, in the case of the present invention, it is not necessary to determine the torsional rigidity of this torsion bar in consideration of the plastic deformation of the torsion bar during operation. Therefore, when compared with construction in which a first stopper section and second stopper section are not provided, it is possible to improve the resolution of torque measurement until the first stopper section and second stopper section engage (in at least the area of low torque) due to reducing the torsional rigidity of the torsion bar.

BRIEF DESCRIPTION OF DRAWINGS

FIG. 13A and FIG. 13B illustrate a fifth example of an embodiment of the present invention, and are similar to FIG. 10A and FIG. 10B;

FIG. 36A is a schematic view of the twelfth example of an embodiment of the present invention, and illustrates the positional relationship between magnetic poles of a first detected section and a second detected section and a detecting section of a sensor in a state when torque is not being transmitted; and FIG. 36B is a schematic view illustrating that positional relationship in a state when torque is being transmitted;

MODES FOR CARRYING OUT INVENTION

First Example

Figure 1:
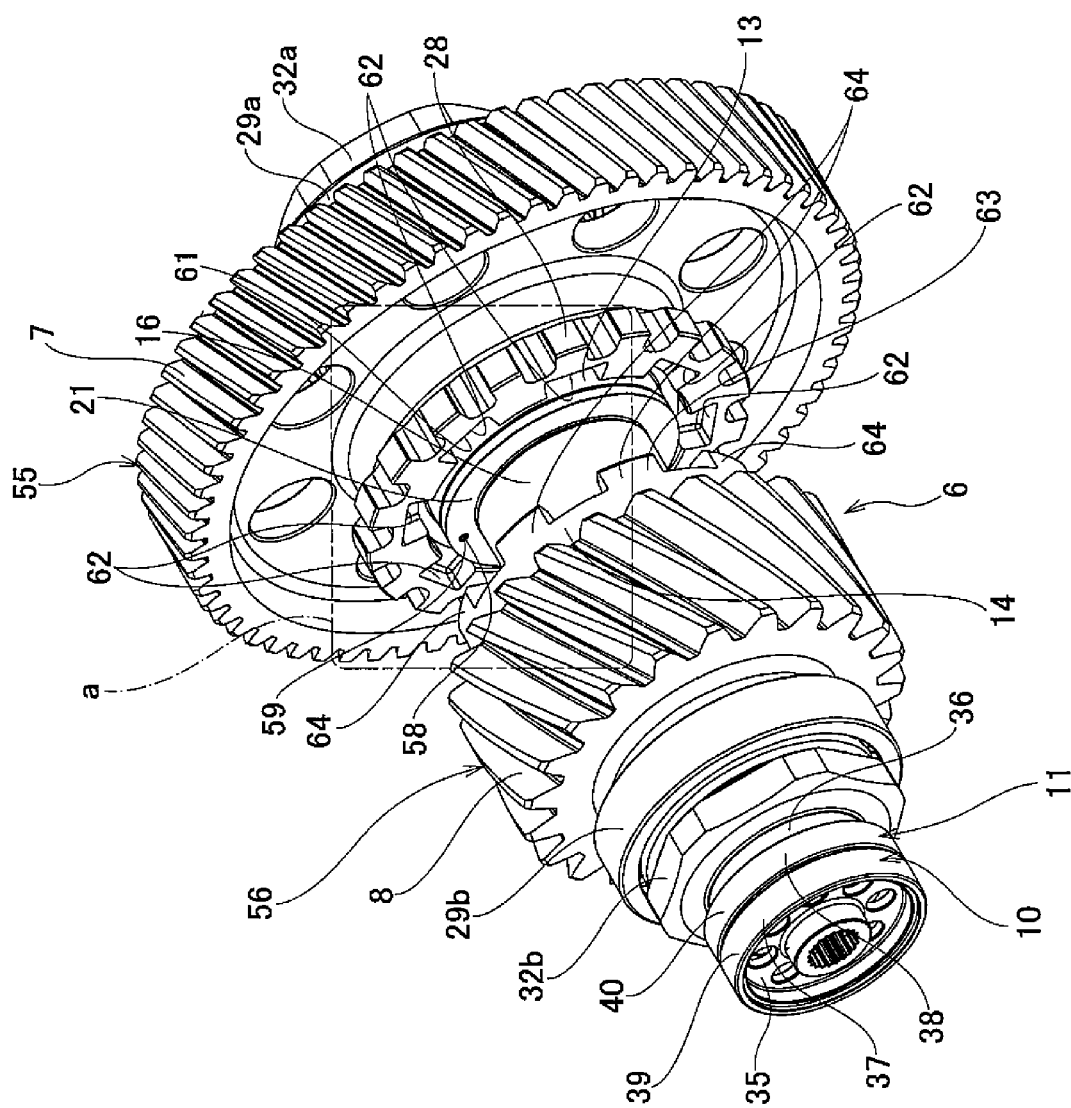
FIG. 1 is a perspective view illustrating a first example of an embodiment of the present invention with the housing and sensors omitted.
Figure 2:
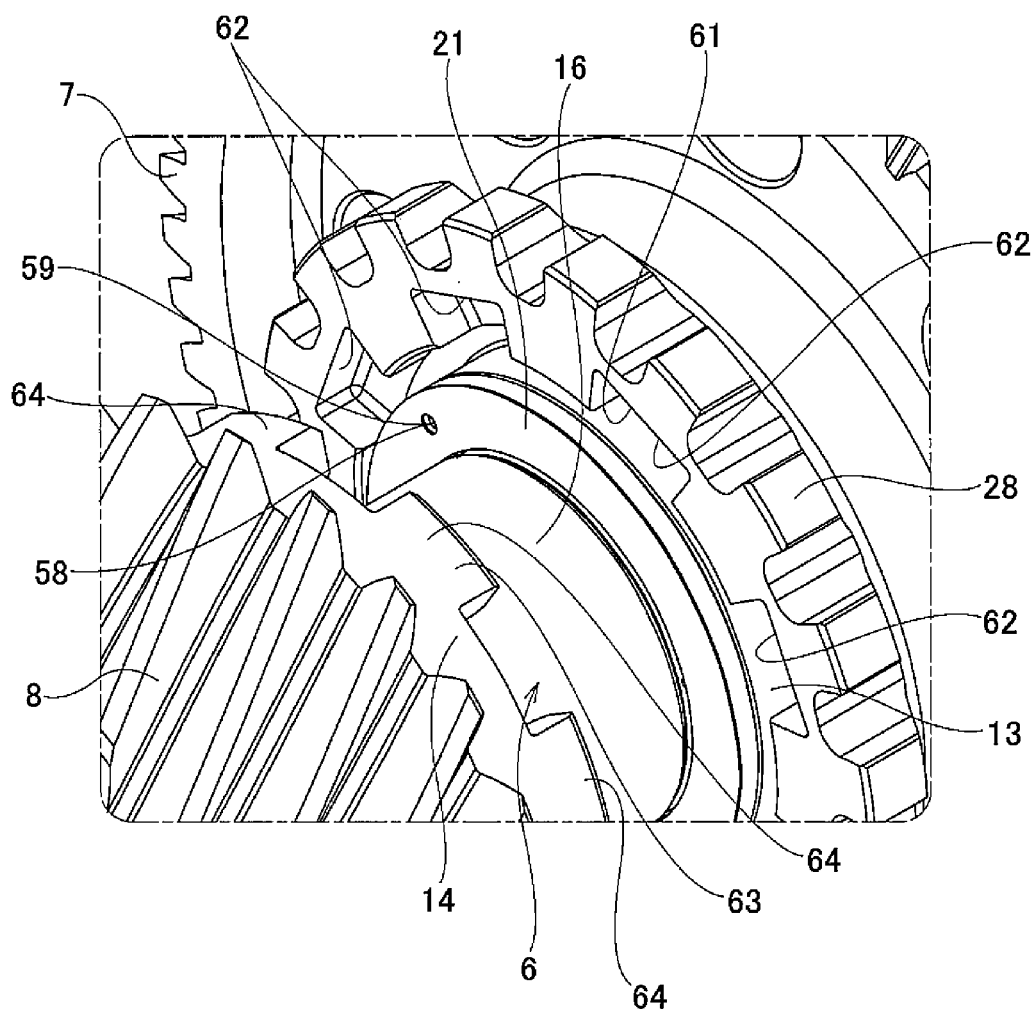
FIG. 2 is an enlarged view of part 'a' in FIG. 1.

FIG. 1 to FIG. 7 illustrate a first example of an embodiment of the present invention. The torque measurement device-equipped rotation transmission apparatus of this example is used by being assembled with the counter shaft and counter gear of an automatic transmission of an automobile in which a transverse engine is installed, such as a front-wheel drive vehicle or a four-wheel drive vehicle that uses a motor and transmission placement that is similar to that of a front-wheel drive vehicle. The torque measurement device-equipped rotation transmission apparatus of this example includes a rotating-shaft unit 6 that transmits torque, a connecting shaft 9, a first encoder 10 as a first characteristic-changing member, a second encoder 11 as a second characteristic-changing member, a sensor unit 12, an input-side stopper 61 as a first stopper section, and an output-side stopper 63 as a second stopper section. The rotating-shaft unit 6 includes: a hollow input shaft 13 as a first rotating shaft, and a hollow output shaft 14 as a second rotating shaft, each functioning together as a counter shaft; and an input gear 7 as a first gear that is provided around the outer-circumferential surface of the input shaft 13, and an output gear 8 as a second gear that is provided around the outer-circumferential surface of the output shaft 14, each functioning together as a counter gear. The input shaft 13 and output shaft 14 are each supported by a housing (not illustrated in the figures), which is a portion that does not rotate even during use.

The input shaft 13 and output shaft 14 of the rotating-shaft unit 6, a torsion bar 15 of the rotating-shaft unit 6, and the connecting shaft 9 are constructed so as to form a triple tube structure that overlaps in the radial direction. The input shaft 13 and output shaft 14 are both formed into a cylindrical shape using steel, and are arranged so as to be concentric with each other and so that one end sections (proximal ends) thereof are combined so as to be rotatable relative to each other. Only in the case of the input shaft 13 and output shaft 14, the one end sections thereof mean the end sections on the side close to each other (proximal ends), and the other end sections thereof means the ends on the sides far from each other (distal ends). In this example, the one end section of the input shaft 13 and the one end section of the output shaft 14 are combined so as to be rotatable relative to each other within a range of a specified angle (within a range of a specified angle in both the forward and backward direction based on a neutral state where there is no torsional deformation of the torsion bar 15). In order for this, an input-side-combining cylinder 16 having a relatively small diameter is provided on the one end section of the input shaft 13 as a first combining cylinder, and an output-side-combining cylinder 17 having a relatively large diameter is provided on the one end section of the output shaft 14 as a second combining cylinder, and the input-side combining cylinder 16 is inserted into the inner-diameter side of the output-side combining cylinder 17. A cylindrical shaped sleeve bearing 57 as a radial sliding bearing is placed in the space between the outer-circumferential surface of the input-side-combining cylinder 16 and the inner-circumferential surface of the output-side-combining cylinder 17. Moreover, an annular shaped thrust washer 21 as a thrust sliding bearing is held in the space between a stepped surface 19 that is provided around the base end of the outer-circumferential surface of the input-side-combining cylinder 16 and the tip-end surface 20 of the output-side-combining cylinder 17. The thrust washer 21 is fastened around the outside of the base end section of the input-side-combining cylinder 16 so that there is no large looseness in the radial direction, and as a result, the thrust washer 21 is positioned in the radial direction. Moreover, by a pin 58 that is installed on the stepped surface 19 engaging with an engagement hole 59 that is provided on a part of the thrust washer 21, the thrust washer 21 is positioned in the circumferential direction. With this kind of construction, the one end section of the input shaft 13 and the one end section of the output shaft 14 are combined so as to be rotatable relative to each other and so as to be prevented from displacement toward each other in the axial direction. In this example, an oil path 60 in the radial direction is formed in the base end section of the input-side-combining cylinder 16.

The torsion bar 15 is formed into a cylindrical shaft using a steel alloy such as carbon steel, and is placed in the inner-diameter side of the input shaft 13 and output shaft 14 so as to be concentric with the input shaft 13 and output shaft 14. One end section (right end section in FIG. 3) of the torsion bar 15 is connected to the input shaft 13 so that relative rotation is not possible, and the other end section (left end section in FIG. 3) of the torsion bar 15 is connected to the output shaft 14 so that relative rotation is not possible. In this example, the outer-diameter dimensions of the torsion bar 15 are such that both end sections (one end section and the other end section) are a little larger than the middle section, and the outer-circumferential surfaces of both end sections engage with the portion near the other end of the inner-circumferential surface of the input shaft 13 and the portion near the other end of the inner-circumferential surface of the output shaft 14. These engagements are achieved by involute spline engagements (connection between a male involute spline section and a female involute spline section with no looseness in the circumferential direction). In other words, by engaging a first male involute spline section 50 that is provided on the outer-circumferential surface of one end section of the torsion bar 15 as a first male spline section, with a first female involute spline section 51 that is provided on the inner-circumferential surface of the other half of the input shaft 13 as a first female spline section so that there is no looseness, an involute spline engagement section 24a is formed. Moreover, by engaging a second male involute spline section 52 that is provided on the outer-circumferential surface of other end section of the torsion bar 15 as a second male spline section, with a second female involute spline section 53 that is provided on the inner-circumferential surface of the other end section of the output shaft 14 as a second female spline section so that there is no looseness, an involute spline engagement section 24b is formed. As the engagement between both end sections of the torsion bar 15 and the input shaft 13 and output shaft 14, it is also possible to use an engagement having other rotation-preventing construction such as a key engagement and the like. In this example, a pair of retaining rings 25a, 25*b* that lock into the inner-circumferential surfaces of the input shaft 13 and output shaft 14 hold the torsion bar 15 on both sides in the axial direction, and this prevents displacement in the axial direction of the torsion bar 15. Moreover, the dimension L in the axial direction of the portion of the middle section in the axial direction of the torsion bar 15 that undergoes elastic torsional deformation when torque is being transmitted (portion that is held between the involute spline engagement sections 24*a*, 24*b*) is larger than the space W in the axial direction between the input gear 7 and the output gear 8 (L>W). In this example, L is about 3 to 4 times larger than W.

The input gear 7 is a helical gear that is formed using a steel alloy such as carbon steel, and is fitted and fastened around the outside of the middle section of the input shaft 13. The fitting section between the inner-circumferential surface of the input gear 7 and the outer-circumferential surface of the input shaft 13 is made by arranging in the axial direction a cylindrical fitting section 26*a* for maintaining concentricity (fitting section that is formed by press-fitting together the outer-diameter side cylindrical surface and the inner-diameter side cylindrical surface), and an involute spline engagement section 24*c* for preventing relative rotation. Positioning the input gear 7 in the axial direction with respect to the input shaft 13 is accomplished by bringing a portion near the inner circumference of one side surface of the input gear 7 (left side surface in FIG. 1 and FIG. 3) in contact with a stepped surface 27 that is formed on a portion near one end of the middle section of the outer-circumferential surface of the input shaft 13. In this example, a parking-lock gear 28 is integrally formed with the portion near the inner circumference of the one side surface of the input gear 7. When the parking lock is engaged, the tip-end section of a locking member (not illustrated in the figures) engages with a portion in the circumferential direction of the outer-circumferential surface of the parking-lock gear 28, which prevents rotation of the rotating-shaft unit 6. Moreover, the output gear 8 is a helical gear that is made using a steel alloy such as carbon steel, and is integrally formed with the output shaft 14 in a portion near one end of the middle section of the outer-circumferential surface of the output shaft 14. In this example, during forward rotation of the rotating-shaft unit 6 (rotation when the automobile is moving forward), torque that is inputted to the input shaft 13 from the input gear 7 is transmitted to the output shaft 14 by way of the torsion bar 15, and outputted from the output gear 8. At this time, the middle section in the axial direction of the torsion bar 15 undergoes elastic torsional deformation by an amount that corresponds to the size of the torque.

The rotating-shaft unit 6 is rotatably supported with respect to the housing by a pair of conical roller bearings 29*a*, 29*b* that are arranged so that the contact angles face opposite each other. The inner ring 30*a* of one of the conical roller bearings 29*a* is fastened around the outside of a portion near the other end of the input shaft 13 (portion near the distal end with respect to the output shaft 14). A spacer 31 is held between the end surface on the large-diameter side of the inner ring 30*a* and the other side surface of the input gear 7. A nut 32*a* is screwed onto the other end section of the outer-circumferential surface of the input shaft 13 and further tightened, and by pressing the end surface on the small-diameter side of the inner ring 30*a* with the nut 32*a*, the inner ring 30*a* and input gear 7 are connected and fastened to the input shaft 13. The inner ring 30*b* of the other conical roller bearing 29*b* is fastened around a portion near the other end of the output shaft 14 (portion near the distal end with respect to the input shaft 13), and the end surface on the large-diameter side of the inner ring 30*b* comes in contact with a stepped surface 33 that is formed on a portion near the other end of the outer-circumferential surface of the output shaft 14. A nut 32*b* is screwed onto the other end section of the outer-circumferential surface of the output shaft 14 and further tightened, and by pressing the end surface on the small-diameter side of the inner ring 30*b* with the nut 32*b*, the inner ring 30*b* is fastened to and supported by the output shaft 14.

In this example, the directions of inclination of the teeth of the input gear 7 and output gear 8, which are both helical gears, are regulated so that when the input gear 7 and output gear 8 are rotating in the forward direction (when the rotating-shaft unit 6 is rotating in the forward direction), the gear reaction forces in the axial direction that act on the input gear 7 and output gear 8 are in a direction toward each other (press against each other). With this kind of construction, when the input gear 7 and output gear 8 are rotating in the forward direction, at least part of the gear reaction forces in the axial direction that act on the input gear 7 and output gear 8 cancel each other out. In other words, when the input gear 7 and output gear 8 are rotating in the forward direction, the axial loads that are applied to the conical roller bearings 29*a*, 29*b* are suppressed, and the friction loss (dynamic torque) of the conical roller bearings 29*a*, 29*b* is suppressed by that amount.

The connecting shaft 9 is arranged on the inner-diameter side of the torsion bar 15 concentrically with the torsion bar 15. One end section (right end section in FIG. 3) of the connecting shaft 9 is connected to the input shaft 13 so that relative rotation is not possible, and the other end section (left end section in FIG. 3) protrudes from the opening on the other end of the output shaft 14. In order to connect the one end section of the connecting shaft 9 so as not to be able to rotate relative to the input shaft 13, the one end section of the connecting shaft 9 protrudes from the opening on one end of the torsion bar 15, and an outward-facing flange-shaped rim section 34 is formed around the outer-circumferential surface of the protruding section. The outer-circumferential surface of the rim section 34 engages with the inner-circumferential surface of the input shaft 13 so that relative rotation is not possible. More specifically, the engagement section between the outer-circumferential surface of the rim section 34 and the inner-circumferential surface of the input shaft 13 is formed by an involute spline engagement section 24*d*. It is also possible to use engagement construction having other rotation-prevention construction such as a key engagement as this engagement construction. By holding the rim section 34 on both sides in the axial direction by retaining rings 25*a*, 25*c* that are locked to the inner-circumferential surface of the input shaft 13, the connecting shaft 9 is prevented from displacement in the axial direction. The female involute spline sections of the involute spline engagement sections 24*a*, 24*b* that are provided on the one end section of the torsion bar 15 and the one end section of the connecting shaft 9 are provided on the other half of the inner-circumferential surface of the input shaft 13 so as to be continuous with each other, and are the same as each other. In other words, in this example, the first involute spline section 51 is also used as these female involute spline sections.

The first encoder 10 is fastened around the outside of the other end section of the connecting shaft 9 so as to be concentric with the connecting shaft 9. In other words, the first encoder 10 is fastened to and supported by the input shaft 13 by way of the connecting shaft 9. Therefore, the first encoder 10 is able to rotate in synchronization with the input shaft 13. Moreover, the second encoder 11 is fastened around the outside of the other end section of the output shaft 14 so as to be concentric with the output shaft 14. Therefore, the second encoder 11 is able to rotate in synchronization with the output shaft 14.

Figure 6:
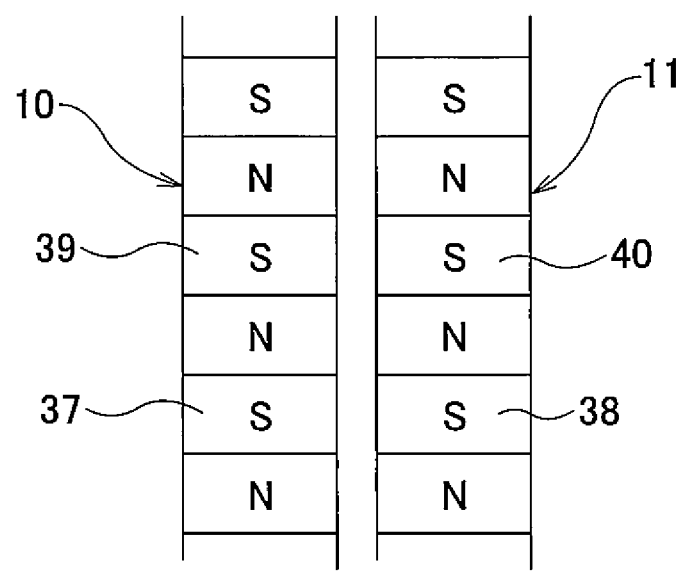
FIG. 6 is a view of the first example of an embodiment of the present invention, and illustrates a portion in the circumferential direction of a first detected section of a first encoder and a second detected section of a second encoder thereof as seen from the outer-diameter side.

The first encoder 10 and second encoder 11 each include an annular shaped metal core 35 (36) made of a magnetic metal that is fastened around the outside of the other end section of the connecting shaft 9 or the other end section of the output shaft 14, and a cylindrical shaped permanent magnet 37 (38) that is fastened around the outer-circumferential surface of a cylindrical section that exists on the outer-circumferential portion of the metal core 35 (36). The outer-circumferential surface of the permanent magnet 37 of the first encoder 10 forms a first detected section 39, and the outer-circumferential surface of the permanent magnet 38 of the second encoder 11 forms a second detected section 40. The first detected section 39 and the second detected section 40 have the same diameter, are concentric with each other and are arranged so as to be adjacent to each other in the axial direction. The space between the first detected section 39 and the second detected section 40 is preferably 10 mm or less, and more preferably 5 mm or less. As illustrated in FIG. 6, S poles and N poles are arranged in an alternating manner and at a uniform pitch in the circumferential direction on the first detected section 39 and second detected section 40. The total number of magnetic poles (S poles and N poles) of the first detected section 39 and second detected section 40 are the same as each other. Moreover, in this example, when torque is not being transmitted, or in other words, when the torsion bar 15 is not undergoing elastic torsional deformation, the first detected section 39 and the second detected section 40 have not been displaced in the direction of rotation relative to each other, and as illustrated in FIG. 6, the phases in the circumferential direction of the magnetic poles of the first detected section 39 and the second detected section 40 coincide with each other. That is, the same poles of the first detected section 39 and the second detected section 40 are arranged so as to be adjacent to each other in the axial direction. In this example, the fitting section between the inner-circumferential surface of the metal core 35 of the first encoder 10 and the outer-circumferential surface of the other end section of the connecting shaft 9 is formed by arranging a cylindrical surface fitting section 26b for maintaining concentricity and an involute spline engagement section 24e for preventing relative rotation so as to be aligned with each other in the axial direction. Moreover, the metal core 35 is prevented from coming out by a retaining ring 25d that is locked to the outer-circumferential surface on the other end section of the connecting shaft 9. On the other hand, the metal core 36 of the second encoder 11 is fastened around the outside of the other end section of the output shaft 14 with an interference fit.

Figure 7:
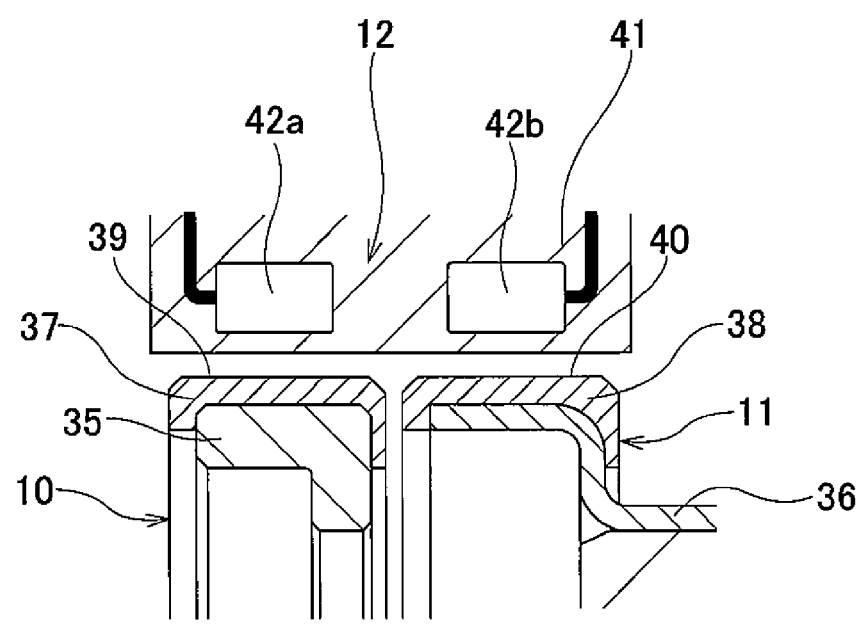
FIG. 7 is an enlarged cross-sectional view of the first example of an embodiment of the present invention, and illustrates a part where a sensor unit faces the first encoder and the second encoder.

The sensor unit 12 includes a synthetic resin holder 41, and a first sensor 42a and second sensor 42b that are embedded in the tip end section of the holder 41. A magnetic detecting element such as a Hall element, Hall IC, MR element, GMR element or the like is assembled in the detecting sections of the first sensor 42a and second sensor 42b. The sensor unit 12 is supported by the housing so that the detecting section of the first sensor 42a closely faces the first detected section 39, and the detecting section of the second sensor 42b closely faces the second detected section 40. Particularly, in this example, as illustrated in FIG. 7, the first sensor 42a and the second sensor 42b are arranged so as to face in the opposite direction of each other so that the detecting sections of the sensors 42a, 42b face the same position in the circumferential direction of the first detected section 39 and second detected section 40. As a result, the sensor unit 12 is constructed such that, in a rotating state when the transmitted torque is zero, the phase difference between the output signal from the first sensor 42a and the output signal from the second sensor 42b is 180 degrees (phase difference ratio is 0.5).

In this example, an input-side stopper 61 that has an uneven shape (gear shape) in the circumferential direction is provided as a first stopper section in a portion on the inner-diameter side of the parking-lock gear 28 that is integrally formed with the input gear 7. The input-side stopper 61 is formed by providing plural concave sections 62 that are open and that are uniformly spaced in the circumferential direction on one end surface (left end surface in FIG. 1 and FIG. 3) and the inner-circumferential surface of the parking-lock gear 28. On the other hand, an output-side stopper 63 that has an uneven shape (gear shape) in the circumferential direction is provided as a second stopper section in a portion on the outer-diameter side of one end section (right end section in FIG. 1 and FIG. 3) of the output shaft 14. The output-side stopper 63 is formed by providing plural (same number as concave sections 62) convex sections 64 that that are uniformly spaced in the circumferential direction, and that protrude in the axial direction from a portion on the outer-diameter side of the one end surface of the output shaft 14.

The input-side stopper 61 and the output-side stopper 63 engage so that relative rotation within a range of a specified angle (within a range of a specified angle in the forward and backward direction based on a neutral state in which the torsion bar 15 has not undergone any torsional deformation) is possible. In other words, by the convex sections 64 of the output-side stopper 63 loosely engaging with the concave sections 62 of the input-side stopper 61 so that there is a gap in the circumferential direction, relative rotation between the input-side rotating body 55 that includes the input-side gear 7 and input shaft 13 and the output-side rotating body 56 that includes the output shaft 14 and output gear 8 is regulated to be within a range of a specified angle. This range of specified angle is made to be within the elastic range in which the torsion bar 15 can undergo torsional deformation.

In this example, an oil-inlet path 43 that is open on the one end surface of the connecting shaft 9 is provided in the center section in the radial direction of the connecting shaft 9, and lubrication oil that is put into this oil-inlet path is able to be supplied to the pair of conical roller bearings 29a, 29b. More specifically, oil paths 44a, 44b are provided in portions near both ends of the connecting shaft 9, torsion bar 15, input shaft 13 and output shaft 14, and the oil paths 44a, 44b connect the portions near both ends of the oil-inlet path 43 and minute ring-shaped spaces 45a, 45b that exist on the inner-diameter side of the end on the small-diameter side of the inner rings 30a, 30b of the pair of conical roller bearings 29a, 29b. Moreover, oil grooves 46a, 46b are formed along the radial direction in one or plural locations in the circumferential direction of the tip-end surfaces of the nuts 32a, 32b. With this kind of construction, lubrication oil that is put into the oil-inlet path 43 from the opening on the end of the oil-inlet path is able to be supplied to the inside of the pair of conical roller bearings 29a, 29b by way of the oil paths 44a, 44b, ring-shaped spaces 45a, 45b and oil grooves 46a, 46b.

In this example, part of the lubrication oil that is fed into the oil paths 44a, 44b is fed from the middle sections of the oil paths 44a, 44b and through the gaps that exist in the involute space engagement sections 24a, 24b to the inside of a cylindrical-shaped space 47 that exists between the outer-circumferential surface of the middle section of the torsion bar 15 and the inner-circumferential surfaces of the middle sections of the input shaft 13 and output shaft 14. The lubrication oil that is fed to the inside of the cylindrical-shaped space 47 is then supplied through an oil path 60 and gap that exists between the tip-end surface of the input-side combining cylinder section 16 and the stepped surface 49 that exists at the base end of the inner-circumferential surface of the output-side combining cylinder 17 to the area where the sleeve bearing 57 is installed and the area where the thrust washer 21 is held, and lubricates this installation area and held area. With this kind of construction, it is possible to efficiently supply lubrication oils to the area where the sleeve bearing 57 is installed and the area where the thrust washer 21 is held, which improves the lubricated state of this installation area and held area.

Moreover, in this example, lubrication oil that is fed into the oil paths 44a, 44b is fed from the middle sections of the oil paths 44a, 44b to the inside of a minute gap (cylindrical-shaped gap that has a width in the radial direction of about 0.2 mm) that exists between the inner-circumferential surface of the torsion bar 15 and the outer-circumferential surface of the connecting shaft 9. Particularly, in this example, in order that feeding lubrication oil to the inside of this minute gap is performed smoothly, concave grooves 54a, 54b are provided around the entire circumference of a portion of the outer-circumferential surface of the connecting shaft 9 that is aligned in the axial direction with the oil paths 44a, 44b. During operation, lubrication oil that is filled into this minute gap functions as a film damper that dampens small vibrations of the connecting shaft 9.

In the case of the torque measurement device-equipped rotation transmission apparatus of this example, the output signals from the first sensor 42a and the second sensor 42b of the sensor unit 12 periodically change as the first encoder 10 and second encoder 11 rotate together with the rotating-shaft unit 6 (input shaft 13 and output shaft 14). The frequency and period at which the output signals of the first sensor 42a and second sensor 42b change are values that correspond to the rotational speed of the rotating-shaft unit 6. Therefore, by investigating beforehand the relationship between the frequency or period and the rotational speed, the rotational speed of the rotating-shaft unit 6 can be found based on the frequency or period. Moreover, when transmitting torque between the input gear 7 and output gear 8 by the rotating-shaft unit 6, the input gear 7 and output gear 8, and the first encoder 10 and second encoder 11 are displaced relative to each other in the direction of rotation as the middle section in the axial direction of the torsion bar 15 undergoes elastic torsional deformation. Then, as a result of the relative displacement in the direction of rotation between the first encoder 10 and the second encoder 11, the phase-difference ratio (=phase difference/one period) between the output signal of the first sensor 42a and the output signal of the second sensor 42b changes. Here, this phase-difference ratio is a value that corresponds to the torque that is transmitted by the rotating-shaft unit 6. Therefore, by investigating beforehand the relationship between the phase-difference ratio and the torque, the torque that is transmitted by the rotating-shaft unit 6 can be found based on this phase-difference ratio.

Particularly, in this example, the input shaft 13 and output shaft 14 are constructed to be hollow, and the torsion bar 15 is arranged on the inner-diameter sides of the input shaft 13 and output shaft 14. With this construction, it is possible for the length L in the axial direction of the middle section in the axial direction of the torsion bar 15 to be greater than the space W in the axial direction between the input gear 7 and the output gear 8 (L>W). Moreover, the torque that is inputted to the input gear 7 is obtained from the output gear 8 by way of the involute spline engagement section 24c→input shaft 13→involute spline engagement section 24a→torsion bar 15→involute spline engagement section 24b, in that order. In other words, when compared with when a torsion bar is placed between an input shaft and an output shaft, it is possible to lengthen the transmission path for torque between the input gear 7 and output gear 8. Therefore, it is possible to maintain a sufficient amount of elastic torsional deformation of the middle section in the axial direction of the torsion bar 15 that occurs when torque is being transmitted. As a result, in this example, differing from construction in which the rotating-shaft unit 6 is constructed by only one rotating shaft, it is possible to make the amount of relative displacement in the direction of rotation between the input gear 7 and the output gear 8, between the input shaft 13 and output shaft 14, and between the first encoder 10 and second encoder 11 that occurs when torque is being transmitted sufficiently large regardless of the size of the space W in the axial direction between the input gear 7 and output gear 8. Therefore, it is possible to sufficiently increase the resolution of torque measurement. Moreover, by adjusting the dimension in the radial direction and the dimension in the axial direction of the middle section in the axial direction of the torsion bar 15 in the design stage, it is possible to easily adjust the torsional rigidity of that middle section in the axial direction. Therefore, when compared with construction in which the rotating-shaft unit 6 is constructed by only one rotating shaft, it is possible to easily design the relationship (gain) between the torque and amount of relative displacement in the direction of rotation to a desired value.

Furthermore, in this example, only one sensor unit 12 is used, so there is only one harness running from the sensor unit 12, and thus arrangement of the harness can be performed easily. Moreover, the sensor unit 12 only needs to be fastened to and supported by one area of the housing, so processing of the housing can be easily performed.

In addition, in this example, when the torque that is transmitted between the input-side rotating body 55 and the output-side rotating body 56 and the torsional angle that is within the elastic range of the torsion bar 15 reaches a specified amount (amount that corresponds to the upper limit value on the forward rotation side or backward rotation side in the specified angle range), the concave sections 62 of the input-side stopper 61 and the convex sections 64 output-side stopper 63 engage. In other words, the state of engagement between the input-side stopper 61 and the output-side stopper 63 is a state of engagement in which torque can be transmitted. Then, part of the torque is transmitted by way of the engagement section between the input-side stopper 61 and the output-side stopper 63, and the remaining portion of the torque is transmitted by way of the torsion bar 15. In this way, when the input-side stopper 61 and the output-side stopper 63 are engaged so that torque can be transmitted, the torsional angle of the torsion bar 15 will not increase any further. Therefore, plastic deformation of the torsion bar 15 is prevented regardless of the size of the torque.

In this example, it is possible to set the torsional rigidity of the torsion bar 15 to correspond to the desired resolution of torque measurement without having to set the torsional rigidity of the torsion bar 15 in consideration of the plastic deformation of the torsion bar 15 during operation. Therefore, it is possible to suitably adjust the torsional rigidity of the torsion bar 15 by adjusting the material of the torsion bar 15, and the dimension in the radial direction and the dimension in the axial direction of the middle section in the axial direction of the torsion bar 15. More specifically, when the maximum torque that is transmitted between the input-side rotating body 55 and the output-side rotating body 56 is transmitted by way of only the torsion bar 15, the torsion bar 15 can be set to a torsional rigidity that is smaller than the minimum torsional rigidity at which plastic deformation of the torsion bar 15 will not occur. As a result, the resolution of torque measure during the time until the input-side stopper 61 and the output-side stopper 63 engage (at least the low torque region) can be improved more than in the case of construction in which an input-side stopper 61 and output-side stopper 63 are not provided.

When implementing the present invention, it is also possible to employ construction to the first example of an embodiment in which the direction in which the detecting sections of the pair of sensors of the sensor unit face the detected section of the first encoder and the detected section of the second encoder is changed from the radial direction to the axial direction. In that case, the detected section of the first encoder and the detected section of the second encoder are a pair of annular-shaped detected sections having different radial dimensions from each other, and these detected sections are arranged so that when facing in the same direction in the axial direction the detected sections are concentric with each other, or in other words, overlap in the radial direction. The detecting sections of a pair of sensors of a sensor unit face these detected sections in the axial direction.

Second Example

Figure 8:
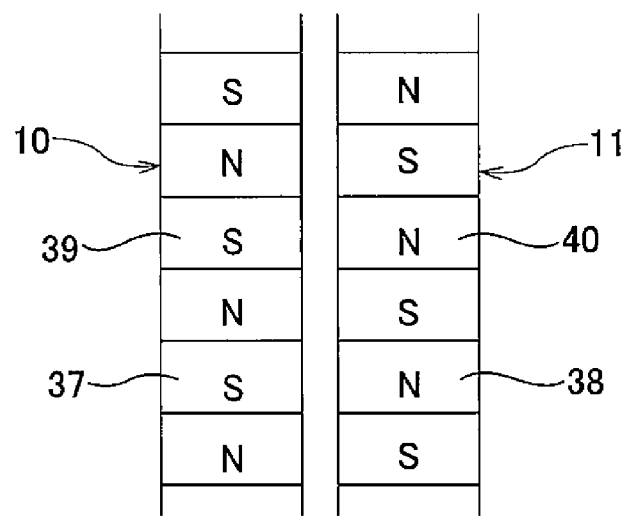
FIG. 8 is a view illustrating a second example of an embodiment of the present invention, and is similar to FIG. 6.
Figure 9:
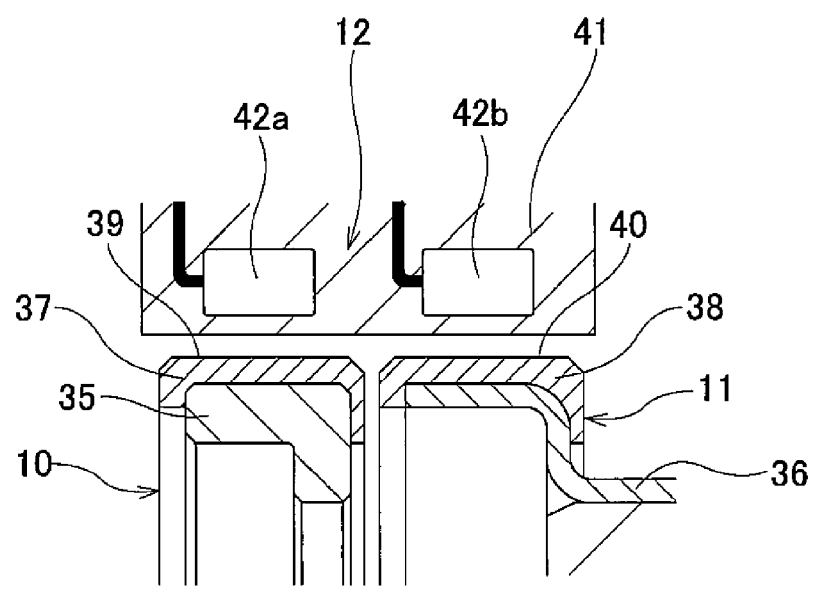
FIG. 9 is a view illustrating the second example of an embodiment of the present invention, and is similar to FIG. 7.

FIG. 8 and FIG. 9 illustrate a second example of an embodiment of the present invention. In this example, as illustrated in FIG. 8, when torque is not being transmitted, the phases in the circumferential direction of the magnetic poles of the detected section 39 of the first encoder 10 and the detected sections 40 of the second encoder 11 are shifted 180 degrees with respect to each other. In other words, the first encoder 10 and the second encoder 11 are arranged so that differing poles of the first detected section 39 and the second detected section 40 are adjacent to each other in the axial direction. Moreover, as illustrated in FIG. 9, the pair of sensors 42a, 42b of the sensor unit 12 are arranged so as to face the same direction as each other, and the detecting sections of the sensors 42a, 42b face the same position in the circumferential direction of the detected sections 39, 40. In other words, in this example, the sensor unit 12 is constructed so that when the transmitted torque is zero, the phase difference between the output signals of the sensors 42a, 42b is 180 degrees (phase difference ratio is 0.5).

In this example, when the end surfaces in the axial direction of the permanent magnet 37 of the first encoder 10 and the permanent magnet 38 of the second encoder 11 that face each other are magnetically attracted in the state before the first encoder 10 and the second encoder 11 are assembled, the phases in the circumferential direction of the magnetic poles of the first encoder 10 and the second encoder 11 are shifted by 180 degrees with respect to each other as illustrated in FIG. 8. Therefore, by assembling the first encoder 10 and the second encoder 11 in this state, it is easy to achieve the positional relationship of the magnetic poles as illustrated in FIG. 8 after assembly. The other construction and functions are the same as those in the first example.

When implementing the first example and second example of embodiments, the first encoder 10 and the second encoder 11 are assembled in the locations of use in a specified positional relationship such as illustrated in FIG. 6 or FIG. 8, so preferably regulating sections for regulating the relative positional relationship in the circumferential direction of the magnetic poles are provided in part of the first encoder 10 and second encoder 11. An example of providing such regulating sections will be explained below using third through fifth examples of an embodiment of the present invention.

Third Example

Figure 10:
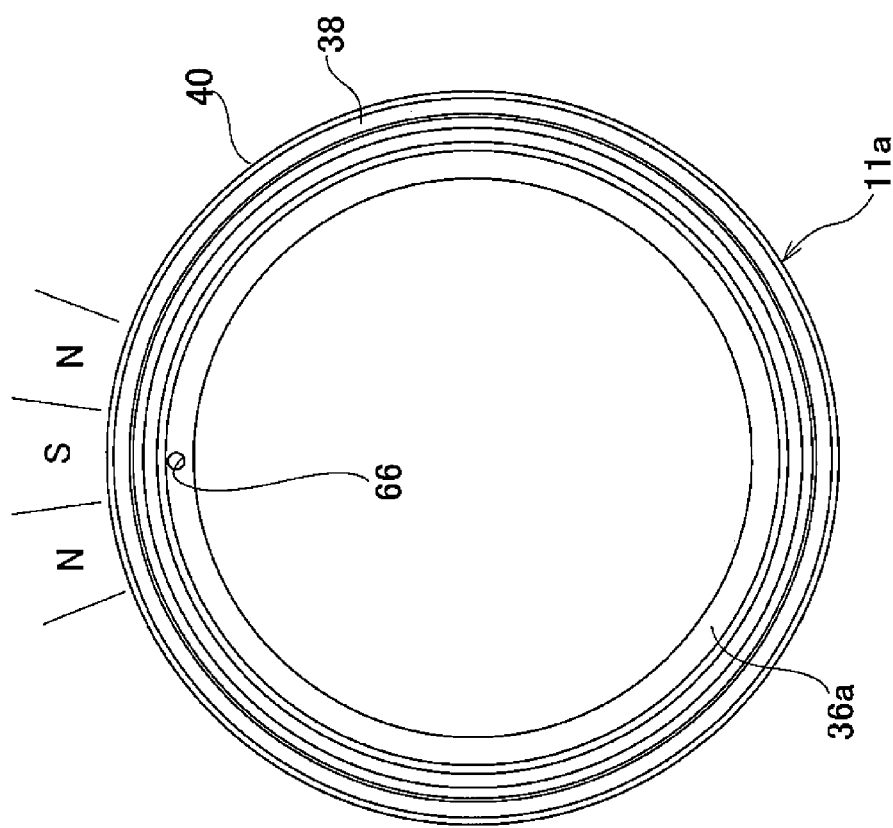
FIG. 10A is a view of a third example of an embodiment of the present invention, and illustrates a first encoder thereof as seen from the left side in FIG. 3.
FIG. 10B is a view illustrating a second encoder thereof as seen from the left side in FIG. 3.
Figure 10:
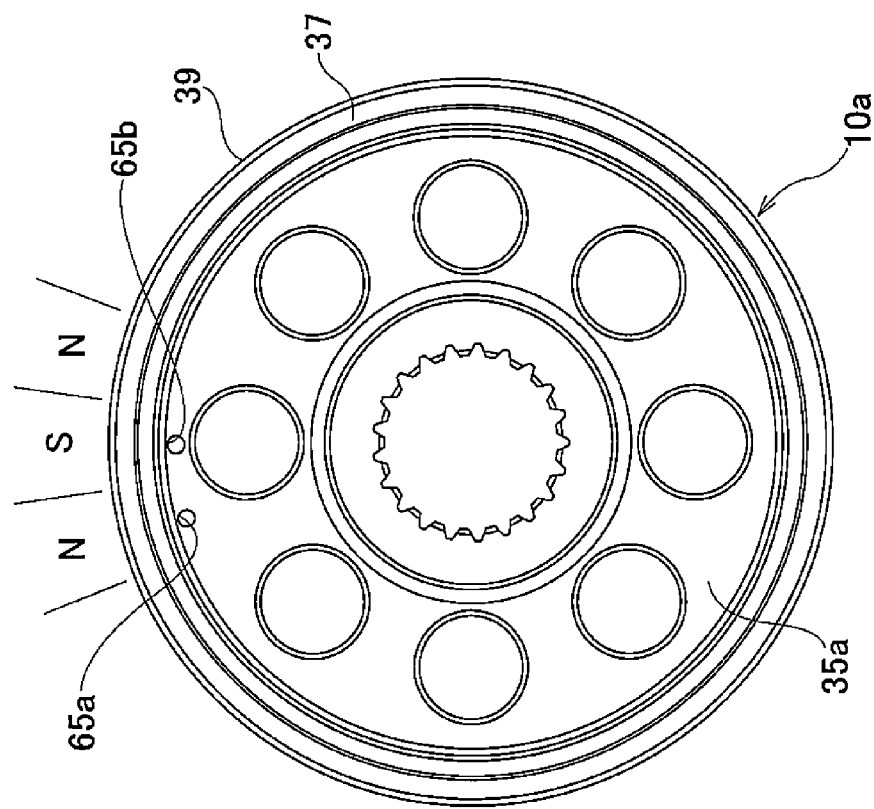
Figure 11:
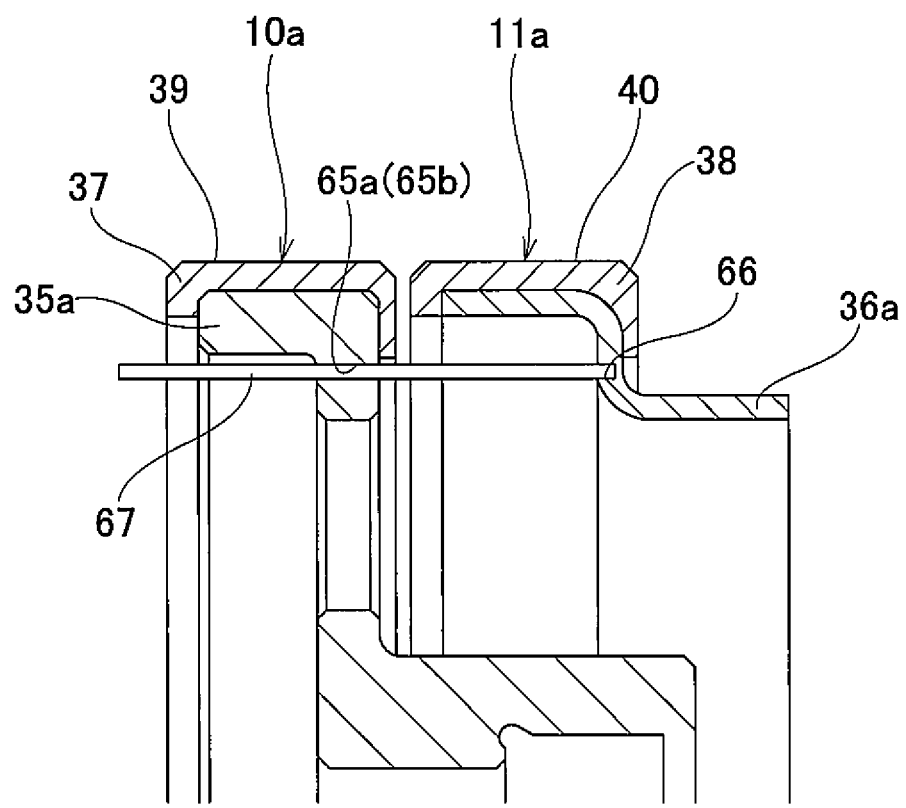
FIG. 11 is a partial cross-sectional view of the third example of an embodiment of the present invention, and illustrates a state in which the first encoder and the second encoder are connected by a pin.

FIG. 10A, FIG. 10B and FIG. 11 illustrate a third example of an embodiment of the present invention. In this example, two through holes 65a, 65b that are separated in the circumferential direction are provided as regulating sections in the metal core 35a of the first encoder 10a. Moreover, one concave hole 66 is provided as a regulating section in the metal core 36 of the second encoder 11a. With the center axis of the first encoder 10 and the center axis of the second encoder 11 aligned together, the positions in the radial direction of the through holes 65a, 65b and concave hole 66 become the same as each other. Moreover, the pitch of the through holes 65a, 65b (distance between centers in the circumferential direction) become the same as the pitch of one magnetization of the first encoder 10a and second encoder 11a (distance between centers in the circumferential direction of an S pole and an N pole that are adjacent in the circumferential direction.

In this example, when magnetizing the first encoder 10a and the second encoder 11a in the manufacturing stage, the center axis of the first encoder 10a and the center axis of the second encoder 11a are aligned as illustrated in FIG. 11, and in this state, a pin 67 is inserted as a regulating member through one of the through holes (through hole 65a or 65b) and into the concave hole 66 so that there is no looseness. As a result, the first encoder 10a and the second encoder 11a are positioned in the circumferential direction. In this state, it is possible to perform the work of simultaneously magnetizing the detected section 39 of the first encoder 10a and the detected section 40 of the second encoder 11a with S poles and N poles having phases in the circumferential direction that are the same as each other, and that are arranged in an alternating manner at a uniform pitch in the circumferential direction.

After that, when assembling the first encoder 10a and the second encoder 11a in the locations of use in a positional relationship as illustrated in FIG. 6, the first encoder 10a and the second encoder 11a are assembled positioned in the same state as during magnetization while the first encoder 10a and second encoder 11a are positioned in the circumferential direction. On the other hand, when assembling the first encoder 10a and the second encoder 11a in the locations of use in a positional relationship as illustrated in FIG. 8, the pin 67 that is inserted through the through hole is changed from one through hole 65a (or through hole 65b) to the other through hole 65b (or through hole 65a), or in other words, the relative positional relationship in the circumferential direction between the first encoder 10a and the second encoder 11a is shifted an amount equal to the pitch of one magnetization from the positional relationship during magnetization, and in this state, the first encoder 10a and the second encoder 11a are assembled. In either case, after the first encoder 10a and the second encoder 11a have been assembled and fastened in the locations of use, the pin 67 is removed from the through hole 65a or through hole 65b and the concave hole 66.

By assembling the first encoder 10a and the second encoder 11a as described above, the work of assembling the first encoder 10a and second encoder 11a in the locations of use in the positional relationship illustrated in FIG. 6 or FIG. 8 can be performed easily and accurately. Instead of the concave hole 66, it is also possible to provide a through hole through which the pin 67 can be inserted through with no looseness. The other construction and functions are the same as those of the first example and second example.

Fourth Example

Figure 12A:
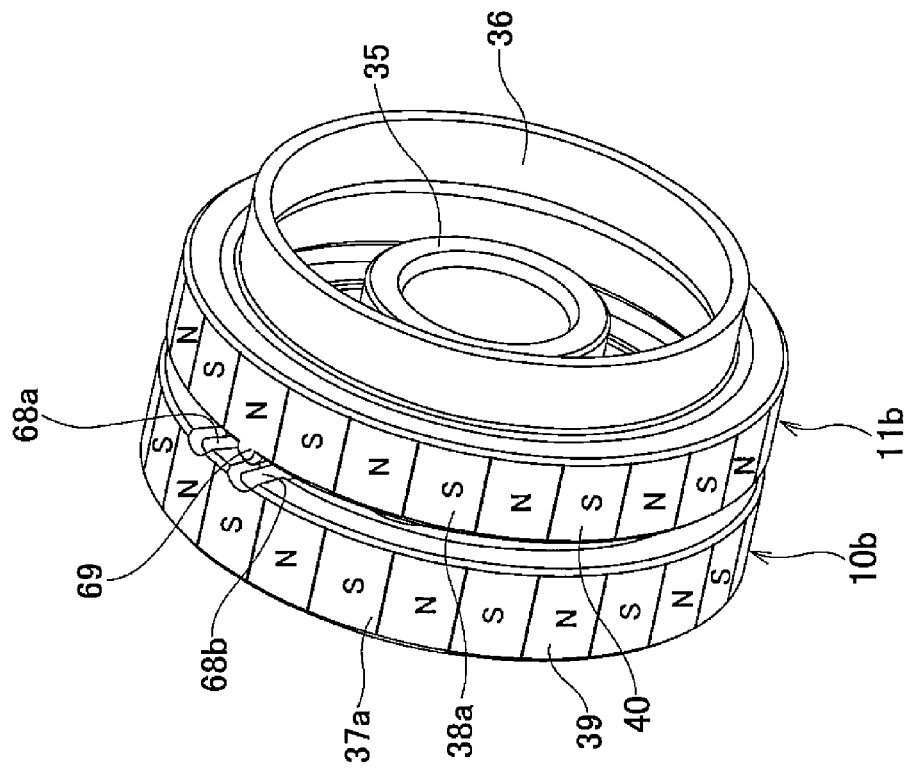
FIG. 12A is a perspective view of a fourth example of an embodiment of the present invention, and illustrates a state in which a first encoder and a second encoder thereof are such that the phases in the circumferential direction of one concave section and a convex section are aligned therebetween.
Figure 12B:
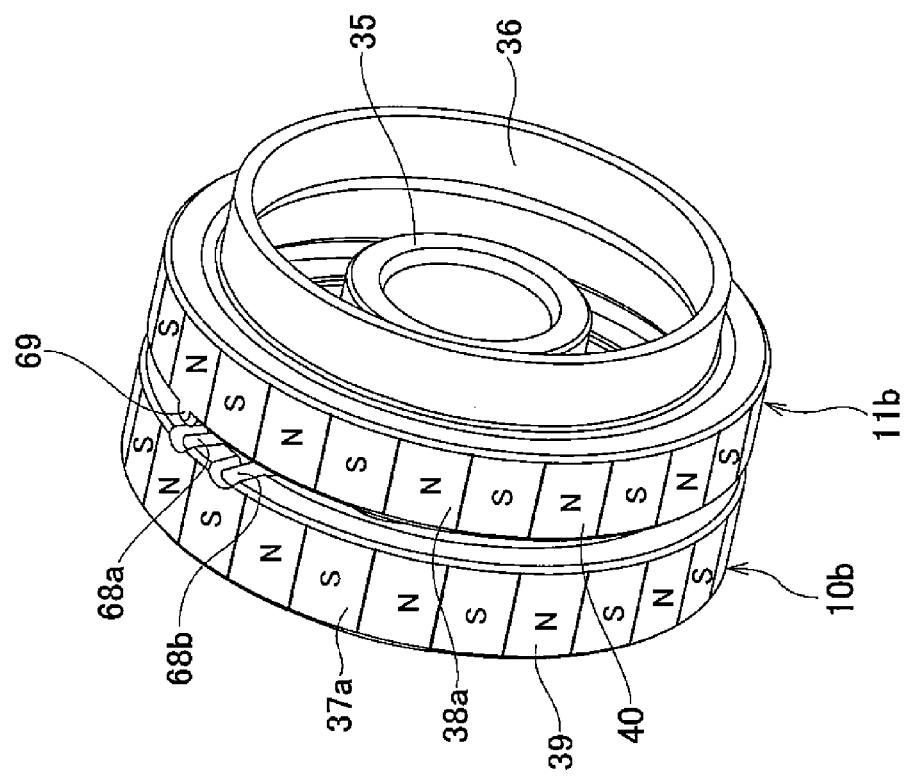
FIG. 12B is a perspective view illustrating a state in which the phases in the circumferential direction of another concave section and the convex section are aligned.

FIG. 12A and FIG. 12B illustrate a fourth example of an embodiment of the present invention. In this example, a pair of concave sections 68a, 68b that are separated in the circumferential direction are provided as regulating sections on one end surface (end surface on the second encoder 11b side) in the axial direction of the permanent magnet 37a of the first encoder 10b. Moreover, one convex section 69 is provided as a regulating section on one end surface (end surface on the first encoder 10b side) in the axial direction of the permanent magnet 38a of the second encoder 11b. The pitch of the concave sections 68a, 68b is the same as the pitch of one magnetization of the first encoder 10b and second encoder 11b.

In this example, when magnetizing the first encoder 10b and the second encoder 11b during the manufacturing stage, from the state illustrated in FIG. 12A, one end surface in the axial direction of the permanent magnet 37a of the first encoder 10b and one end surface in the axial direction of the permanent magnet 38a of the second encoder 11b are brought face to face, and by one concave section 68a of the concave sections 68a, 68b being made to engage with the convex section 69, the first encoder 10b and the second encoder 11b are positioned in the circumferential direction. In this state, as illustrated in FIG. 12A, the work of simultaneously magnetizing the S poles and N poles of the detected section 39 of the first encoder 10b and the detected section 40 of the second encoder 11b is performed so that the phases in the circumferential direction are the same as each other, and so as to alternate in the circumferential direction at a uniform pitch.

After that, when assembling the first encoder 10b and the second encoder 11b in the locations of use having the positional relationship illustrated in FIG. 6, the work of assembling the first encoder 10b and the second encoder 11b in the locations of use is performed while positioning the first encoder 10b and the second encoder 11b in the circumferential direction in the same state as during magnetization. On the other hand, when assembling the first encoder 10b and the second encoder 11b in the locations of use having the positional relationship illustrated in FIG. 8, from the state illustrated in FIG. 12B, one end surface in the axial direction of the permanent magnet 37a of the first encoder 10b and one end surface in the axial direction of the permanent magnet 38a of the second encoder 11b are brought face to face, and by the other concave section 68b of the concave sections 68a, 68b engaging with the convex section 69, the first encoder 10b and the second encoder 11b are positioned in the circumferential direction. In this state, the work of assembling the first encoder 10b and the second encoder 11b in the locations of use is performed.

By performing the work of assembling the first encoder 10b and the second encoder 11b as described above, it is possible to easily and accurately perform the work of assembling the first encoder 10b and the second encoder 11b in the locations of use having the positional relationship illustrated in FIG. 6 or FIG. 8. The other construction and functions are the same as those of the first example and second example.

Fifth Example

FIG. 13A and FIG. 13B illustrate a fifth example of an embodiment of the present invention. In this example, a pair of markings 70a, 70b (71a, 71b) for each a concave section and convex section that are separated in the circumferential direction are provided as regulating sections on the other end surface (end surface on the opposite side from the second encoder 11c) in the axial direction of the permanent magnet 37b of the first encoder 10c, and one end surface (end surface on the first encoder 10c side) in the axial direction of the permanent magnet 38b of the second encoder 11c. The positions in the circumferential direction of the markings 70a, 70b that are provided on the first encoder 10c coincide with the positions in the circumferential direction of two magnetic boundaries (boundary between an S pole and an N pole) that are adjacent in the circumferential direction that exist on the detected section 39 of the first encoder 10c. Moreover, the markings 71a, 71b that are provided on the second encoder 11c coincide with positions in the circumferential direction of two magnetic boundaries that are adjacent in the circumferential direction that exist on the detected section 40 of the second encoder 11c.

In this example, the work of assembling the first encoder 10c and the second encoder 11c in the locations of use is performed while visually making sure that the positions in the circumferential direction of both the markings 70a, 70b and the marking 71a, 71b coincide with each other in the assembled state, or so that the positions in the circumferential direction of the marking 70a (or 70b) and the marking 71b (or 71a) coincide.

By performing the work of assembling the first encoder 10c and the second encoder 11c as described above, it is possible to easily and accurately perform the work of assembling the first encoder 10 and second encoder 11c in the locations of use having the positional relationship illustrated in FIG. 6 or FIG. 8. The other construction and functions are the same as those of the first example and second example.

Sixth Example

Figure 14:
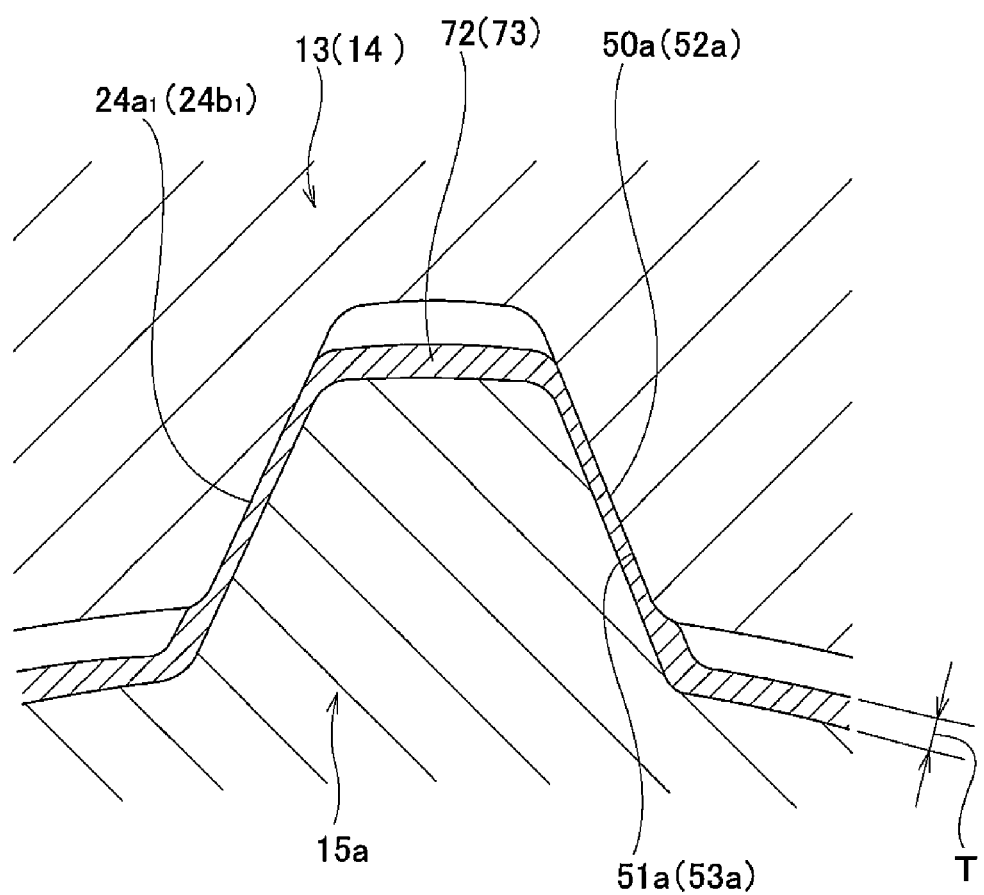
FIG. 14 is a partial cross-sectional view of a sixth example of an embodiment of the present invention, and illustrates a portion in the circumferential direction of an involute spline connection between a torsion bar and an input shaft (or output shaft) in the sixth example.
Figure 15:
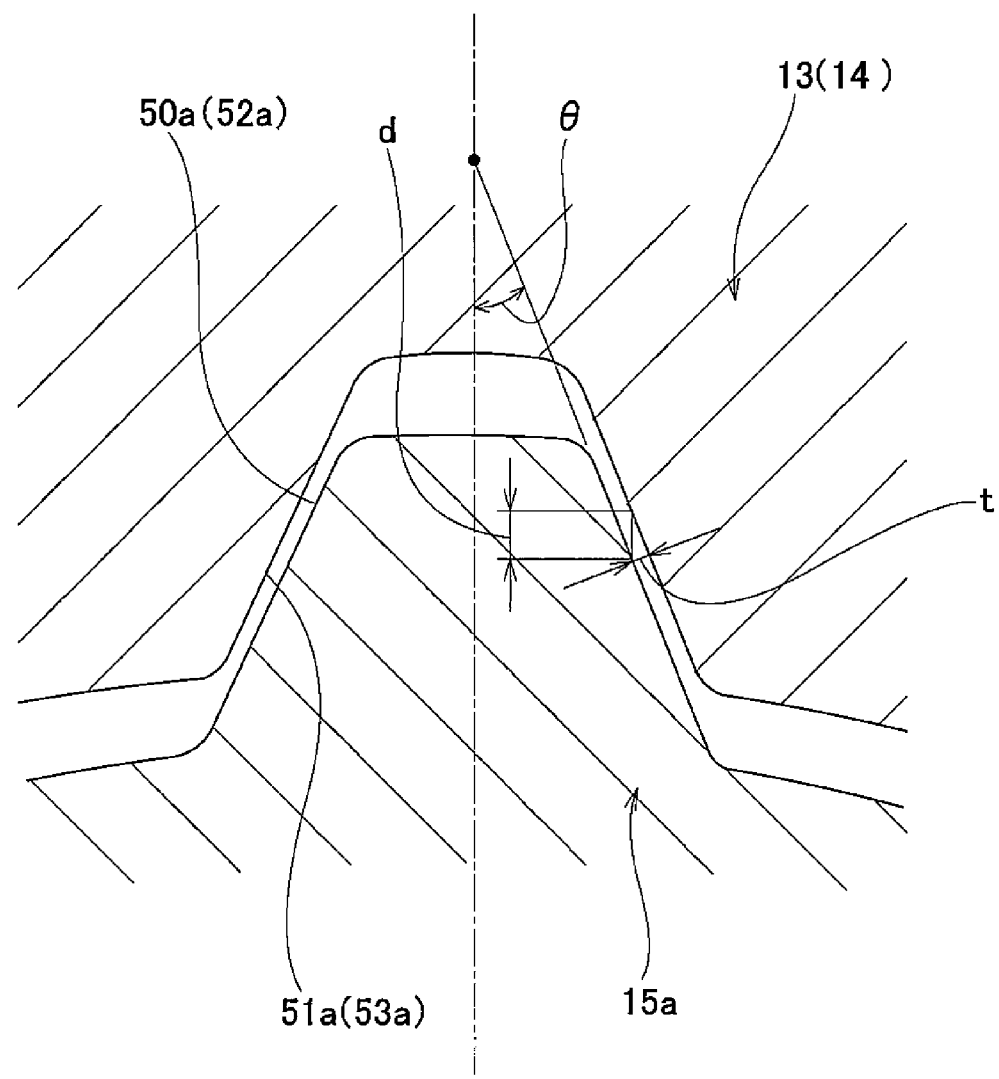
FIG. 15 is a view similar to FIG. 14, and illustrates the state before providing a plating layer on the surface layer of a male involute spline section.
Figure 16:
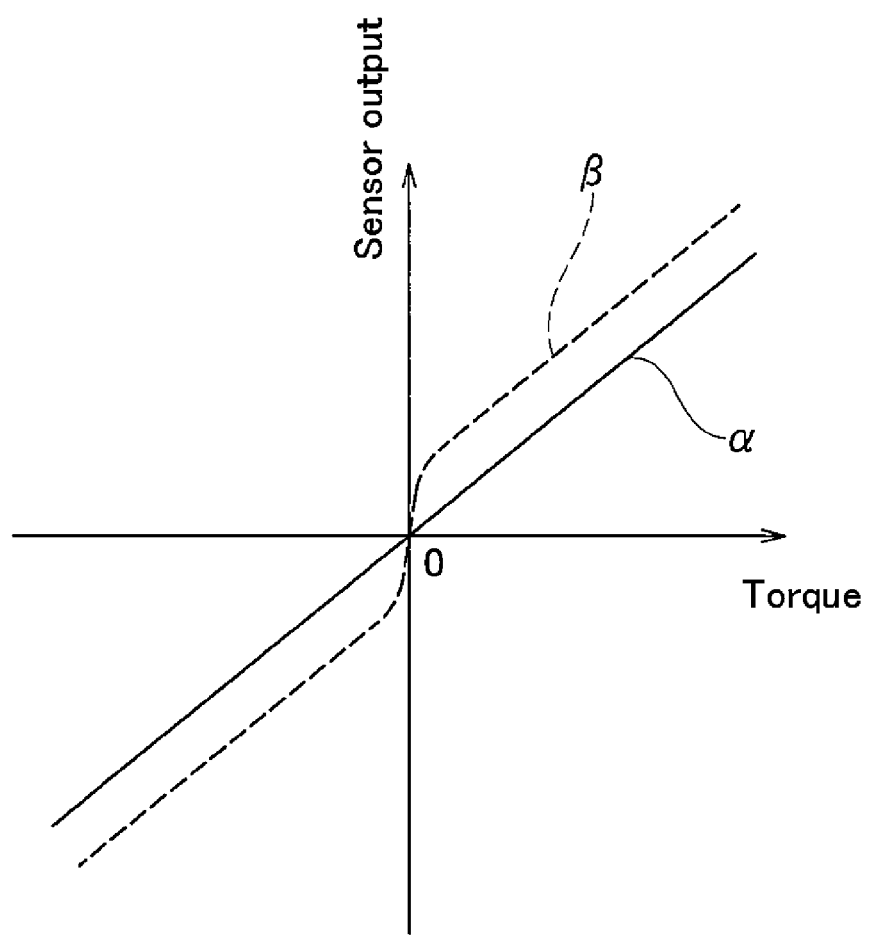
FIG. 16 is a graph illustrating the relationship between sensor output and transmitted torque in the sixth example of an embodiment of the present invention.

FIG. 14 to FIG. 16 illustrate a sixth example of an embodiment of the present invention. In this example, a first plating layer 72 is provided on the surface layer section of the first male involute spline section 50a that is provided on the outer-circumferential surface of one end section of the torsion bar 15a, and a second plating layer 73 is provided on the surface layer section of the second male involute spline section 52a that is provided on the outer-circumferential surface of the other end section of the torsion bar 15a. The metal of the first plating layer 72 and second plating layer 73 is copper or nickel that is softer than the steel alloy such as carbon steel of the input shaft 13, the output shaft 14 and the torsion bar 15a. The first male involute spline section 50a (second male involute spline section 52a) is press-fitted into the first female involute spline section 51a that is provided on the inner-circumferential surface of the input shaft 13 (second female involute spline section that is provided on the inner-circumferential surface of the output shaft 14) that has interference that is smaller than the thickness dimension in the free state of the first plating layer 72 (second plating layer 73). As a result, as illustrated in FIG. 14, by causing the first male involute spline section 50a (second male involute spline section 52a) to engage with the first female involute spline section 51a (second female involute spline section 53a) so that there is no looseness in the circumferential direction, an involute spline engagement section $24a_1$ (involute spline engagement section $24b1$) is formed. Particularly, in this example, by pressing and crushing the first plating layer 72 (second plating layer 73) between the tooth surface of the first male involute spline section 50a (second male involute spline section 52a) and the tooth surface of the first female involute spline section 51a (second female involute spline section 53a), looseness in the circumferential direction in the involute spline section $24a_1$ (involute spline section $24b_1$) is eliminated. On the other hand, a gap remains between the tip of the tooth of the first male involute spline section 50a (second male spline section 52a) and the bottom of the tooth of the first female involute spline section 51a (second female involute spline section 53a), and the gaps function as paths for lubrication oil.

In this example, in order to set the interference such as described above, the thickness dimension T of the first plating layer 72 (second plating layer 73) in the free state is greater than the space t (illustrated in FIG. 15) between the tooth surface of the first male involute spline section 50a (second male involute spline section 52a) in the state before the first plating layer 72 (second plating layer 73) is formed and the tooth surface of the first female involute spline section 51a (second female involute spline section 53a) (T>t). In the state illustrated in FIG. 15, the space t is found as t=d·sin θ (θ; angle of the tooth surface with respect to a radial line that is set in design) based on measurement of the amount of possible relative movement 2d between the first male involute spline section 50a (second male involute spline section 52a) and the first female involute spline section 51a (second female involute spline section 53a). The space t can also be found by other methods; for example, it is also possible to find the space t based on measurement using a measurement pin of the dimensions of each part of first male involute spline section 50a (second male involute spline section 52a) before the first plating layer 72 (second plating layer 73) is formed, and the dimensions of each part of the first female involute spline section 51a (second female involute spline section 53a).

In the case of the torque measurement device-equipped rotation transmission apparatus of this example as well, the involute spline engagement sections $24a_1$, $24b_1$ are engagement sections in which there is no looseness in the circumferential direction. Therefore, when the direction of rotation of the input shaft 13, which is the rotating shaft on the side where torque is inputted, is reversed, the occurrence of relative rotation due to the amount of space in the circumferential direction that is the cause of looseness is prevented by the involute spline engagement sections $24a_1$, $24b_1$. As a result, the occurrence of problems such as not being able to accurately measure minute torque due to this kind of relative rotation is prevented.

Figure 3:
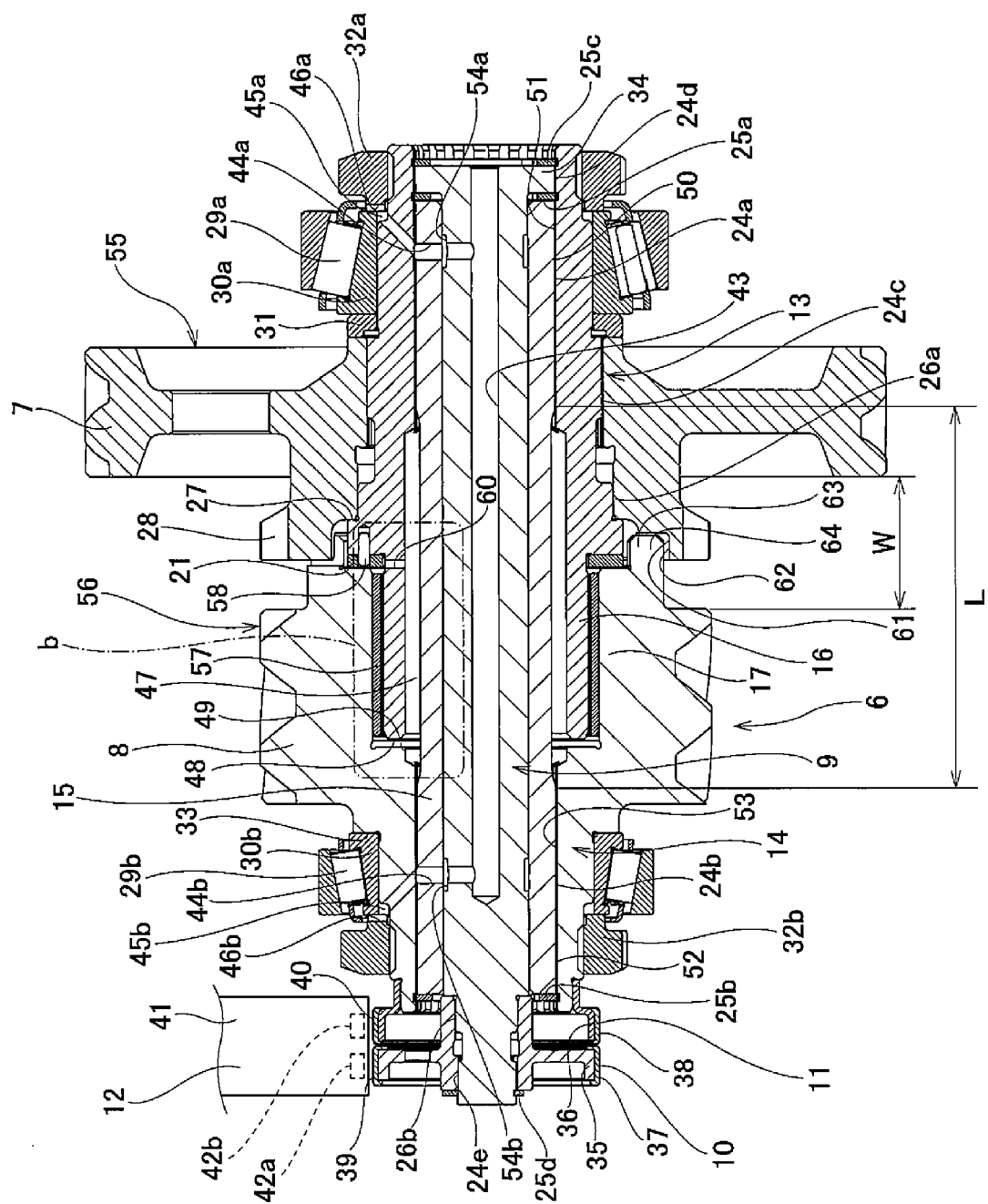
FIG. 3 is a cross-sectional view illustrating the first example of an embodiment of the present invention.
Figure 4:
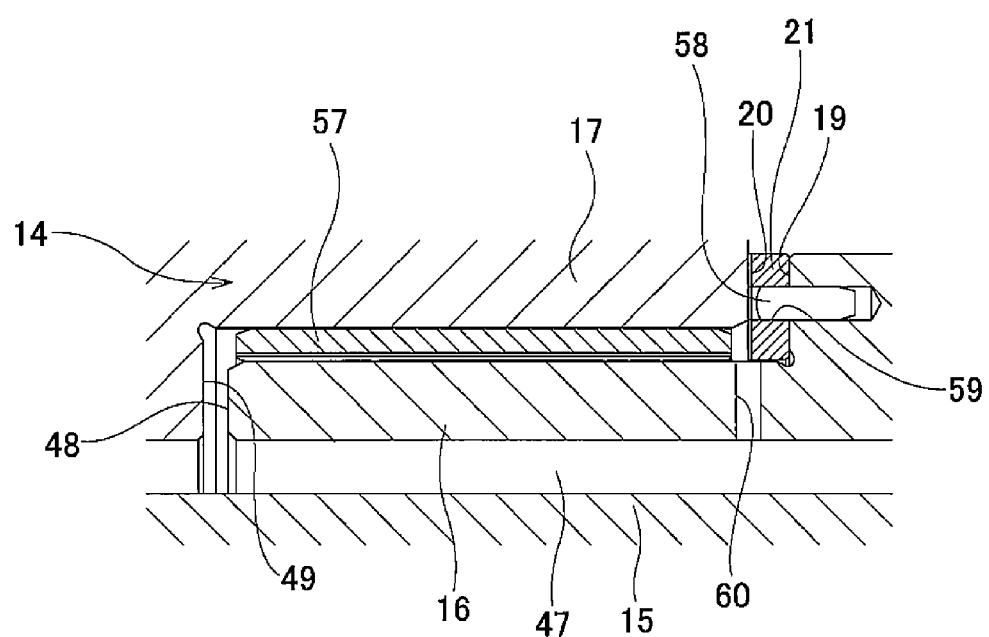
FIG. 4 is an enlarged view of part $1a'$ in FIG. 3.
Figure 5:
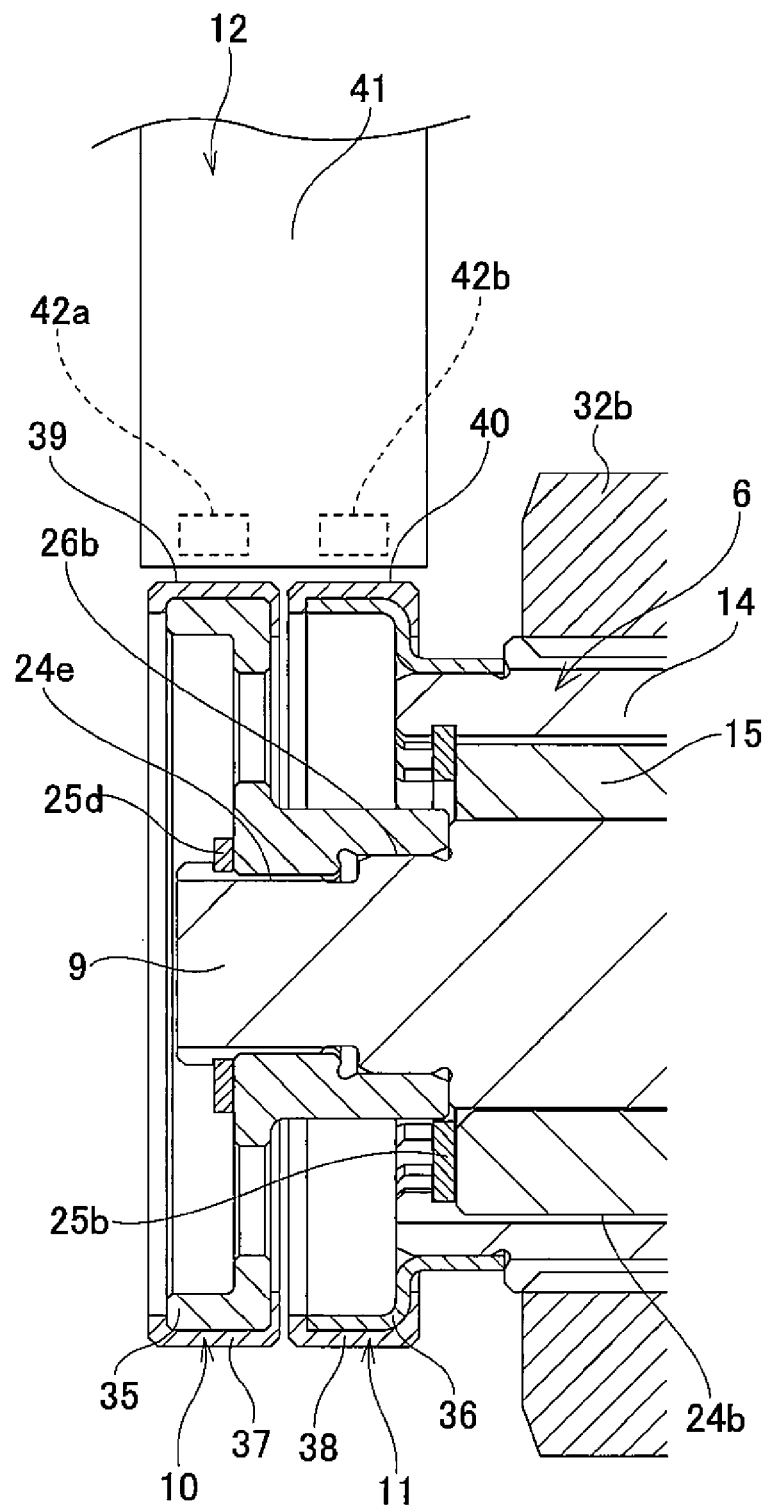
FIG. 5 is an enlarged view of the left end section in FIG. 3.

In other words, when the direction of rotation of the input shaft 13 is reversed and relative rotation due to the amount of space in the circumferential direction that causes looseness occurs in the involute spline engagement sections $24a_1$, $24b_1$, similar relative rotation also occurs due to this between the first encoder 10 and the second encoder 11 (see FIG. 3). As a result, as indicated by the dashed line β in FIG. 16, a characteristic curve that indicates the relationship between the sensor output and the torque shows non-linearity in the sudden change at torque=0 and nearby, so it is not possible to accurately measure the minute torque. However, with the present invention, including this example, when the direction of rotation of the input shaft 13 reverses, the occurrence of relative rotation due to the amount of space in the circumferential direction that causes looseness is prevented by the involute spline engagement sections $24a_1$, $24b_1$, so the occurrence of similar relative rotation between the first encoder 10 and second encoder 11 is also prevented. As a result, as indicated by the solid line α in FIG. 16, linearity of the characteristic curve that expresses the relationship between the sensor output and the torque is maintained over the entire curve, so it becomes possible to accurately measure the minute torque.

Moreover, in this example, when press-fitting the first male involute spline section 50a into the first female involute spline section 51a, and when press-fitting the second male involute spline section 52a into the second female involute spline section 53a, the major portion of deformation (elastic deformation or plastic deformation) of the interference amount occurs in the relatively soft first plating layer 72 and second plating layer 73. Therefore, it is possible to effectively fill in the space in the circumferential direction that causes looseness in the involute spline engagement sections $24a_1$, $24b_2$ with the first plating layer 72 and second plating layer 73. Together with this, deformation of the copper or nickel of the first plating layer 72 and second plating layer 73 occurs at a smaller force than deformation of the steel of the main portions of the involute spline sections 50a, 51a, 52a, 53a, so it is possible to keep the force required for a press-fit low. Furthermore, metal having suitable crushing resistance and rigidity such as copper and nickel are used as the metal of the first plating layer 72 and second plating layer 73, so even when used over a long period of time, it is possible to make it difficult for spaces to occur between the first plating layer 72 and second plating layer 73 and the tooth surfaces of the first female involute spline section 51a and second female involute spline section 53a. The other construction and functions are the same as those of the first through fifth examples.

In this sixth example of an embodiment, construction for eliminating looseness in the circumferential direction using relatively soft plating layers was used for only the involute spline engagement sections $24a_1$, $24b_1$; however, when implementing the present invention, it is also possible to suitably use construction for eliminating looseness in the circumferential direction using relatively soft plating layers in the other involute spline engagement sections 24c to 24e (see FIG. 3).

Moreover, when implementing the present invention, it is also possible to regard all of the involute spline engagement sections 24a to 24e (see FIG. 3) as being engagement sections in which minute looseness in the circumferential direction will occur. When the pair of involute spline engagement sections 24a, 24b that exist on both ends of the torsion bar 15 (see FIG. 3) are regarded as being engagement sections in which minute looseness in the circumferential direction will occur, the characteristic curve that expresses the relationship between the sensor output and torque becomes as illustrated by the dashed line β in FIG. 16, and it is not possible to accurately measure small torque. However, torque can be accurately measured for the other areas, so in uses in which it is not necessary to measure small torque, there is no particular problem even by not using this kind of construction.

Seventh Example

Figure 17:
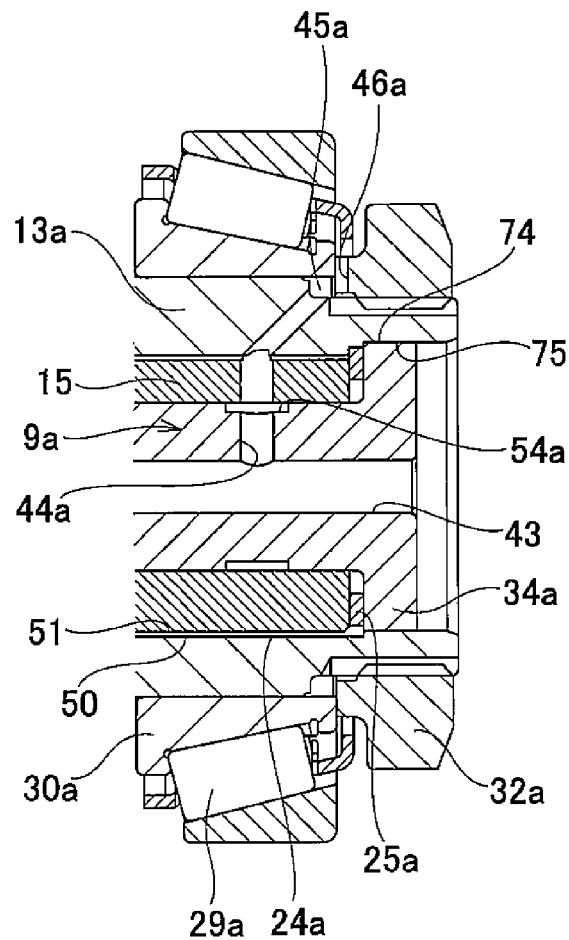
FIG. 17 is an enlarged cross-sectional view of a seventh example of an embodiment of the present invention, and corresponds to the right end section in FIG. 3.
Figure 18:
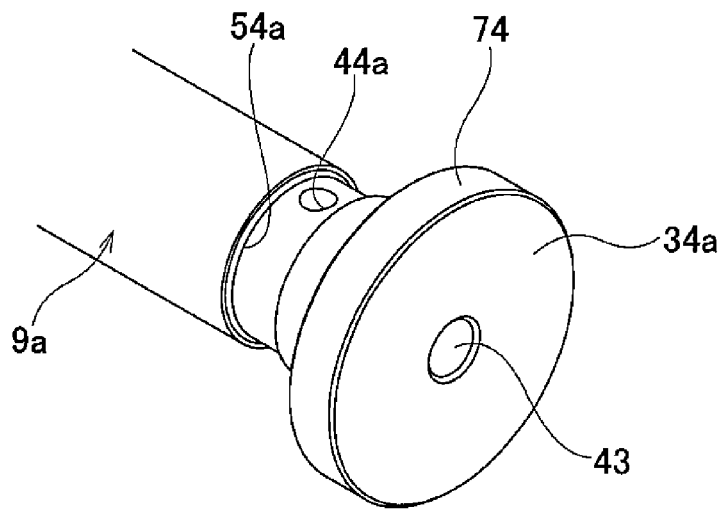
FIG. 18 is an enlarged perspective view of the seventh example of an embodiment of the present invention, and illustrates one end section of the connecting shaft thereof.

FIG. 17 and FIG. 18 illustrate a seventh example of an embodiment of the present invention. In this example, the rim section 34a that is provided on one end section of the connecting shaft 9a is press-fitted into the other end section of the input shaft 13a and fastened with an interference fit. More specifically, the outer-circumferential surface of the rim section 34a is formed as a cylindrical surface 74, and this cylindrical surface 74 is press-fitted into and fastened to the inside of a cylindrical surface 75 that is provided on the inner-circumferential surface of the other end section of the input shaft 13a with an interference fit. With this kind of construction, it is possible to simplify the construction of the portion that connects the one end section of the connecting shaft 9a with the input shaft 13a so that relative rotation is not possible, and thus it is possible to keep manufacturing costs down by that amount. The other construction and functions are the same as those of the first through sixth example.

Eighth Example

Figure 19B:
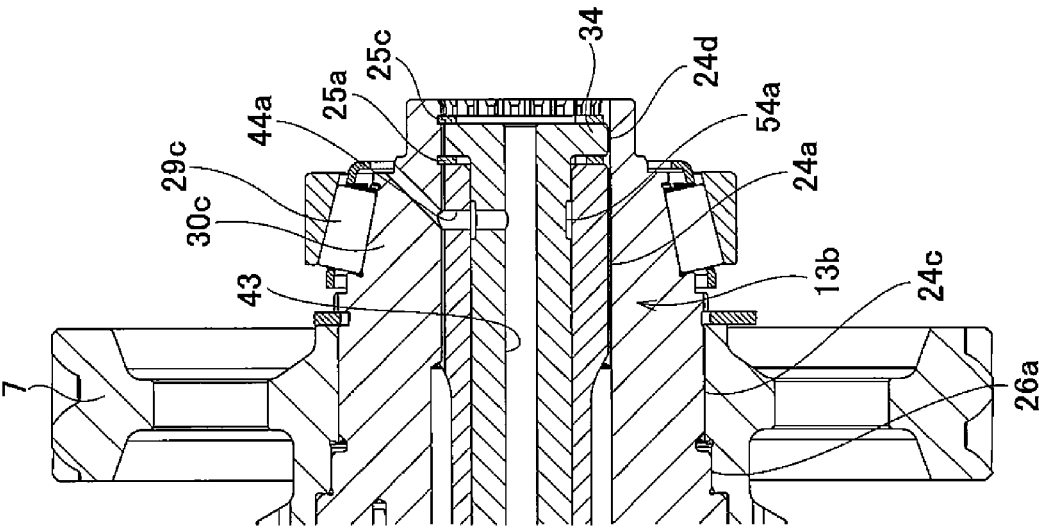
FIG. 19B corresponds to the right end section in FIG. 3.
Figure 19A:
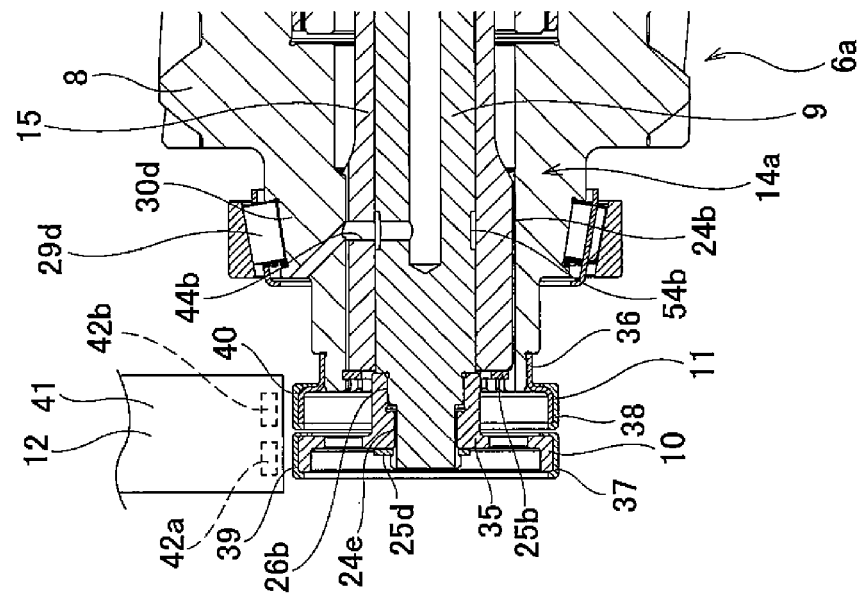
FIG. 19A is a view of an eighth example of an embodiment of the present invention, and corresponds to the left end section in FIG. 3.
Figure 20:
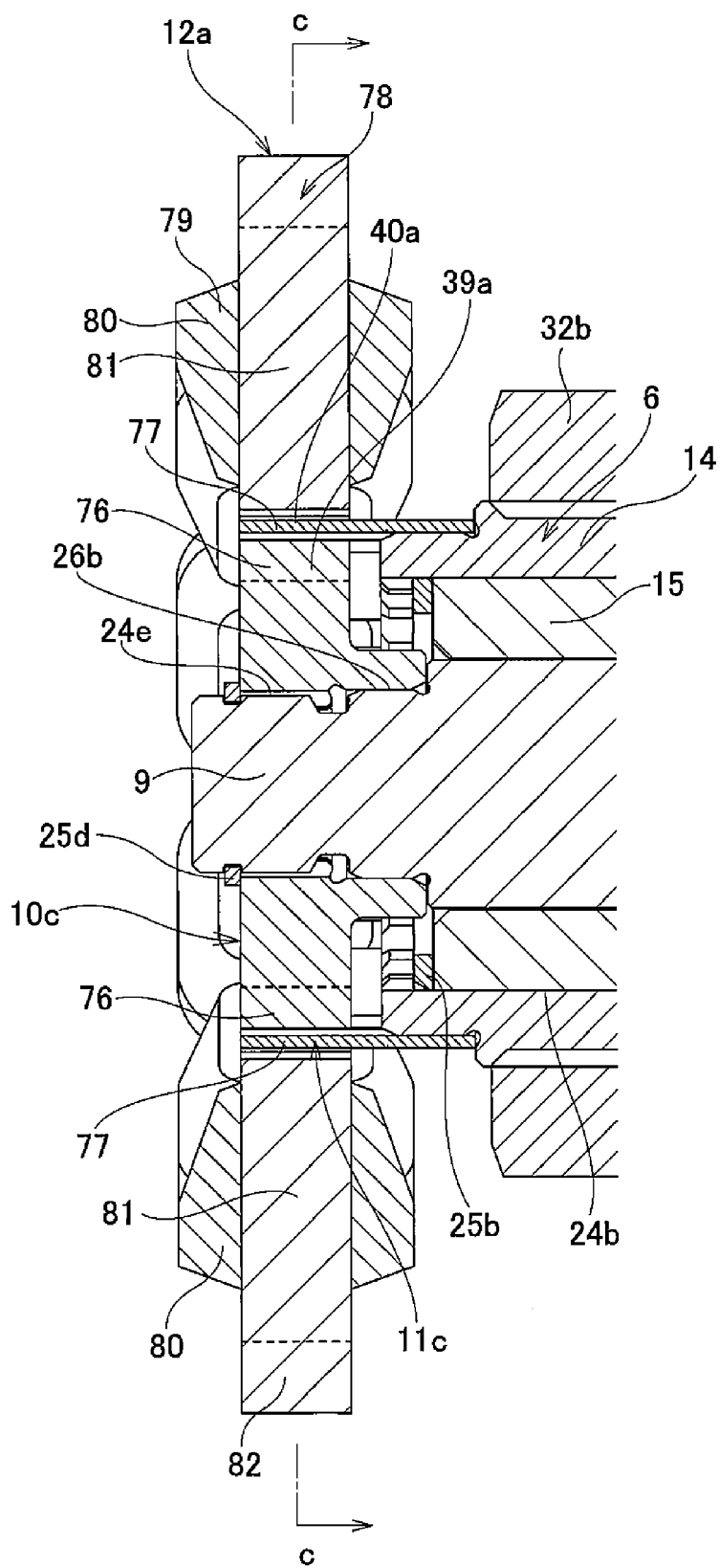
FIG. 20 is a partial enlarged cross-sectional view of a ninth example of an embodiment of the present invention, and is similar to FIG. 5.
Figure 21:
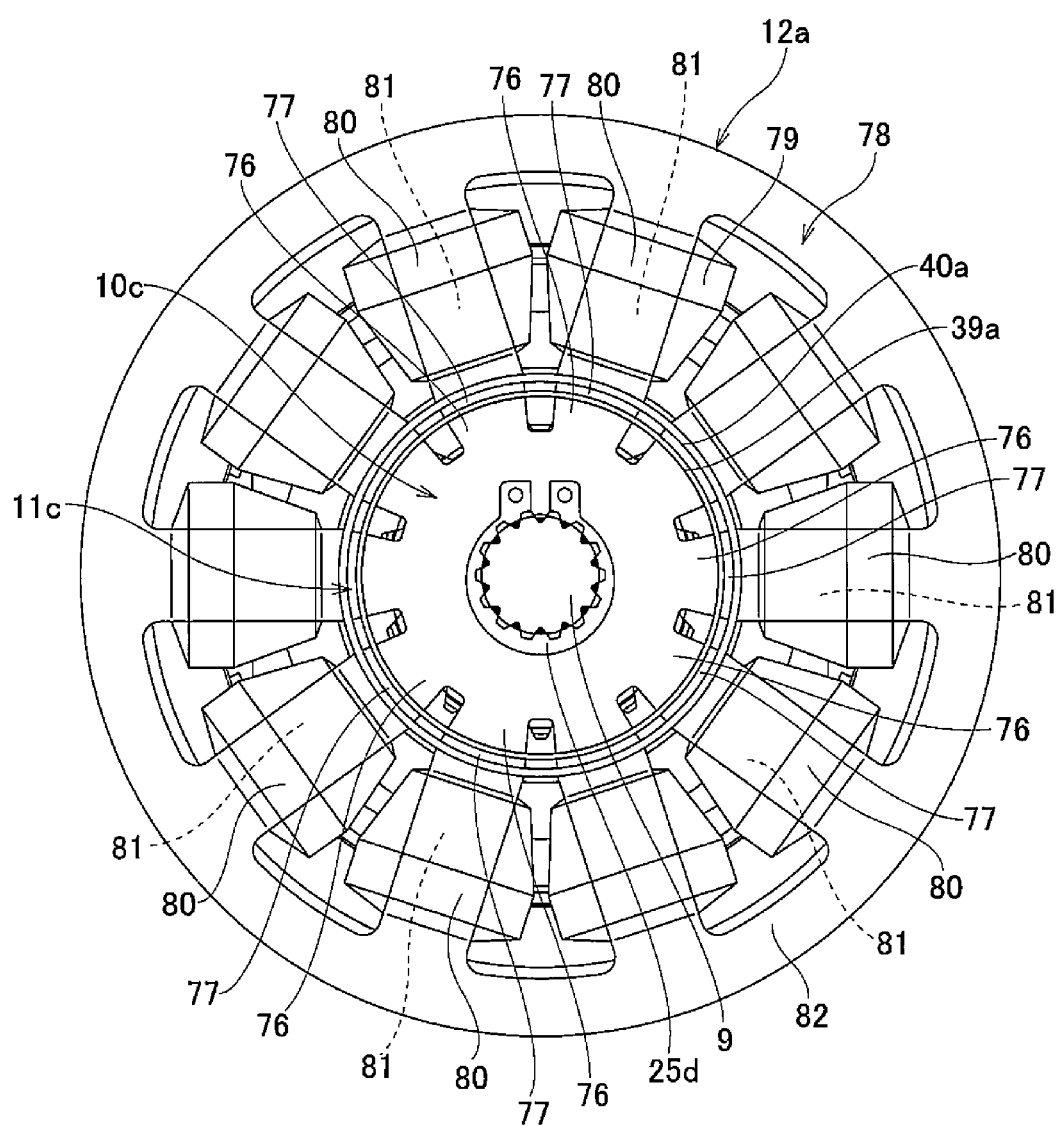
FIG. 21 is a view of the ninth example of an embodiment of the present invention.
Figure 22:
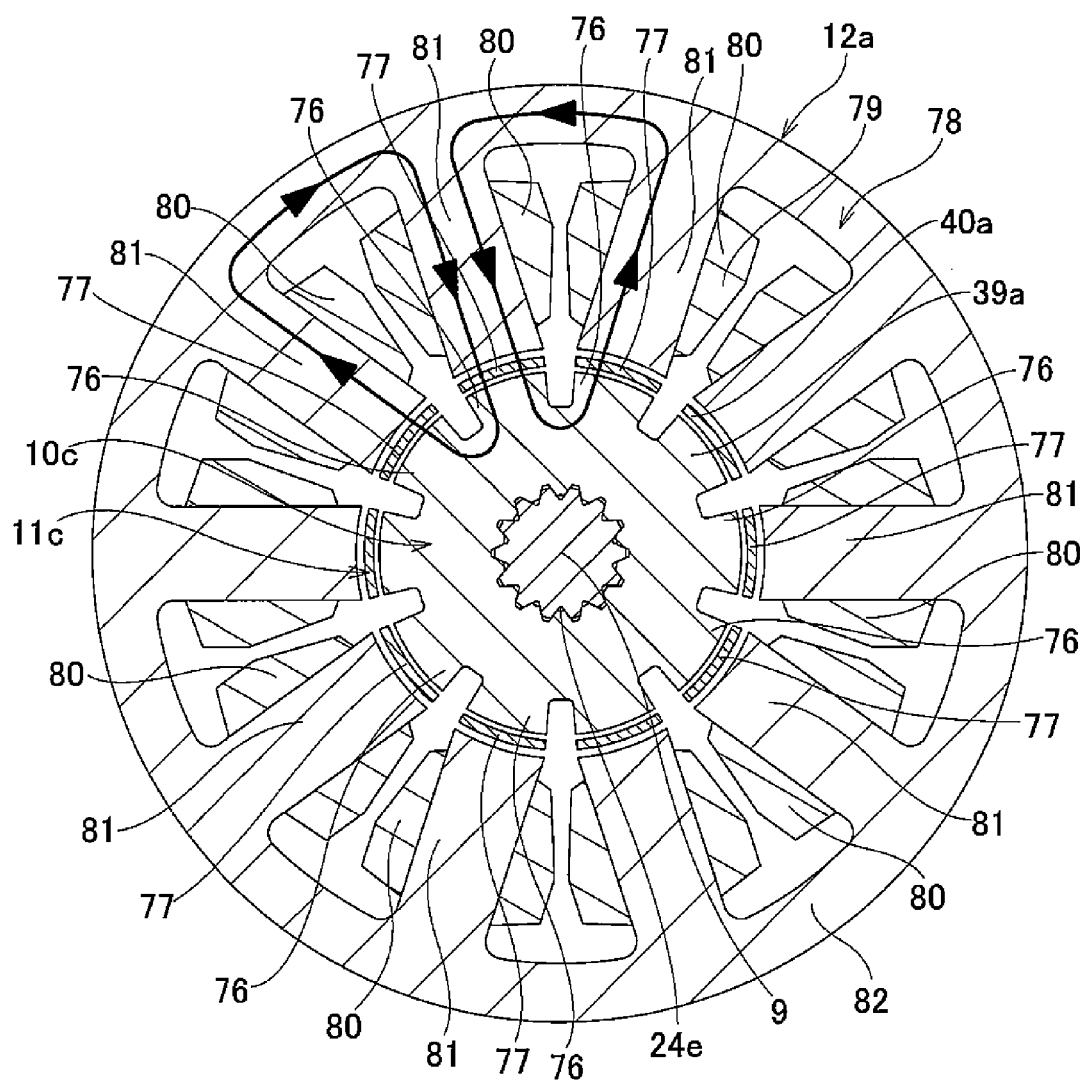
FIG. 22 is a cross-sectional view of section c-c in FIG. 20.
Figure 23:
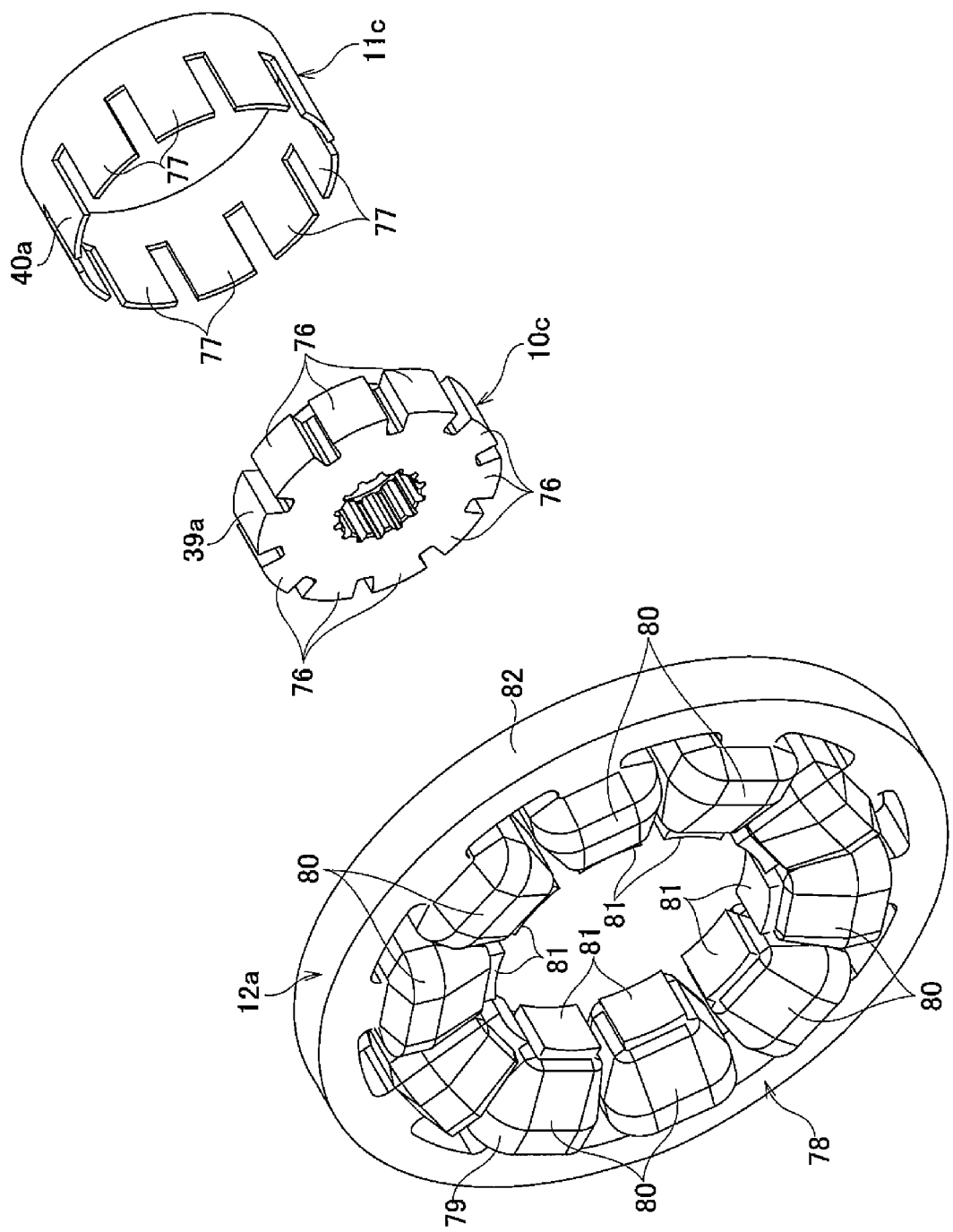
FIG. 23 is an exploded perspective view of the ninth example of an embodiment of the present invention, and illustrates a first encoder, a second encoder and a sensor unit thereof.
Figure 24:
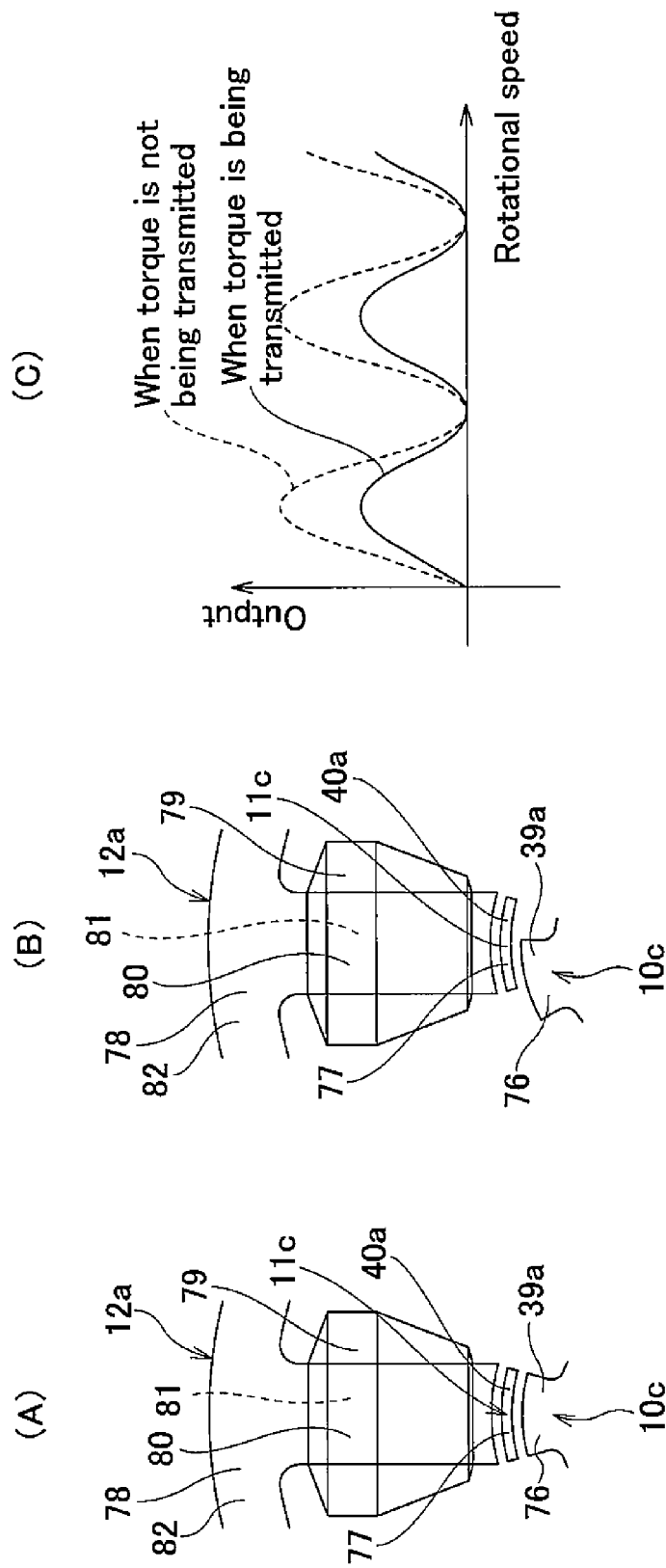
FIG. 24A is a view illustrating a portion in the circumferential direction in FIG. 21 in a state when torque is not being transmitted.
FIG. 24B is a view illustrating a portion in the circumferential direction in FIG. 21 in a state when torque is being transmitted.
FIG. 24C is a graph illustrating the output signal from the sensor unit in each state.
Figure 25:
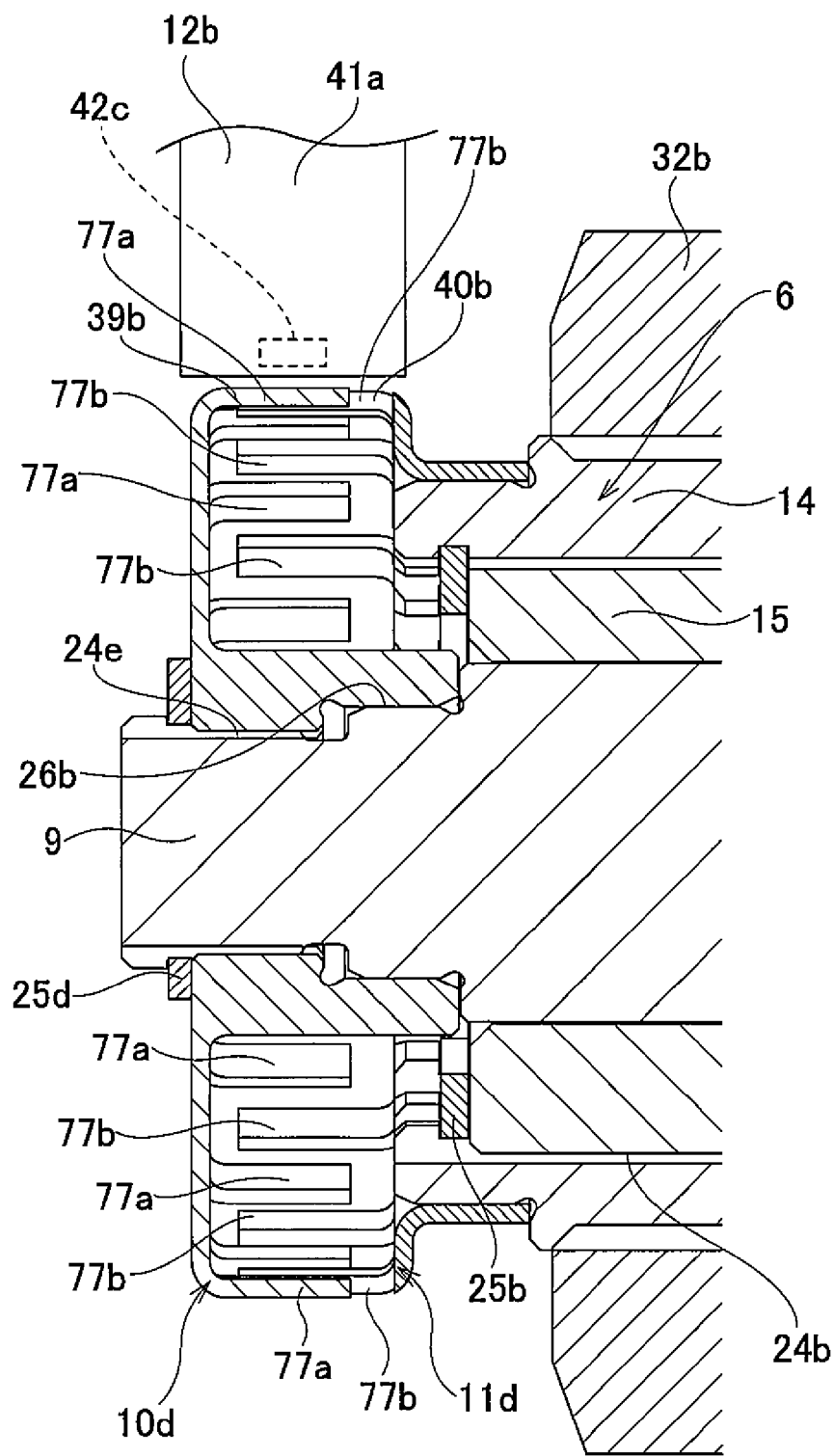
FIG. 25 is a partial enlarged cross-sectional view of a tenth example of an embodiment of the present invention, and is similar to FIG. 5.
Figure 26:
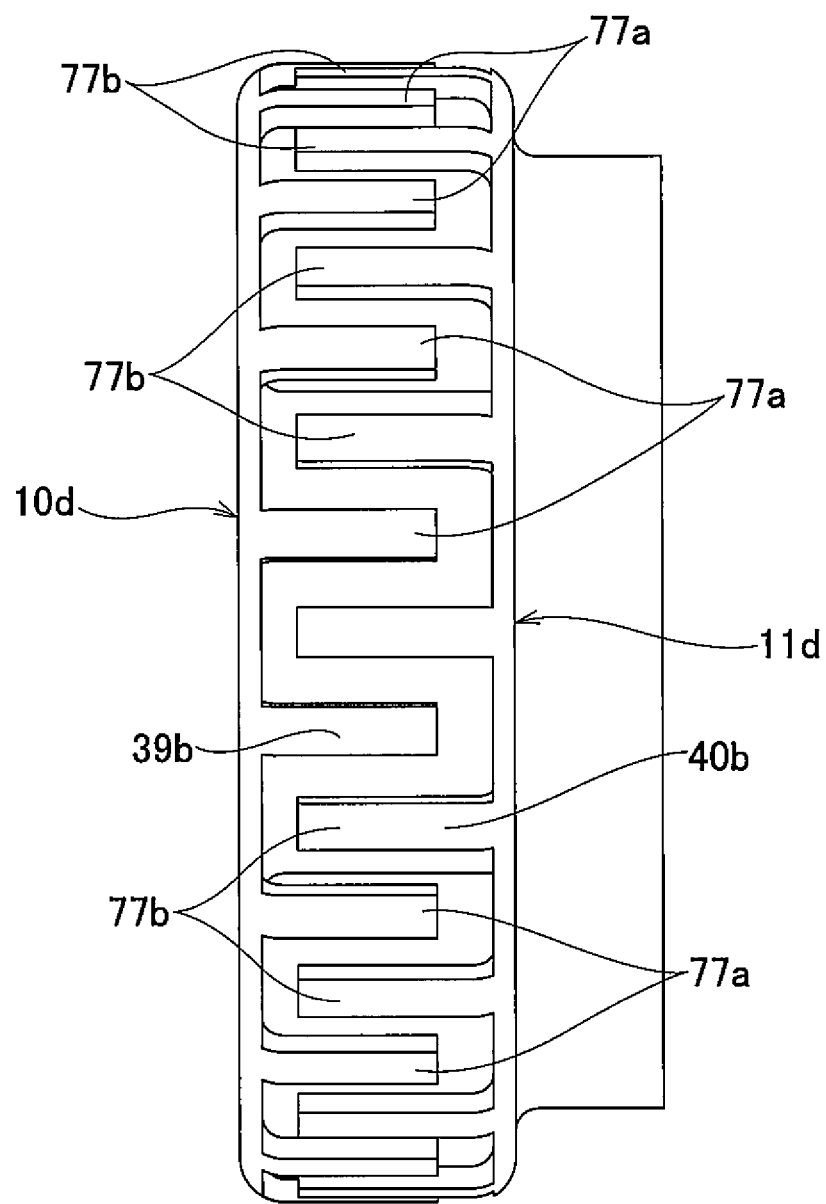
FIG. 26 is a view of the tenth example of an embodiment of the present invention, and illustrates only the removed first encoder and second encoder as seen from the outer-diameter side.
Figure 27:
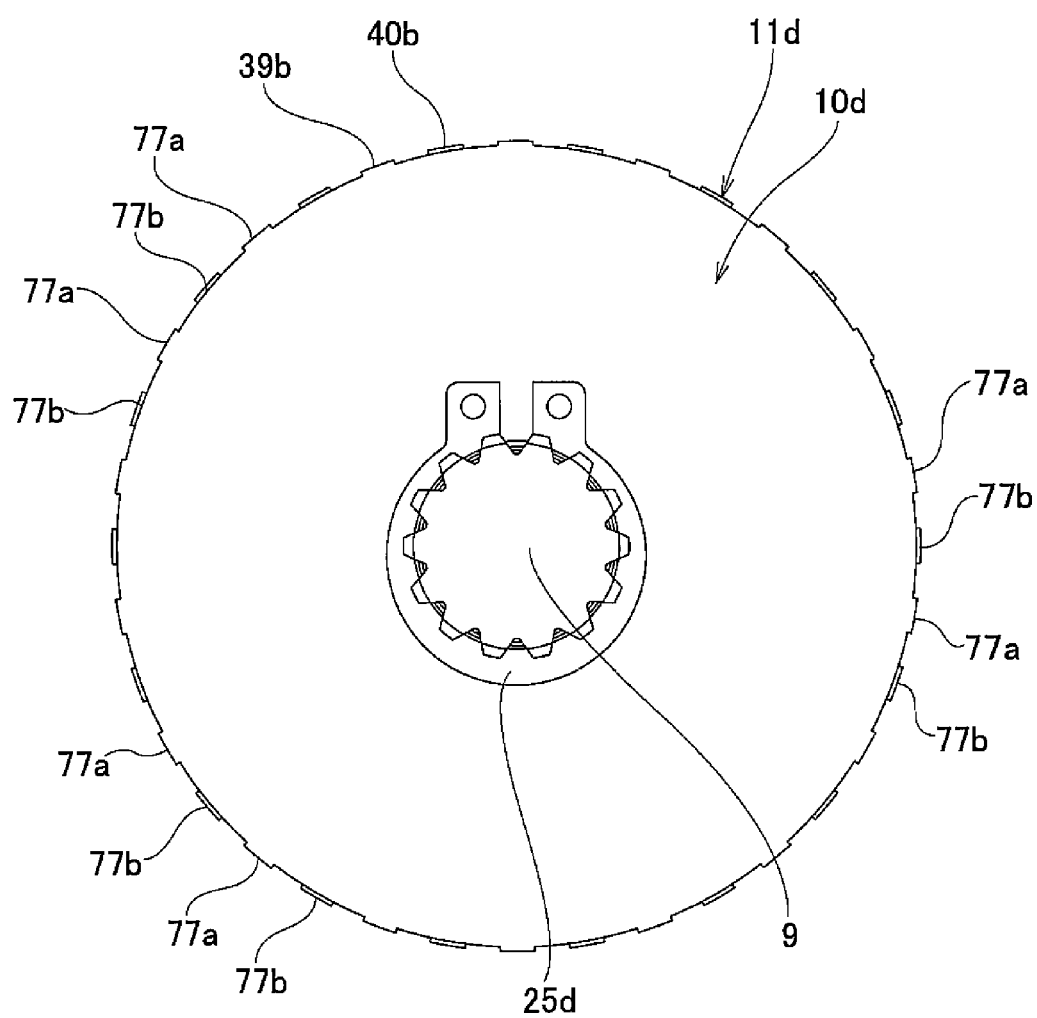
FIG. 27 is a view of the tenth example of an embodiment of the present invention with the sensor unit omitted as seen from the left in FIG. 25.
Figure 28:
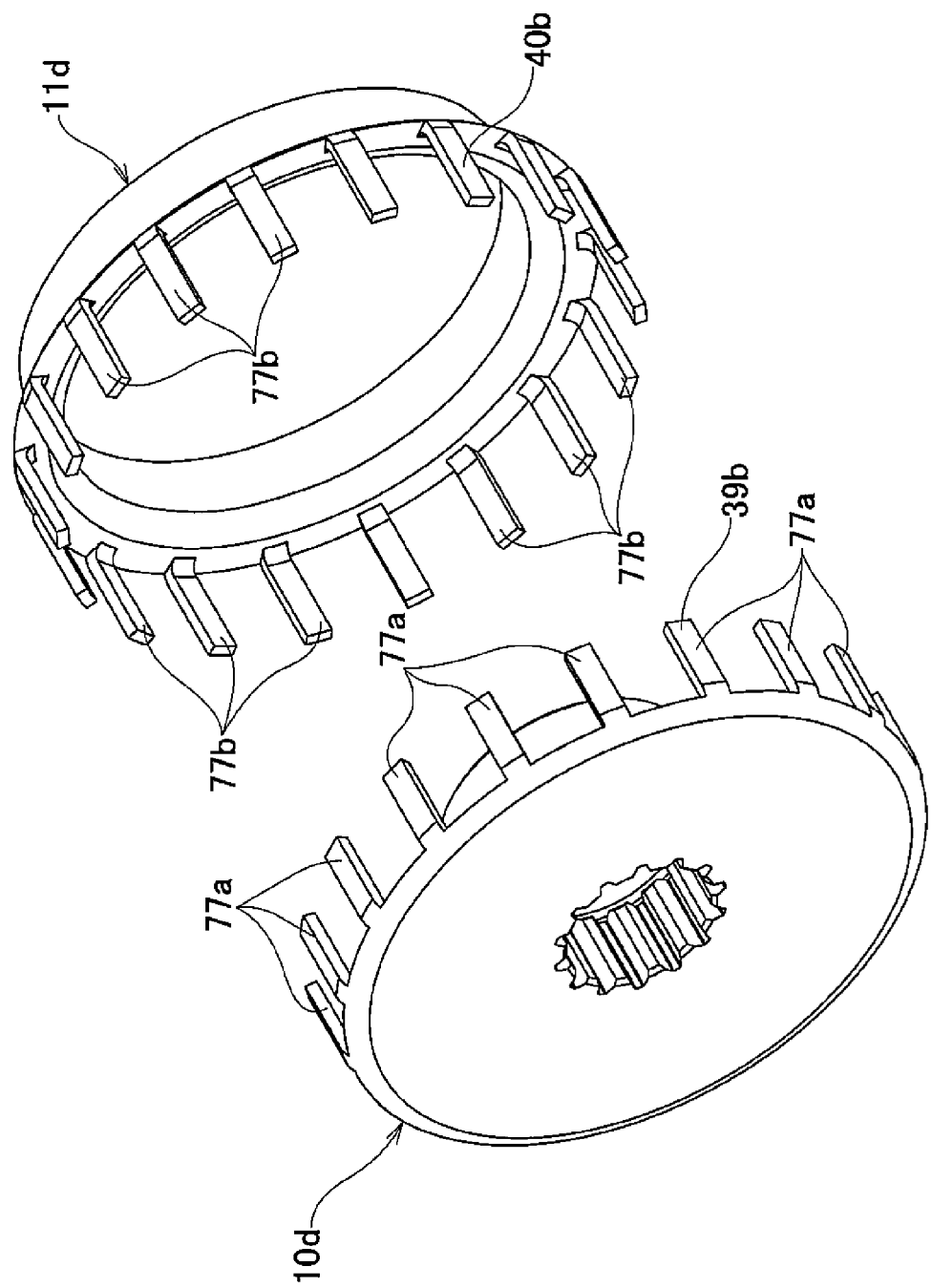
FIG. 28 is an exploded perspective view of a first encoder and a second encoder of the tenth example of an embodiment of the present invention.
Figure 29:
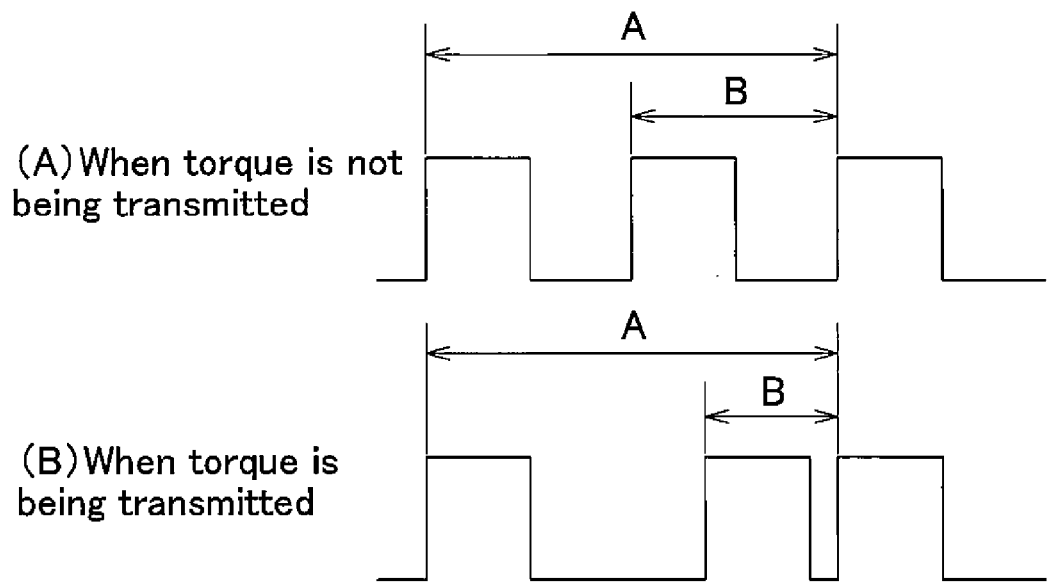
FIG. 29A is a graph illustrating the output signal of a sensor unit in a state when torque is not being transmitted in the tenth example of an embodiment of the present invention.
FIG. 29B is a graph illustrating the output signal of the sensor unit in a state when torque is being transmitted.

FIG. 19A and FIG. 19B illustrate an eighth example of an embodiment of the present invention. In this example, of the pair of conical roller bearing 29c, 29d that rotatably support the rotating-shaft unit 6a with respect to the housing, the inner ring 30c of one of the conical roller bearings 29c is integrally formed with the input shaft 13b, and the inner ring 30d of the other conical roller bearing 29d is integrally formed with the output shaft 14a. In this example, because of this, the nuts 32a, 32b (see FIG. 3) for preventing the inner rings 30c, 30d from coming out are eliminated. Moreover, the inner-diameter dimension of the input gear 7 that is fastened around the outside of the input shaft 13b is larger than the outer-diameter dimension of the inner ring 30c. As a result, it is possible for the input gear 7 to pass over the inner ring 30c in the axial direction when mounting the input gear 7 onto the input shaft 13b or removing the input gear 7 from the input shaft 13b.

In this example, it is possible to reduce the number of parts and assembly steps, simplify construction, make the apparatus more compact and lightweight, and reduce manufacturing cost by eliminating the inner rings 30c, 30d and nuts 32a, 32b as independent parts; and it is possible to improve the strength of the large flange section of the inner rings 30c, 30d, and improve freedom of design of the pair of conical roller bearings 29c, 29d. The other construction and functions are the same as those of the first through seventh examples.

Ninth Example

FIG. 20 to FIG. 24C illustrate a ninth example of an embodiment of the present invention. In this example, the first encoder 10c that is fastened around the outside of the other end section of the connecting shaft 9 is made of a magnetic metal, and formed so as to have a L-shaped cross-sectional shape and so as to be a complete circular ring shape, and the outer circumference of the first encoder 10c includes a flat-tooth shaped first detected section 39a having sections with material removed and solid sections that are arranged in an alternating manner and at a uniform pitch in the circumferential direction. In other words, the first detected section 39a is formed by arranging plural convex sections 76 that protrude toward the outer-diameter side from a portion near that outer circumference of the first encoder 10c at a uniform pitch in the circumferential direction. In this example, the convex sections 76 of the first detected section 39a correspond to the solid sections, and the portions between convex sections 76 that are adjacent in the circumferential direction correspond to the sections with material removed.

The second encoder 11c that is fastened around the outside of the other end section of the output shaft 14 is made of a magnetic metal and formed into a complete cylindrical shape, and the tip-end half section of the second encoder 11c that protrudes in the axial direction from the other end surface of the output shaft 14 includes a comb-tooth shaped second detected section 40a having sections with material removed and solid sections that are arranged in an alternating manner and at a uniform pitch in the circumferential direction. In other words, the second detected section 40a includes plural tongue pieces 77 that extend toward the tip-end side in the axial direction of the middle section in the axial direction of the second encoder 11c, and that are arranged at a uniform pitch in the circumferential direction. The total number of tongue pieces 77 matches the total number of convex sections 76. Moreover, the width in the circumferential direction of the tongue pieces 77 that is expressed by a central angle, is the same as the width in the circumferential direction of the convex sections 76 that is expressed by a central angle. In this example, the tongue pieces 77 of the second detected section 40a correspond to the solid sections, and the portions between tongue pieces that are adjacent in the circumferential direction correspond to the sections with material removed.

In this example, the first detected section 39a and the second detected section 40a are arranged so as to be concentric with each other, with the inner-circumferential surface of the second detected section 40a closely facing the outer-circumferential surface of the first detected section 39a. In other words, the first detected section 39a and the second detected section 40a are arranged so as to overlap in the radial direction while maintaining concentricity. Moreover, when torque is not being transmitted, or in other words, when the torsion bar 15 is not undergoing elastic torsional deformation, there is no relative displacement in the direction of rotation between the first detected section 39a and the second detected section 40a, and in this state the first detected section 39a and the second detected section 40a are arranged so that the phases in the circumferential direction of the convex sections 76 and the tongue pieces 77 coincide with each other.

In this example, the sensor unit 12a is formed so as to be a complete circular ring shape, and is arranged on the outer-diameter side of the first detected section 39a and second detected section 40a so as to be concentric with the first detected section 39a and the second detected section 40a. The sensor unit 12a includes a magnetic stator 78, and plural coils 80 that are formed using one conducting wire 79. The stator 78 includes plural core sections 81 that extend in the radial direction and arranged at a uniform pitch in the circumferential direction, and a circular ring shaped rim section 82 that connects together the outer-diameter-side ends, which are the base ends of the core sections 81. The total number of core sections 81 matches the total number of tongue pieces 77 (total number of convex sections 76). Moreover, the width in the circumferential direction that is expressed by a central angle of the inner-diameter-side end surfaces, which are the tip-end surfaces of the core sections 81, is the same as the width in the circumferential direction of the tongue pieces 77 (width in the circumferential direction of the convex sections 76). In this example, the inner-diameter-side end surfaces of the core sections 81 closely face the outer-circumferential surface of the second detected section 40*a*. Moreover, the coils 80 are wound around the core sections 81 so that the directions of winding are opposite each other between coils that are adjacent in the circumferential direction. Therefore, the total number of coils 80 (core sections 81) is an even number (10 in the example in the figures), and the total number of convex sections 76 and the total number of tongue pieces 77 is also an even number.

In this example, the coils 80 have both a driving function for generating a magnetic field, and a detecting function for detecting change in the magnetic field. In other words, in this example, by applying a driving voltage to the coils 80 (conducting wire 79), a driving current flows in the coils 80, and between coils 80 that are adjacent in the circumferential direction, a loop shaped magnetic flux flows as illustrated by the bold arrows in FIG. 22 in the stator 78, and inside the first encoder 10 and second encoder 11*c*. In this state, as the first encoder 10*c* and second encoder 11*c* rotate together with the rotating-shaft unit 6, the density of the looped shaped magnetic flux changes periodically, and due to this, an induced current periodically flows in the coils 80. As a result, the output of the conducting wire 79, which is the output signal of the sensor unit 12*a* (voltage, electric current, or when the driving voltage is an alternating current voltage, the peak value or effective value of the alternating-current voltage or electric current) changes periodically as illustrated in FIG. 24C. Here, the frequency and period of the output of the conducting wire 79 are values that correspond to the rotational speed of the rotating-shaft unit 6. Therefore, by investigating the relationship between the frequency or period of the output of the conducting wire 79 and the rotational speed beforehand, the rotational speed of the rotating-shaft unit 6 can be found based on the frequency or period of the output of the conducting wire 79.

Furthermore, when torque is being transmitted, there is relative displacement in the direction of rotation between the first encoder 10*c* and the second encoder 11*c* due to elastic torsional deformation of the torsion bar 15, and as illustrated in order in FIG. 24A and FIG. 24B, the phases in the circumferential direction of the convex sections 76 and tongue pieces 77 of the first detected section 39*a* and second detected section 40*a* shift. As this happens, the widths in the circumferential direction of the magnetic paths inside the first encoder 10*c* and the second encoder 11*c*, which are the overlapping portions in the radial direction of the convex sections 76 and the tongue pieces 77, decrease. As a result, changing from the dashed line to the solid line in FIG. 24C, the size of the output of the conducting wire 79 decreases. Here, the shift in the phases in the circumferential direction between the convex sections 76 and the tongue pieces 77 (the amount of decrease in the width in the circumferential direction of the magnetic path) becomes larger the larger the torque is. Therefore, the size of the output of the conducting wire 79 decreases more the larger the torque is. However, the size of the output of the conducting wire 79 not only changes due to the torque, but also changes due to the rotational speed of the rotating-shaft unit 6. In other words, the size of the induced electric current that flows in the coils 80 (induced electromotive force in the coils 80) is proportional to the percentage of change in the magnetic flux in the coils 80. The percentage of change in the magnetic flux becomes larger in proportion to the rotational speed of the rotating-shaft unit 6. Therefore, the size (amplitude) of the output of the conducting wire 79 becomes larger in proportion to the rotational speed of the rotating-shaft unit 6. In this example, the effect that the torque has on the size of the output of the conducting wire 79 and the effect that the rotational speed of the rotating-shaft unit 6 has on the size of the output of the conducting wire 79 are investigated beforehand. Then, first, the rotational speed of the rotating-shaft unit 6 is found based on the frequency or period of the output of the conducting wire 79. The size of the output of the conducting wire 79 that changes due to the effect of the rotational speed is then corrected and returned to the original size. By doing so, it is possible to accurately find the torque based on the size of the corrected output. The driving electric voltage that is applied to the conducting wire 79 can be a direct-current voltage, however, is preferably an alternating-current voltage in order to improve the noise resistance.

In this example, the sensor unit 12*a* is a combination of a stator 78 and plural coils 80, and does not include precision electronic parts such as a magnetic detecting element, so has excellent resistance to heat and vibration. Moreover, only one output is used for measuring the rotational speed and torque, so when performing measurement, there is no need for performing complicated signal processing. Therefore, as the calculating device for performing this signal processing, it is possible to use an inexpensive device that does not have very high processing performance. The other construction and functions are the same as those of all the other examples.

When implementing the present invention, in this ninth example of an embodiment, it is also possible to use construction in which the direction that the tip-end surfaces of the core sections of the sensor unit face the detected section of the first encoder and the detected section of the second encoder is changed from the radial direction to the axial direction. In other words, the detected section of the first encoder and the detected section of the second encoder are a pair of annular shaped detected sections that have the same radial dimension as each other, and that are arranged so these detected sections overlap in the axial direction. Moreover, the core sections of the sensor unit are formed so as to extend in the axial direction. The tip-end surfaces of these core sections are made to face the pair of detected sections from one side in the axial direction, which is the direction that these detected sections overlap.

Tenth Example

FIG. 25 to FIG. 30 illustrate a tenth example of an embodiment of the present invention. In this example, the first encoder 10*d* that is fastened around the outside of the other end section of the connecting shaft 9 and the second encoder 11*d* that is fastened around the outside of the other end section of the output shaft 14 are made of a magnetic metal, and are formed into a complete circular ring shape, with the outer circumference of each including a comb-shaped detected section 39*b* (40*b*) of which sections having material removed and solid sections are arranged in an alternating manner and at a uniform pitch in the circumferential direction. In other words, the first detected section 39*b* of the first encoder 10*b* and the second detected section 40*b* of the second encoder 11*b* are such that the plural tongue pieces 77*a* (77*b*) that extend in the axial direction are arranged at a uniform pitch in the circumferential direction, and so that the base ends of the tongue sections 77*a* (77*b*) are connected together. Moreover, the shape and radial dimension of the first detected section 39*b* and the second detected section 40*b* are the same as each other, and are arranged so as to face the opposite direction in the axial direction. Together with this, the plural tongue pieces 77*a* of the first detected section 39b and the plural tongue pieces of the second detected section 40b are arranged one at a time in an alternating manner in the circumferential direction with a space in between in the circumferential direction. Particularly, in this example, when torque is not being transmitted, the widths in the circumferential direction of the portions between tongue pieces 77a, 77b that are adjacent in the circumferential direction are all the same. Furthermore, the widths in the circumferential direction of the portions between tongue pieces 77a, 77b and the widths in the circumferential direction of the tongue pieces 77a, 77b are the same as each other. The reason for this is, is to make the duty ratio $\epsilon$ 0.5 when torque is not being transmitted. In this example, the tongue pieces 77a (77b) of the first detected section 39b (second detected section 40b) correspond to the solid sections, and the portions between tongue pieces 77a (77b) that are adjacent in the circumferential direction correspond to the sections with material removed.

In this example, the sensor unit 12b includes a synthetic resin holder 41a, and one sensor 42c that is embedded in the tip-end section of the holder 41a, and the detecting section of the sensor 42c closely faces the outer-circumferential surfaces of the first detected section 39b and the second detected section 40b (portion where the tongue pieces 77a, 77b are arranged in an alternating manner in the circumferential direction). The sensor 42c includes a permanent magnet that is magnetized in the direction that the outer-circumferential surfaces of the first detected section 39b and second detected section 40b face the detecting section of the sensor 42c (radial direction in the example in the figures), and a magnetism detecting elements such as a Hall element, Hall IC, MR element and GMR element that are arranged on the end surface of both end surfaces in the magnetized direction of the permanent magnet that faces the outer-circumferential surfaces of the first detected section 39b and the second detected section 40b.

Figure 30:
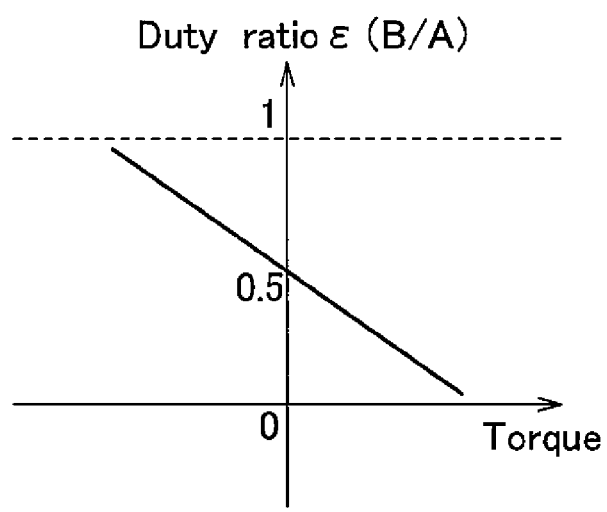
FIG. 30 is a graph illustrating the relationship between duty ratio ε of the output signal of a sensor and the torque in the tenth example of an embodiment of the present invention.

In this example, the output signal of the sensor 42c of the sensor unit 12b changes periodically as the first encoder 10d and the second encoder 11d rotate together with the rotating-shaft unit 6. Moreover, when torque is being transmitted by the rotating-shaft unit 6, the first encoder 10d and the second encoder 11d are displaced relative to each other in the direction of rotation due to elastic torsional deformation of the torsion bar 15, and the widths in the circumferential direction between the tongue pieces 77a, 77b that are adjacent in the circumferential direction change. More specifically, the widths in the circumferential direction of every other in-between portion in the circumferential direction become larger, and the widths in the circumferential direction of the remaining in-between sections become smaller. As a result, in the order as illustrated in FIG. 29A to FIG. 29B the duty ratio $\epsilon$ (=time ratio B/A) of the output signal from the sensor 42c changes. Here, the amount that the widths in the circumferential direction of the portions between tongue pieces 77a, 77b that are adjacent in the circumferential direction become larger (smaller) is a value that corresponds to the torque, so the duty ratio c is also a value that corresponds to this torque. Therefore, as illustrated in FIG. 30, by investigating beforehand the relationship between the duty ratio c and the torque, the torque can be found based on the duty ratio E. Furthermore, in this example, the 2-pulse period A of the output signal of the sensor 42c is a value that corresponds to the rotational speed of the rotating-shaft unit 6. Therefore, by investigating beforehand the relationship between the 2-pulse period A and the rotational speed, the rotational speed can be found based on the 2-pulse period A.

In this example, the first detected section 39b of the first encoder 10d and the second detected section 40b of the second encoder 11d overlap in the circumferential direction, so it is possible to make the dimension in the axial direction of the portions where the first detected section 29b and the second detected section 40b are located shorter, and thus it is possible to conserve space by that amount. Moreover, there only needs to be one magnetism detecting element assembled in the sensor unit 12b, so the cost of the sensor unit 12b can be suppressed. The other construction and functions are the same as those of all the other examples.

Eleventh Example

Figure 31:
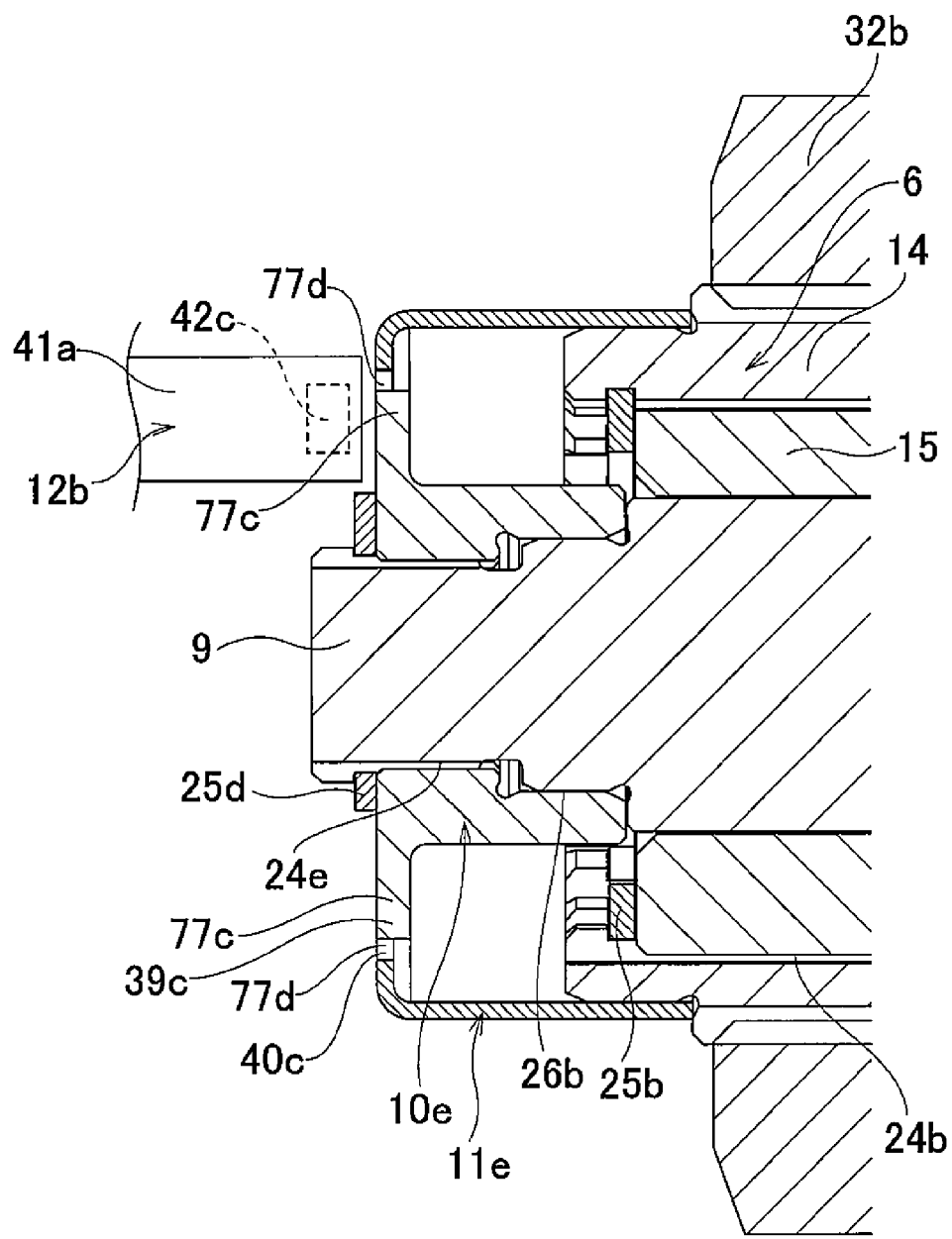
FIG. 31 is a partial enlarged cross-sectional view of an eleventh example of an embodiment of the present invention, and is similar to FIG. 5.
Figure 32:
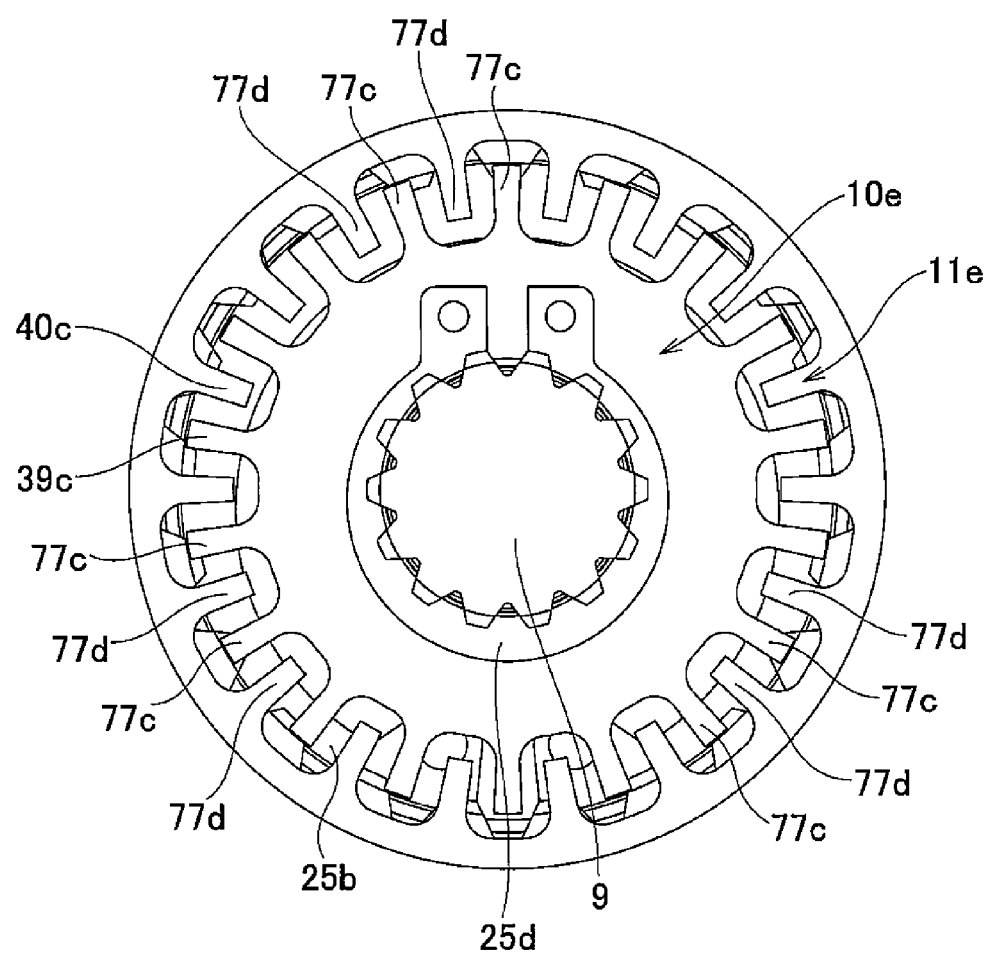
FIG. 32 is a view of the eleventh example of an embodiment of the present invention as seen from the left in FIG. 31.
Figure 33:
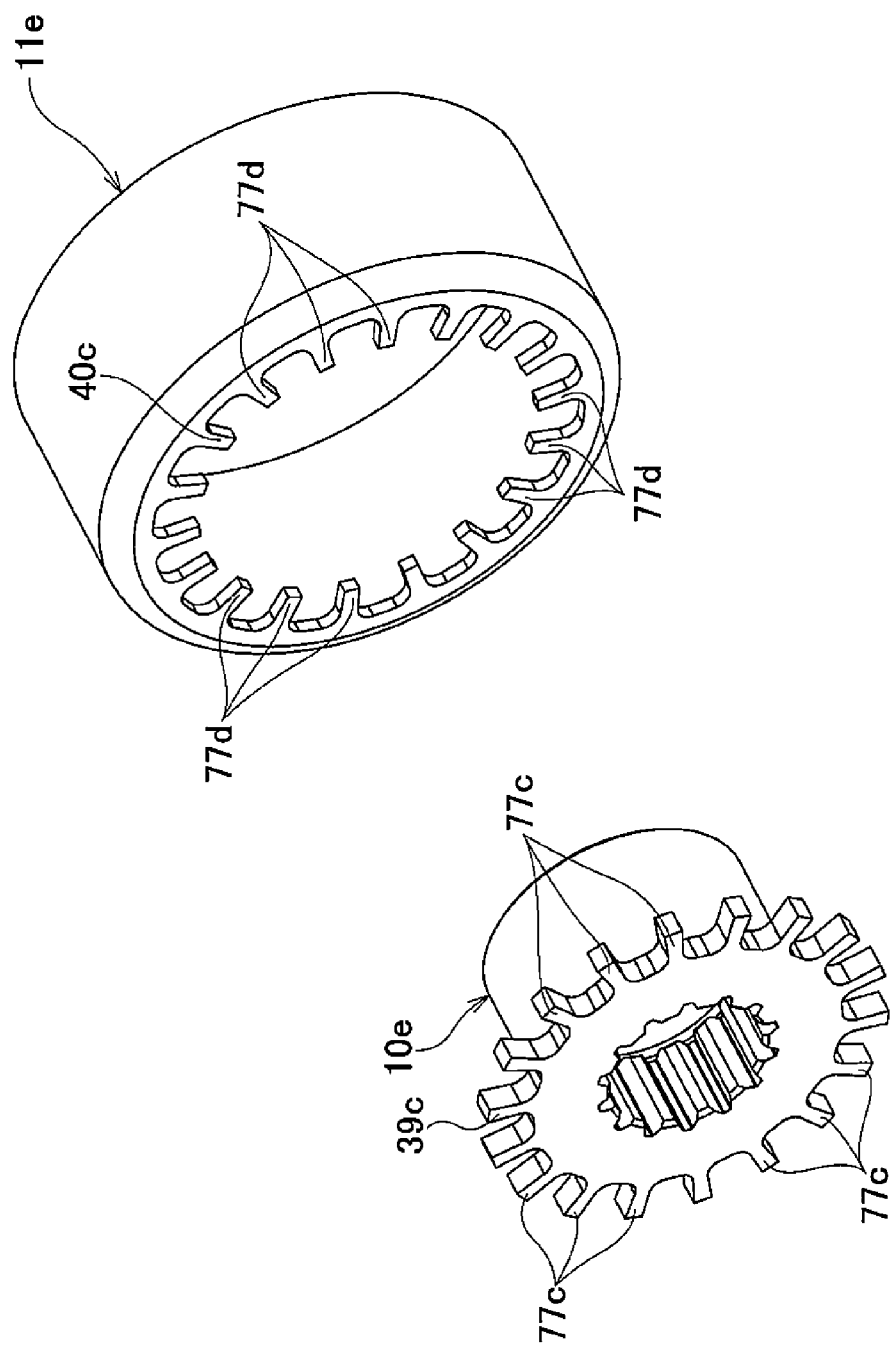
FIG. 33 is an exploded perspective view of a first encoder and second encoder in the eleventh example of an embodiment of the present invention.
Figure 34:
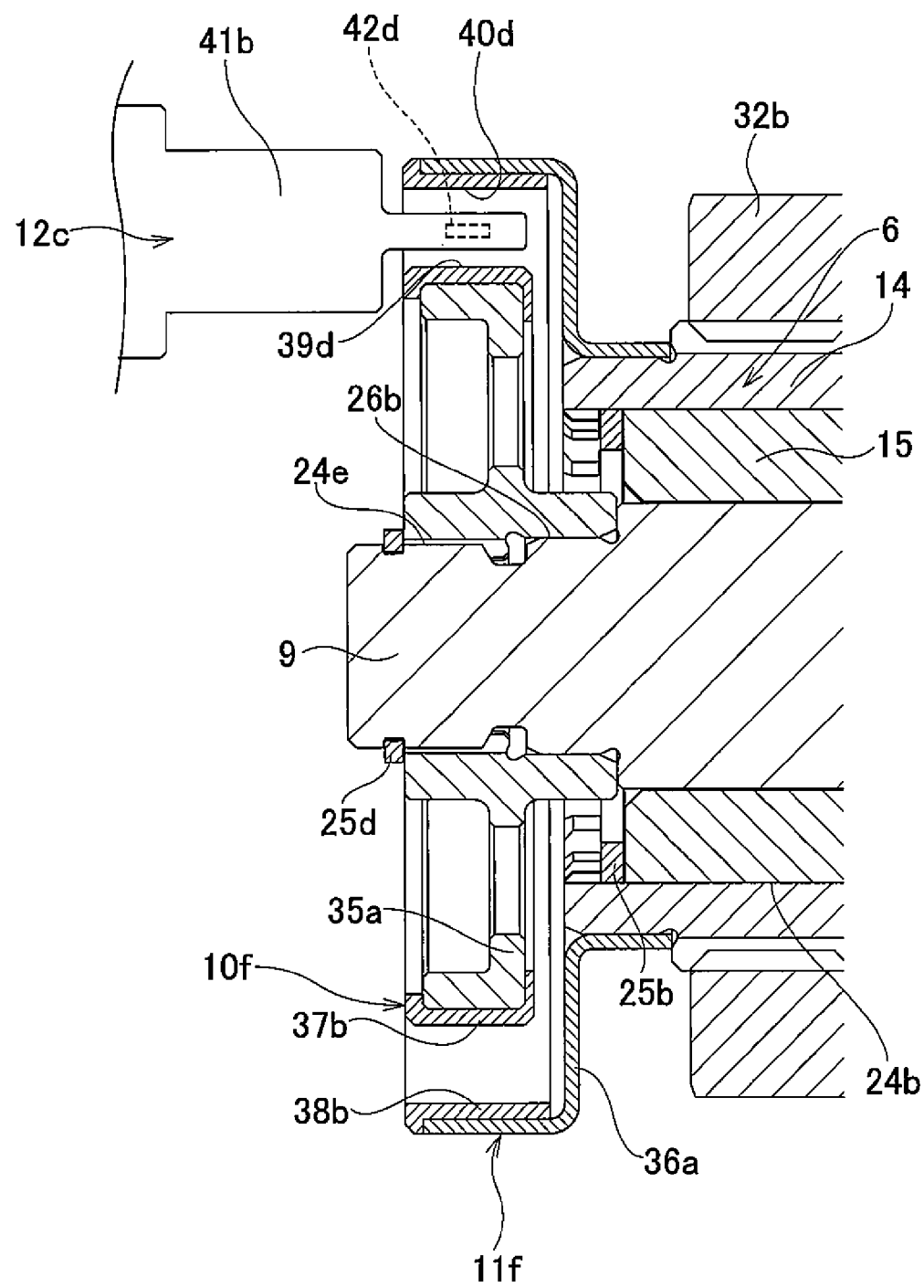
FIG. 34 is a partial enlarged cross-sectional view of a twelfth example of an embodiment of the present invention, and is similar to FIG. 5.
Figure 35:
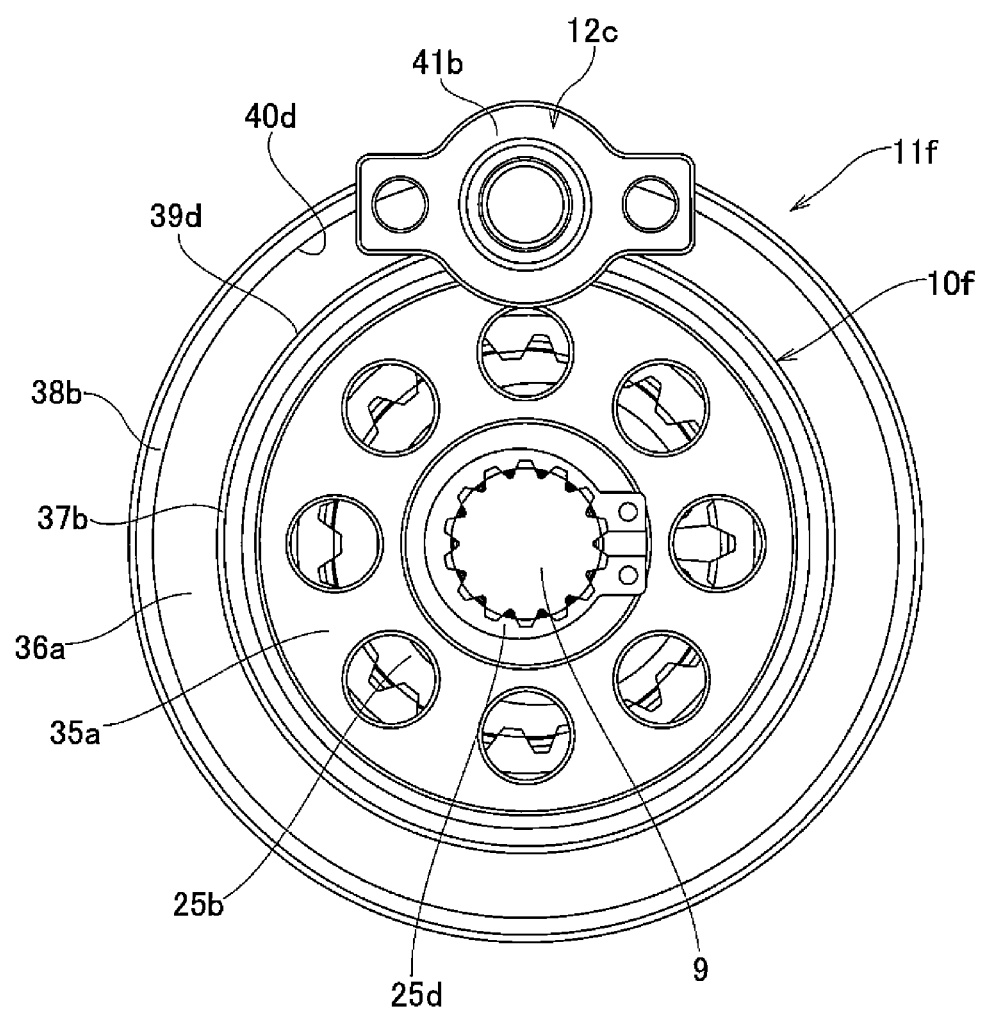
FIG. 35 is a view of the twelfth example of an embodiment of the present invention as seen from the left in FIG. 34.

FIG. 31 to FIG. 33 illustrate an eleventh example of an embodiment of the present invention. In this example, the first detected section 39c of the first encoder 10e that is fastened around the outside of the other end section of the connecting section 9, and the second detected section 40c of the second encoder 11e that is fastened around the outside of the other end section of the output shaft 14 are formed in a comb-like annular shape. Together with this, when the positions in the axial direction of the first detected section 39c and the second detected section 40c match, the tongue pieces 77c of the first detected section 39c and the tongue pieces 77d of the second detected section 40c are arranged in an alternating manner in the circumferential direction with spaces in between in the circumferential direction. The detecting section of one sensor 42c of the sensor unit 12b faces in the axial direction the side surfaces in the axial direction of the portions where the tongue pieces 77c, 77d are arranged. Except for changing the shape of the first detected section 39c and the second detected section 40c to an annular shape, and changing the direction that the first detected section 39c and the second detected section 40c face the detecting section of the sensor 42c to the axial direction, the construction and functions of the other portions are the same as those of the tenth example.

Twelfth Example

FIG. 34 to FIG. 37 illustrate a twelfth example of an embodiment of the present invention. In this example, the first encoder 10f that is fastened to and supported by the other end section of the connecting shaft 9 includes a circular ring-shaped metal core 35a that is made of a magnetic material and that is fastened around the outside of the other end section of the connecting shaft 9, and a cylindrical-shaped permanent magnet 37b that is fastened to the outer-circumferential surface of a cylindrical section that exists on the outer circumferential section of the metal core 35a. There are S poles and N poles that are arranged in an alternating manner and at a uniform pitch in the circumferential direction on the first detected section 39d, which is the outer-circumferential surface of the permanent magnet 37b. On the other hand, the second encoder 11f that is fastened to and supported by the other end section of the output shaft 14 includes a circular ring-shaped metal core 36a that is made of a magnetic metal and that is fastened around the outside of the other end section of the output shaft 14, and a cylindrical shaped permanent magnet 38b that is fastened to the inner-circumferential surface of a cylindrical section that exists on the outer circumferential section of the metal core 36a. The second detected section 40d, which is the inner-circumferential surface of the permanent magnet 38b, is arranged on the outer-diameter side of the first detected section 39d so as to be concentric with the first detected section 39d with a specified space in the radial direction in between. In other words, the first detected section 39d and the second detected section 40d face each other through the specified space in the radial direction. There are S poles and N poles that are arranged in an alternating manner and at a uniform pitch in the circumferential direction on the second detected section 40d as well. The total number of magnetic poles (S poles, N poles) that are arranged on the second detected section 40d and the total number of magnetic poles that are arranged on the first detected section 39d coincide with each other. Moreover, when torque is not being transmitted, the first detected section 39d and the second detected section 40d are arranged so that when concentric with each other, different poles face each other in the radial direction.

In this example, the sensor unit 12c includes a synthetic resin holder 41b and one sensor 42d that is embedded in the tip-end section of the holder 41b, and the sensor 42d is arranged in a central location in the radial direction between the first detected section 39d and the second detected section 40d. A magnetism detecting element such as a Hall element, a Hall IC, a MR element, a GMR element or the like is assembled in the detecting section of the sensor 42d, and the sensitivity direction of the magnetism detecting element coincides with the radial direction of the first detected section 39d and second detected section 40d in the center of the magnetism detecting element.

FIG. 36A and FIG. 36B illustrate a state in this example when torque is not being transmitted, or in other words a state in which there is no relative displacement in the direction of rotation between the first detected section 39d and the second detected section 40d, and a state when torque is being transmitted, or in other words a state in which there is relative displacement in the direction of rotation between the first detected section 39d and the second detected section 40d. The direction of sensitivity of the magnetism detecting element is in the up-down direction in FIG. 36A and FIG. 36B, and the magnetic flux density in the up-down direction is proportional to the size of the output (voltage, current) of the magnetism detecting element, which is the output signal of the sensor unit 12c. In a state in which torque is not being transmitted, as illustrated in FIG. 36A, poles that are different from each other of the first detected section 39d and second detected section 40d face each other in the radial direction, so the direction of the magnetic flux that passes through the magnetism detecting element coincides overall with the direction of sensitivity. In other words, in this state, the magnetic flux in this direction of sensitivity becomes maximum, and therefore the output of the magnetism detecting element becomes maximum. On the other hand, in a state in which torque is being transmitted, as illustrated in FIG. 36B, the positional relationship of poles that different from each other of the first detected section 39d and the second detected section 40d shifts in the circumferential direction, so the direction of the magnetic flux that passes through the magnetism detecting element is inclined overall with respect to the direction of sensitivity of the magnetism detecting element. In other words, in this state, the magnetic flux density in the direction of sensitivity of the magnetism detecting element decreases by the amount of this inclination, so the output of the magnetism detecting element also decreases by that amount. Here, the size of the inclination of the direction of sensitivity of the magnetism detecting element with respect to the direction of the magnetic flux becomes larger the larger the torque (shift in the circumferential direction) becomes. Therefore, the output of the magnetism detecting element becomes maximum when the torque is zero, and becomes smaller as the torque becomes larger.

Figure 37:
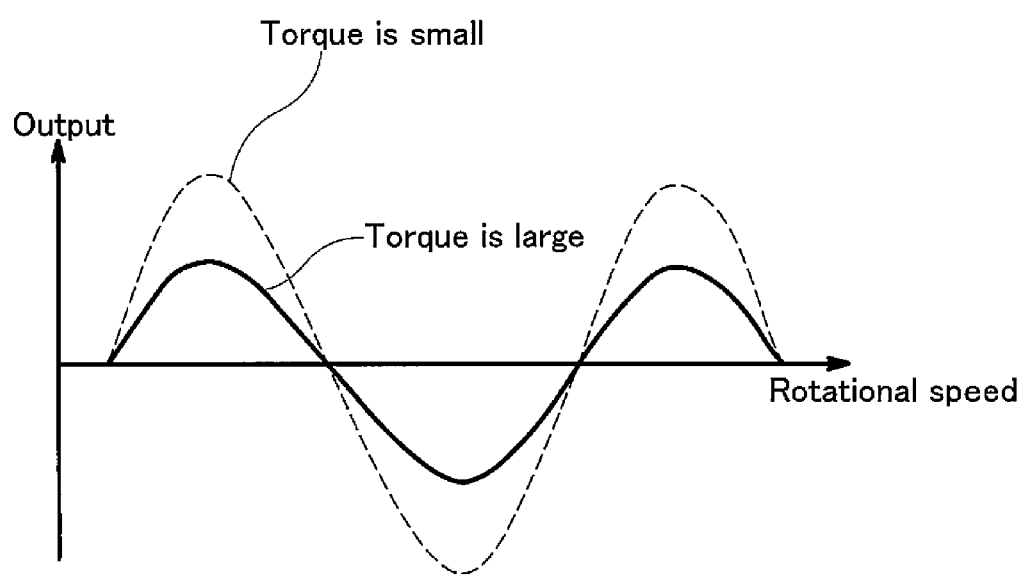
FIG. 37 is a graph illustrating the output signal of a sensor unit in the twelfth example of an embodiment of the present invention.

Incidentally, when torque is being transmitted, the first detected section 39d and the second detected section 40d rotate together with the rotating-shaft unit 6. Therefore, the output of the magnetism detecting element, as illustrated in FIG. 37, has a sinusoidal shape. As described above, the size (amplitude) of the output of the magnetism detecting element becomes smaller as the torque becomes larger. Therefore, by investigating the relationship between the size of the output and the torque beforehand, the torque can be found based on the size of the output of the magnetism detecting element. Furthermore, the frequency and period of the output of the magnetism detecting element are values that correspond to the rotational speed of the rotating-shaft unit 6. Therefore, by investigating beforehand the relationship between the frequency or period and the rotational speed, the rotational speed of the rotating-shaft unit 6 can be found based on the frequency or period of the magnetism detecting element.

When implementing this example, when torque is not being transmitted, the arrangement of the magnetic poles of the first detected section 39d and the second detected section 40d can be such that the electrical angle is shifted 90 degrees with respect to the circumferential direction (in other words, the center of a magnetic pole of one detected section faces the boundary between magnetic poles of the other detected section in the radial direction). In this case, opposite from the case explained above, the output of the magnetism detecting element becomes a minimum when torque is not being transmitted, and becomes larger as the transmitted torque becomes larger.

Moreover, when implementing this example, it is also possible to use a coil instead of using a magnetism detecting element as the detecting section of the sensor 42d of the sensor unit 12c. When using a coil, the center axis of the coil is made to coincide with radial direction of the first detected section 39d and the second detected section 40d. When using this kind of construction, as the first detected section 39d and the second detected section 40d rotate together with the rotating-shaft unit 6, the direction and size of the magnetic flux that passes through the coil changes periodically, so the output (voltage, current) of the coil, which is the output signal of the sensor unit 12d, changes periodically. The frequency and period of the output of the coil are values that correspond to the rotational speed of the rotating-shaft unit 6, so the rotational speed of the rotating-shaft unit 6 can be found based on the frequency and period of the output of the coil. Moreover, the magnetic flux density that passes vertically through the coil changes according to the size of the torque (amount of shift in the circumferential direction between poles that are different from each other of the first detected section 39d and the second detected section 40d). Therefore the size of the output of the coil changes according to the size of the torque. However, as in the case of the sensor unit 12a of the ninth example of an embodiment (see FIG. 20 to FIG. 23), the size of the output of the coil also changes according to the rotational speed of the rotating-shaft unit 6. Therefore, as in the case of the ninth example of an embodiment, the size of the output of the coil that is affected by and changed by the rotational speed is corrected and returned to the original size. By doing so, the torque can be accurately found based on the size of the corrected output.

In this example as well, there only needs to be one sensor 42d assembled in the sensor unit 12c, so it is possible to keeps costs of the sensor unit 12c down. The other construction and functions are the same as those of all the other examples.

When implementing the present invention, construction can also be employed in this twelfth example of an embodiment in which the direction that the detected section of the first encoder and the detected section of the second encoder face the detecting section of the one sensor of the sensor unit is changed from the radial direction to the axial direction. In other words, in that case, the detected section of the first encoder and the detected section of the second encoder are a pair of annular shaped detected sections having radial dimensions that are the same as each other, and these detected sections are arranged so as to face in the axial direction. The detecting section of the one sensor of the sensor unit is arranged between these detected sections.

Thirteenth Example

Figure 38:
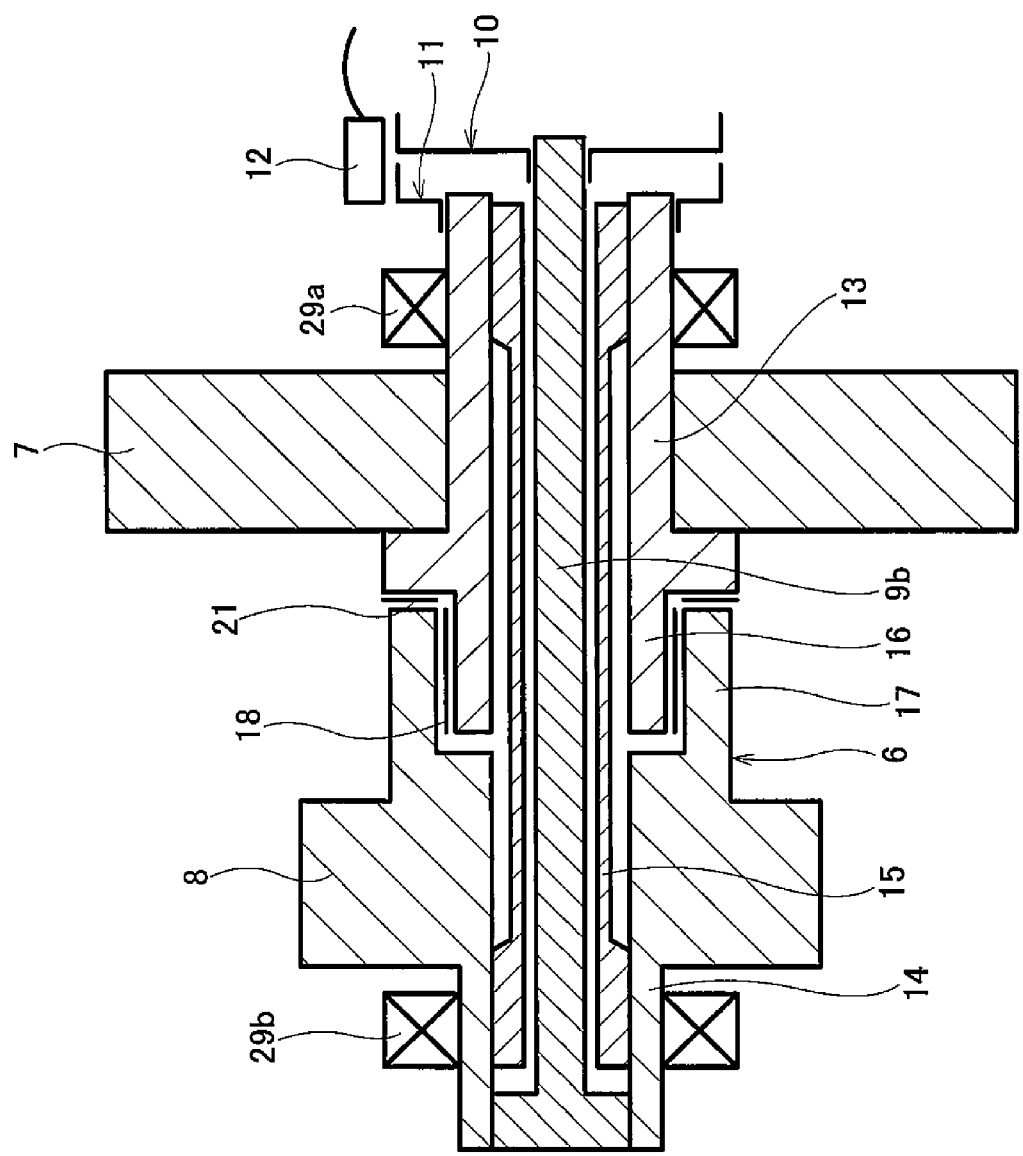
FIG. 38 is a cross-sectional view illustrating a thirteenth example of an embodiment of the present invention.
Figure 39:
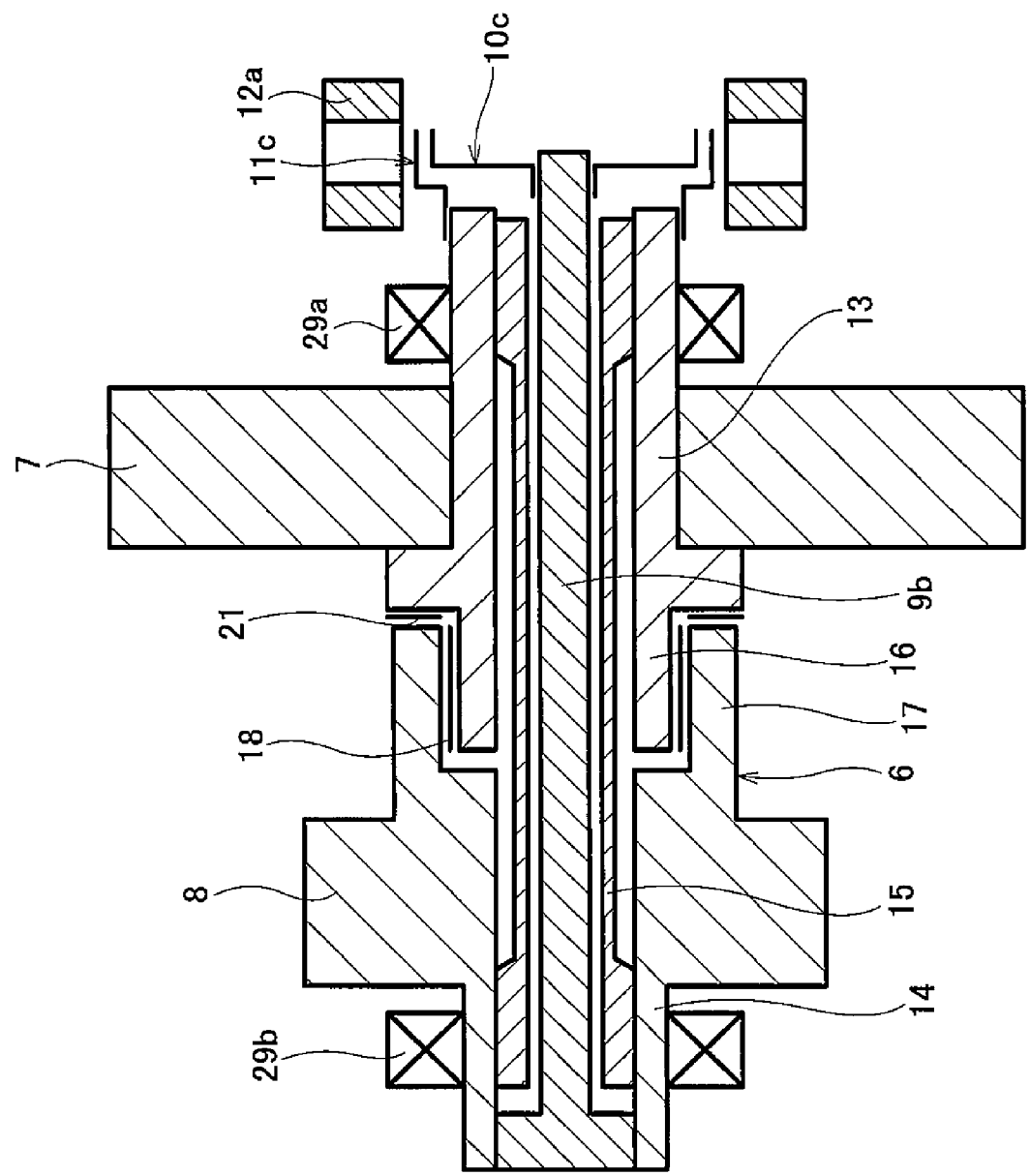
FIG. 39 is a cross-sectional view illustrating a fourteenth example of an embodiment of the present invention.
Figure 40:
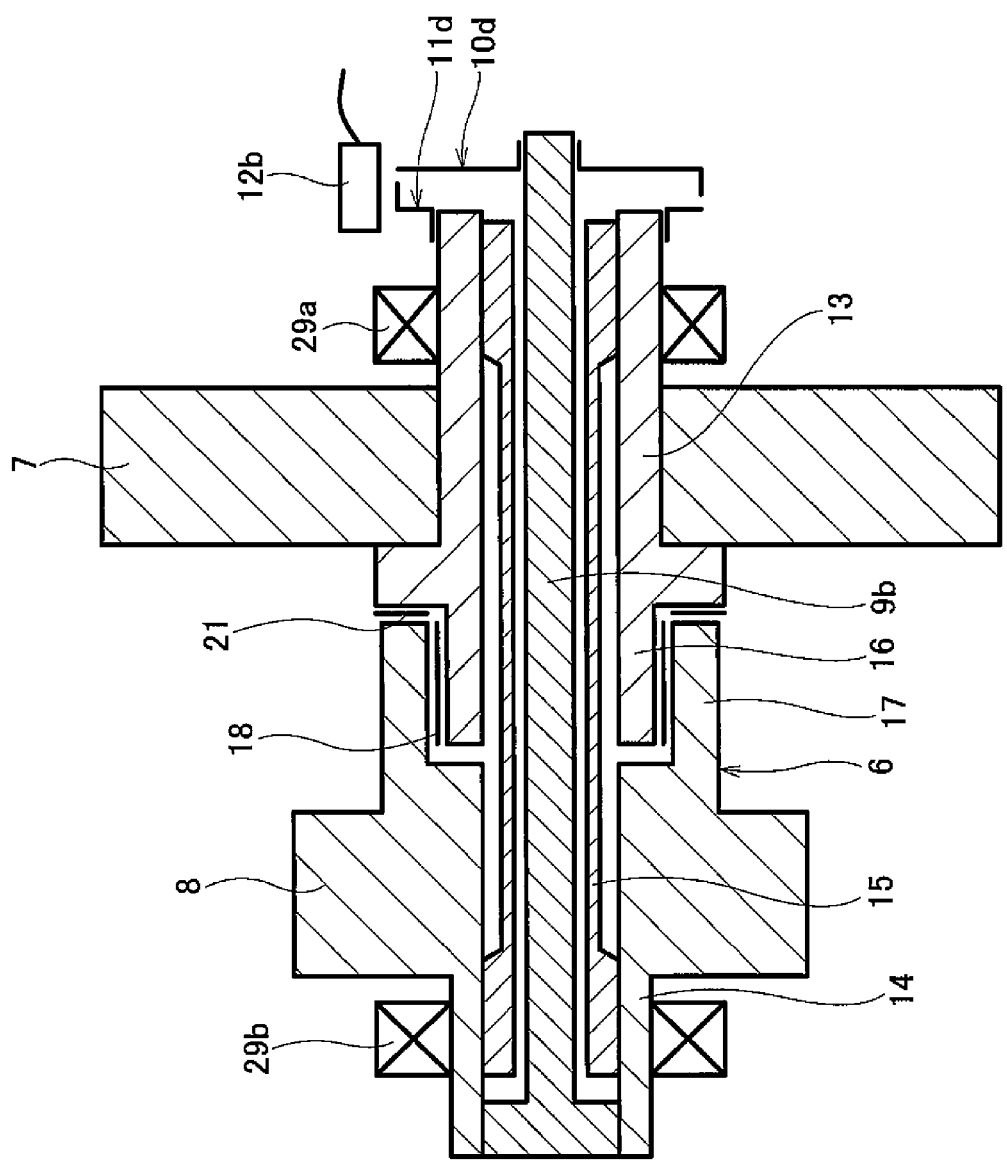
FIG. 40 is a cross-sectional view illustrating a fifteenth example of an embodiment of the present invention.
Figure 41:
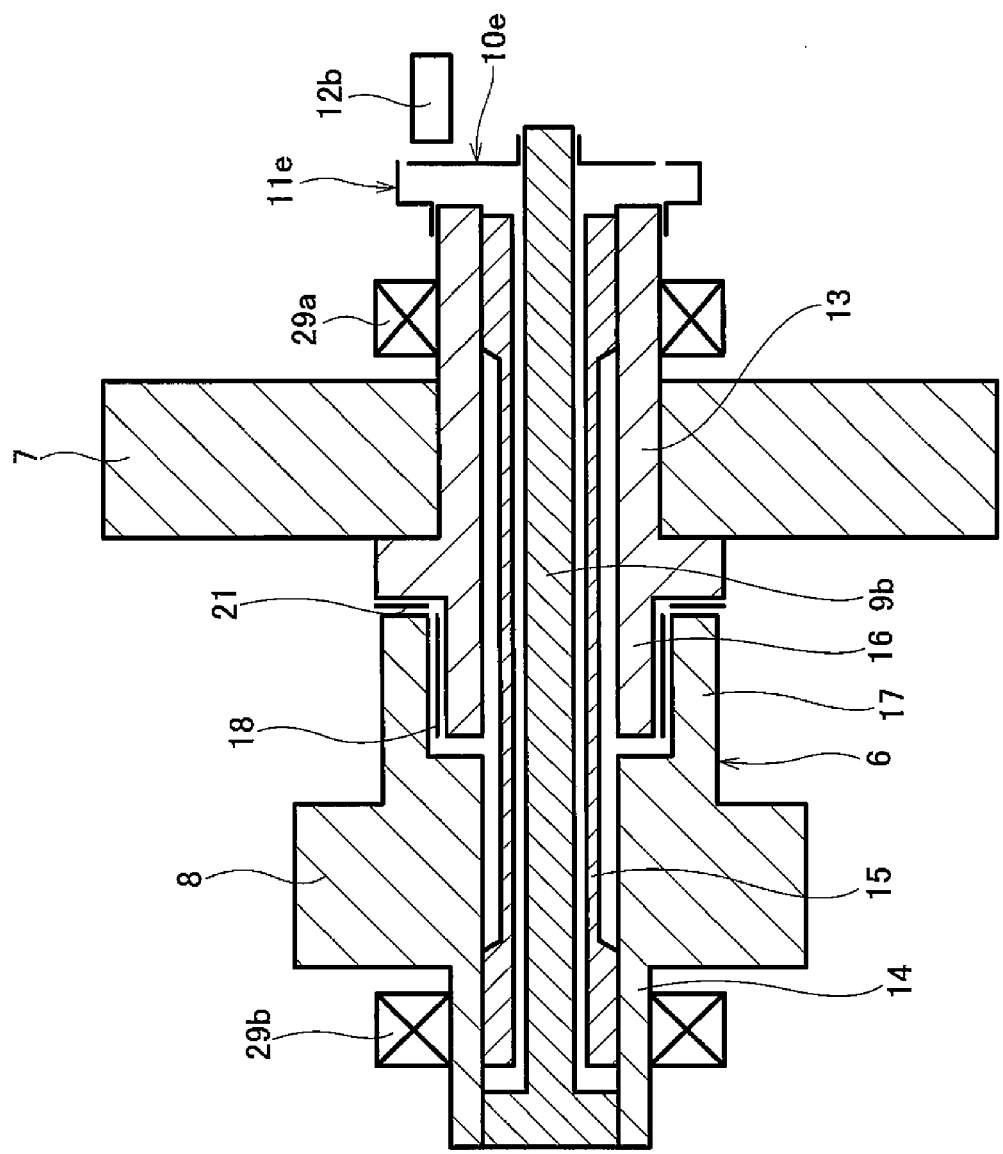
FIG. 41 is a cross-sectional view illustrating a sixteenth example of an embodiment of the present invention.
Figure 42:
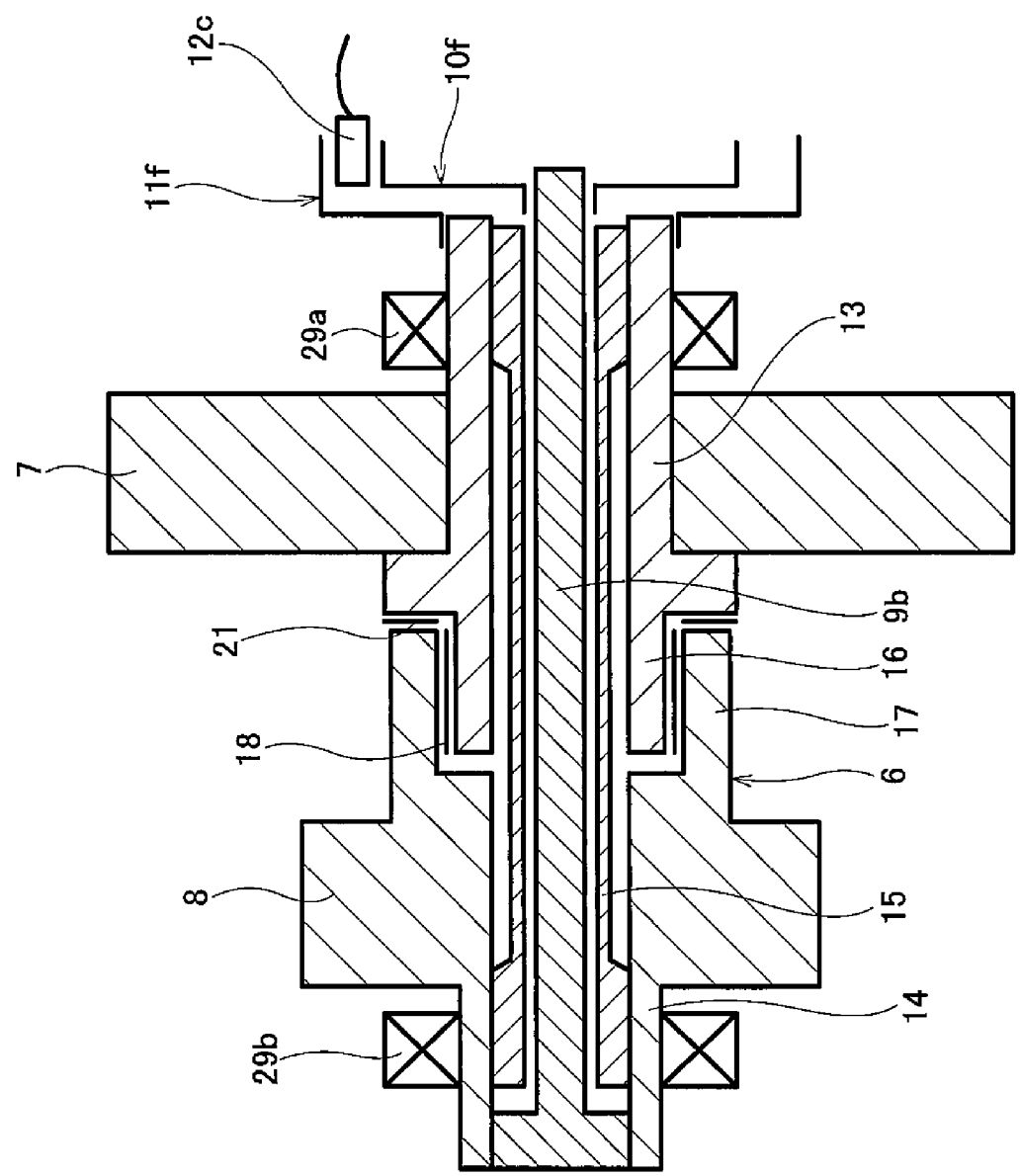
FIG. 42 is a cross-sectional view illustrating a seventeenth example of an embodiment of the present invention.

FIG. 38 illustrates a thirteenth example of an embodiment of the present invention. This example is a variation of the first example of an embodiment. In other words, in the first example of an embodiment, the first encoder 10, the second encoder 11 and the sensor unit 12 were arranged so as to be concentrated around the other end section of the output shaft 14, however, in this example, the first encoder 10, the second encoder 11 and the sensor unit 12 are arranged so as to be concentrated around the other end section of the input shaft 13. Therefore, in this example, the outer-circumferential surface of one end section (left end section in FIG. 38) of the connecting shaft 9b that is arranged on the inner-diameter side of the torsion bar 15 is connected to the inner-circumferential surface of the other end section of the output shaft 14 by an involute spline engagement, key engagement or the like so that relative rotation is not possible. Moreover, by using retaining rings not illustrated in the figure, the connecting shaft 9b is prevented from displacing in the axial direction with respect to the output shaft 14. In this state, the other end section (right end section in FIG. 38) of the connecting shaft 9b protrudes from the opening on the other end section of the input shaft 13. The first encoder 10 is fastened around the outside of the other end section of the connecting shaft 9b, and the second encoder 11 is fastened around the outside of the other end section of the input shaft 13. Furthermore, the detecting sections of a pair of sensors of the sensor unit 12 are made to face the detected sections of the first encoder 10 and the second encoder 11, and in this state, the sensor unit 12 is supported by a housing not illustrated in the figure. FIG. 38 is a simplified drawing and part of the drawing and reference numbers are omitted. The other construction and functions are the same as those of the first example.

Fourteenth to Seventeenth Examples

FIG. 39 to FIG. 42 illustrate a fourteenth to seventeenth examples of embodiments. The fourteenth to seventeenth examples are variations of the ninth to twelfth examples of embodiments, where the first encoder 10c (10d, 10e, 100, the second encoder 11c (11d, 11e, 11f) and sensor unit 12a (12b, 12c) are arranged so as to be concentrated around the other end section of the input shaft 13. The construction of the connecting shaft 9b is the same as in the thirteenth example. The other construction and functions are the same as those of the ninth to twelfth examples.

Eighteenth Example

Figure 43:
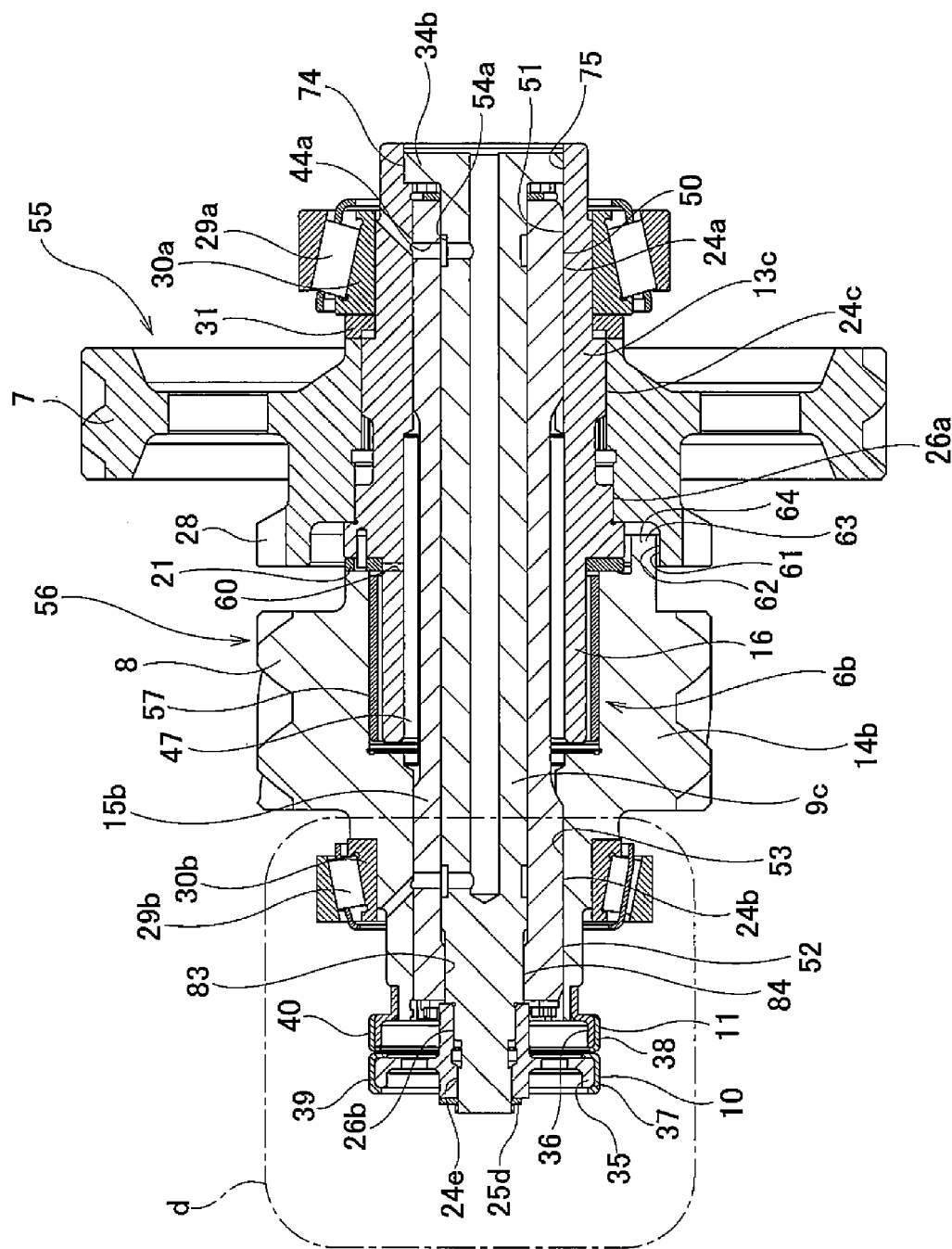
FIG. 43 is a cross-sectional view illustrating an eighteenth example of an embodiment of the present invention.
Figure 44:
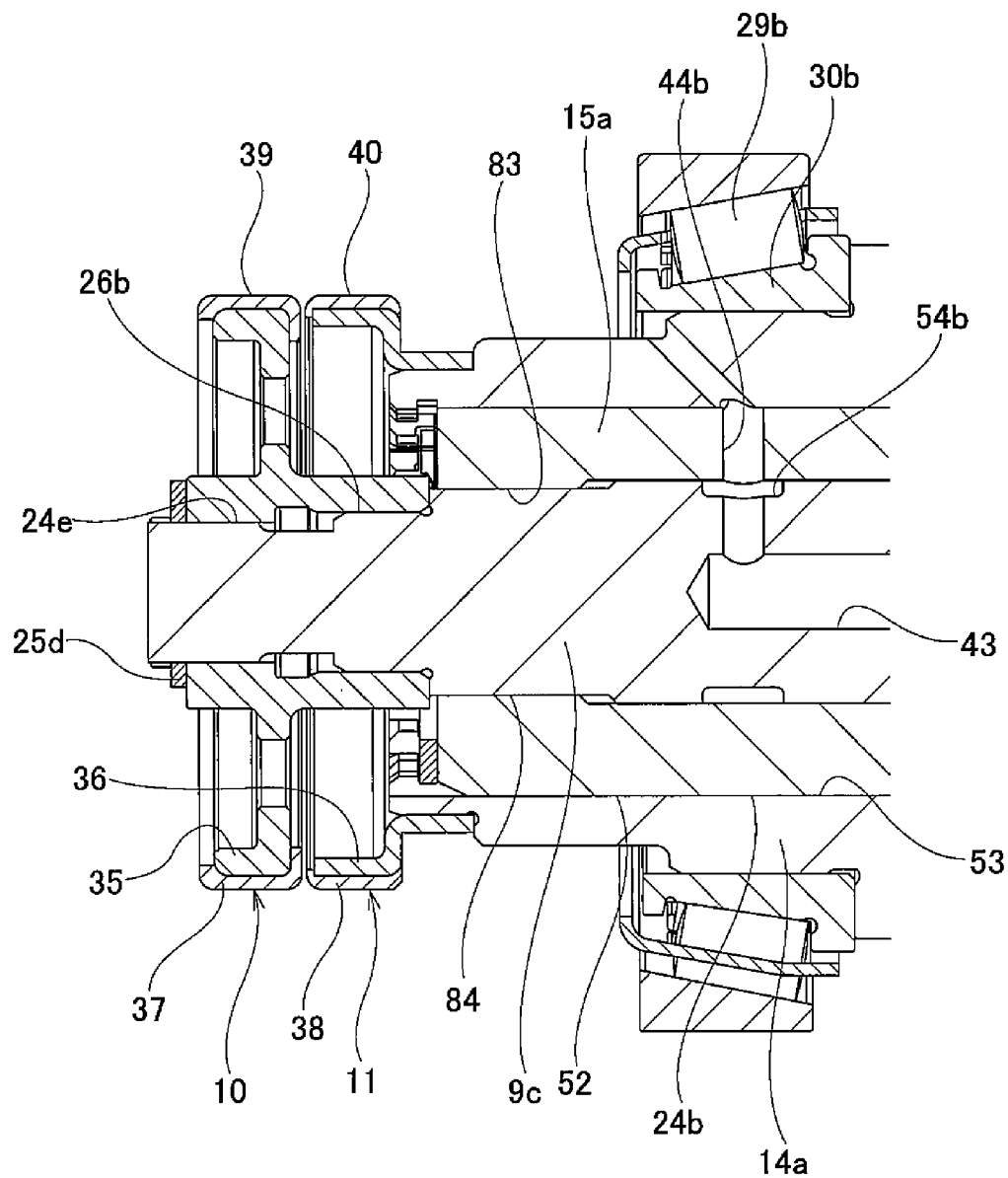
FIG. 44 is an enlarged view of part 'd' in FIG. 43.

FIG. 43 and FIG. 44 illustrate an eighteenth example of an embodiment of the present invention. In this example, a guiding surface 83 of which the inner-diameter dimension is smaller than the other portions is formed on the inner-circumferential surface of the other end section of the torsion bar 15b. Moreover, a guided surface 84 is provided in the portion near the other end of the middle section of the connecting shaft 9c that is arranged on the inner-diameter side of the torsion bar 15b that faces the guiding surface 83 in the radial direction. In this example, the guiding surface 83 and the guided surface 84 closely face each other in the radial direction with a gap between them, and the guided surface 84 is guided and supported by the guiding surface 83. The size of the gap is preferably as small as possible, and is preferably 100 μm or less, and the fitting tolerance is preferably H7/g6 or H7/g7.

In this example, as in the seventh example of an embodiment, a cylindrical surface 74, which is the outer-circumferential surface of an outward-facing flange-shaped rim section 34b that is formed around the outer-circumferential surface of one end section of the connecting shaft 9c is fastened with a pressure fit around the inside of a cylindrical surface 75 that is formed around the inner-circumferential surface of the other end section of the input shaft 13c. In other words, the pair of retaining rings (25a, 25b) for preventing the rim section (connecting shaft) from moving in the axial direction are omitted. Furthermore, in this example, the nut for pressing the inner ring 30a from the outer-circumferential surface of the other end section of the input shaft 13c is omitted, and the nut for pressing the inner ring 30 from the outer-circumferential surface of the other end section of the output shaft 14b is also omitted, so it is possible to reduce the number of parts.

In this example, the connecting shaft 9c is supported at two locations of the rim section 34b that is provided on the one end section and the guided section 84 that is provided on a portion near the other end of the middle section (both-end-fixed beam type of support construction) that are separated in the axial direction with respect to the rotating-shaft unit 6b (input shaft 13c and torsion bar 15b). Therefore, even in areas (areas of high torque, high-speed rotation) where the rotational vibration of the rotating shaft 6b becomes large, when compared with construction in which the connecting shaft is supported at only one location of the rim section that is provided on one end section of the connecting shaft (cantilever type support construction), it is possible to suppress the rotational vibration of the connecting shaft 9c. As a result, vibration of the first encoder 10 that is fastened to the other end section of the connecting shaft 9c is suppressed, so a decrease in the torque measurement performance due to vibration of the first encoder 10 is prevented.

Moreover, it is possible to perform surface treatment of the guided surface 84 in order to prevent the occurrence of wear. More specifically, tempering and annealing are performed on the connecting shaft 9c in order to regulate the range of hardness to be within the range HRC 30 to 50, after which a surface treatment selected from one of the following is performed on the guided surface 84:

(1) process of forming a solid lubricant film (Defric coating) by performing a shot peening process of spraying and depositing particles of a solid lubricant such as molybdenum disulfide, tungsten disulfide, PTFE and the like onto the surface;

(2) process of forming diamond like carbon (DLC) by a plasma CVD method or sputtering method;

(3) process of forming a metal coating (for example 10 μm or less film) of a metal such as a gold, copper, silver, zinc, lead, tin, titanium, nickel, aluminum is formed by shot peening or plating;

(4) process of forming a chemical conversion film by a phosphating process using manganese phosphate, zinc phosphate, zinc calcium phosphate or the like;

(5) process of forming an oxide film by tri-iron tetroxide film processing (black dyeing);

(6) process of forming a hard coating using a hard chromium plating, nickel zinc plating, electroless nickel plating or the like.

After performing a surface treatment that is selected from (1) to (6) above, a lubricant such as lubricating oil or grease can be applied to the guided surface 84.

With this kind of construction, excessive wear of the guided surface 84 due to rubbing with the guiding surface can be effectively prevented. Therefore, generated abrasion powder can be effectively prevented from entering into the areas of engagement between gears or in areas of rolling contact, which causes a decrease in the life of the parts. The other construction and functions are the same as those of all the other examples.

Nineteenth Example

Figure 45:
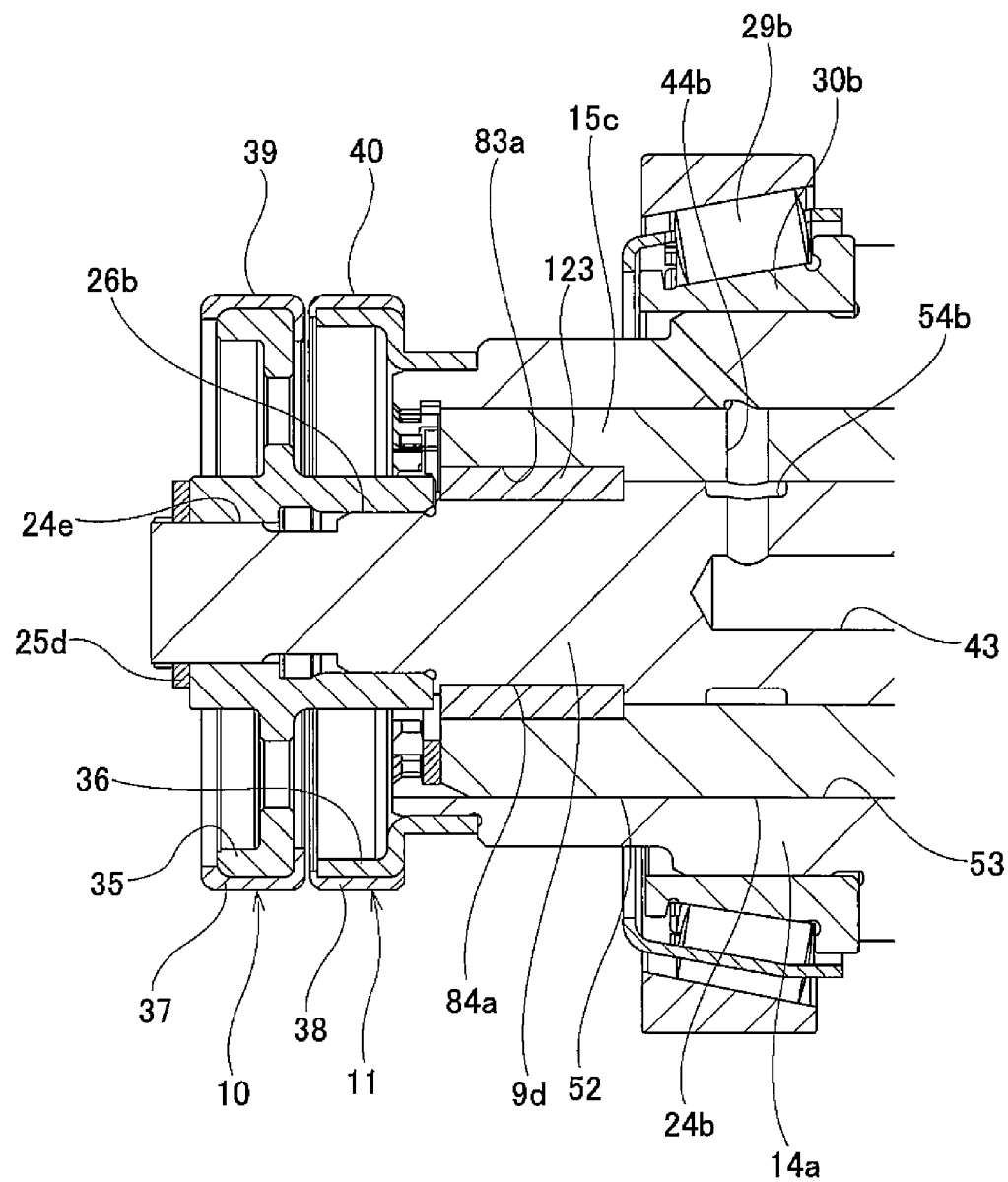
FIG. 45 is a view of a nineteenth example of an embodiment of the present invention, and corresponds to FIG. 44.

FIG. 45 illustrates a nineteenth example of an embodiment of the present invention. In this example, a guiding surface 83*a* of which the inner-diameter dimension is larger than the other portions is formed on the inner-circumferential surface of the other end section of the torsion bar 15. Moreover, a guided surface 84*a* is provided on the portion near the other end of the middle section of the connecting shaft 9*d* that is arranged on the inner-diameter side of the torsion bar 15*c* that faces the guiding surface 83*a* in the radial direction. A ring-shaped bushing 123 that is separate from the torsion bar 15*c* and connecting shaft 9*d* is located between the guiding surface 83*a* and the guided surface 84*a*. It is possible to use a sliding bearing or radial needle bearing, for example, as the bushing 123.

In this example, there is no direct rubbing between the guiding surface 83*a* and the guided surface 84*a*, so the occurrence of abrasion powder that is caused by wear of the guiding surface 83*a* and the guided surface 84*a* is effectively prevented. Moreover, there is no need to perform a finishing process or surface treatment of the guiding surface 83*a* and guided surface 84*a* in order to prevent wear, so it is possible to keep processing costs of the device down. The other construction and functions are the same as those of the first example through eighth example.

Twentieth Example

Figure 46:
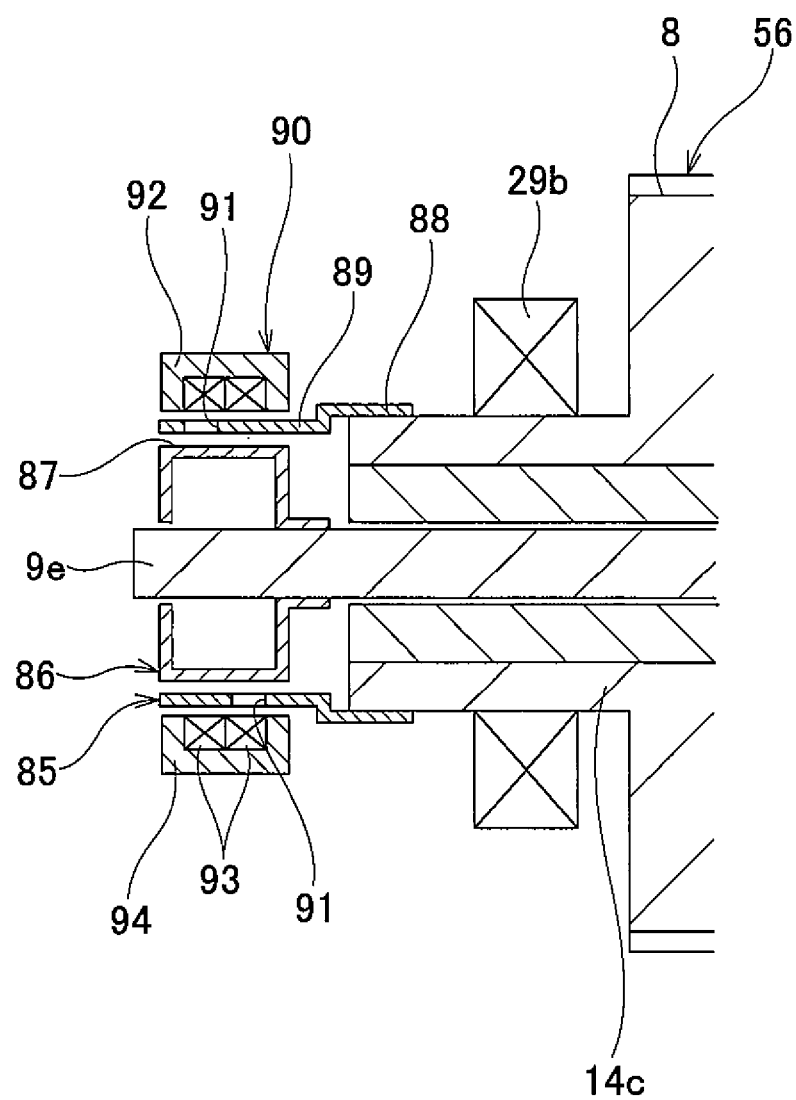
FIG. 46 is a schematic view of a twentieth example of an embodiment of the present invention, and corresponds to FIG. 44.
Figure 47:
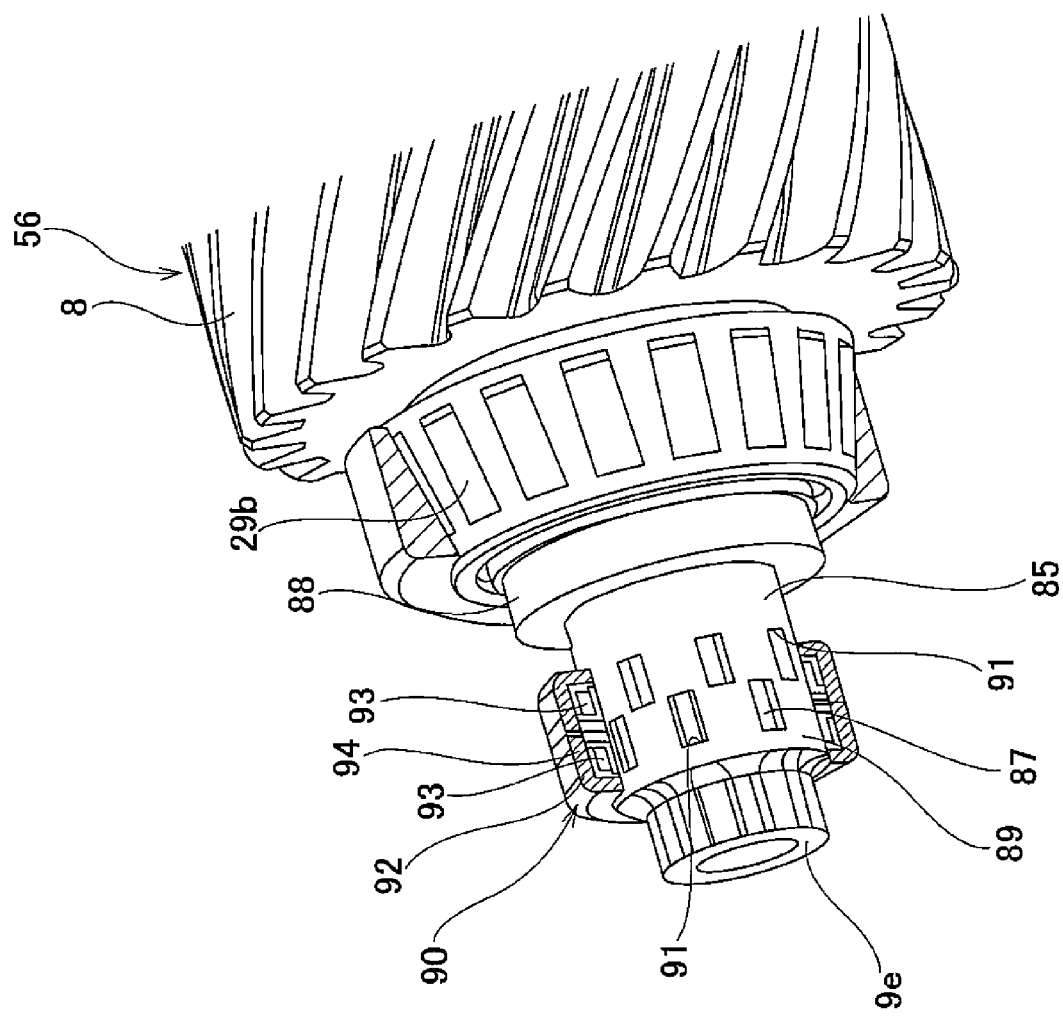
FIG. 47 is a perspective view of the twentieth example of an embodiment of the present invention, and illustrates a portion thereof that corresponds to FIG. 44.

FIG. 46 and FIG. 47 illustrate a twentieth example of an embodiment of the present invention. In this example, a torque-detection sleeve 85, which is a member with a hole for detecting torque, is fastened around the outside of the other end section of the output shaft 14*c*. On the other hand, a torque-detection uneven member 86 is fastened around the outside of the other end section of the connecting shaft 9*e*. The torque-detection sleeve 85 can also fasten to and be supported by the inner ring 30*b* of the conical roller bearing 29*b* (see FIG. 3).

The torque-detection uneven member 86 is made of a magnetic material such as an iron-based alloy, and is formed into a complete cylindrical shape, and a torque-detection uneven section 87, the shape of the outer-circumferential surface thereof being an uneven shape in the circumferential direction, corresponds to the first detected section, and this torque-detection uneven section 87 is provided on the outer-circumferential surface of the middle section of the torque-detection uneven member 86. FIG. 46 illustrates construction in which the torque-detection uneven section 87 is fastened around the outside of the outer-circumferential surface of the connecting shaft 9*e*, and FIG. 47 illustrates construction in which the torque-detection uneven section 87 is formed directly on the outer-circumferential surface of the connecting shaft 9*e*; either construction can be arbitrarily used.

The torque-detection sleeve 85 is made of a non-magnetic metal plate having electric conductivity such as an aluminum alloy, and is formed into a complete stepped cylindrical shape having a large-diameter cylindrical section 88 that is fastened around the outside of the output shaft 14*c*, and a small-diameter cylindrical section 89. The small-diameter section 89 corresponds to the second detected section, and is concentrically arranged on the outer-diameter side of the torque-detection uneven section 87 (first detected section) so to come close to the torque-detection uneven section 87 in the radial direction. The small-diameter cylindrical section 89 is located in a portion between the torque-detection uneven section 87 and a coil-sensor unit 90. Moreover, plural window holes 91, which are rectangular shaped through holes, are provided in a double row in the axial direction, and are uniformly spaced in the circumferential direction, with the phases in the circumferential direction of the double row of window holes 91 being shifted a half pitch from each other.

In this example, the coil-sensor unit 90 is fastened to and supported by a housing (not illustrated in the figure). The coil-sensor unit 90 is concentrically arranged on the outer-diameter side of the torque-detection uneven section 87 and small-diameter cylindrical section 89 of the torque-detection sleeve 85. The coil-sensor unit 90 includes a cylindrical shaped main detector 92, a resin base (not illustrated in the figure) that is provided so as to protrude outward in the radial direction from the outer-circumferential surface of the main detector 92, and a connecting terminal that includes plural (for example, four) metal pins (not illustrated in the figure). The main detector 92 includes plural (two in the example in the figure) cylindrical shaped coil bobbins 93 around which coils are wound, and a metal yoke member 94 that covers the coil bobbins 93. The connecting terminal is provided on a part in the circumferential direction of the main detector 92, and protrudes outward in the radial direction, and is connected to the coil bobbins 93. Moreover, the connecting terminal is connected to a circuit board (not illustrated in the figure), and sends an output signal from the coil-sensor unit 90 to a computing unit by way of one harness. The coil-sensor unit can also be supported by the outer ring of the rolling bearing 29*b* by using a circular ring shaped support member.

In this example as well, when torque is transmitted between an input-side rotating body 55 (see FIG. 1) and an output-side rotating body 56, the positional relationship in the circumferential direction between the torque-detection uneven section 87 of the torque-detection uneven member 86 that is attached to the other end section of the connecting shaft 9*e* and the small-diameter section 89 of the torque-detection sleeve 85 that is attached to the other end section of the output shaft 14*c* changes by an amount that corresponds to the direction and size of the torque. A change then occurs in the impedance of the coil bobbins 93 of the coil-sensor unit 90 by an amount that corresponds to this change in the positional relationship. Therefore, it is possible to detect the direction and size of the torque based on this change in impedance. The other construction and functions are the same as those of all the other examples.

Twenty-First Example

Figure 48:
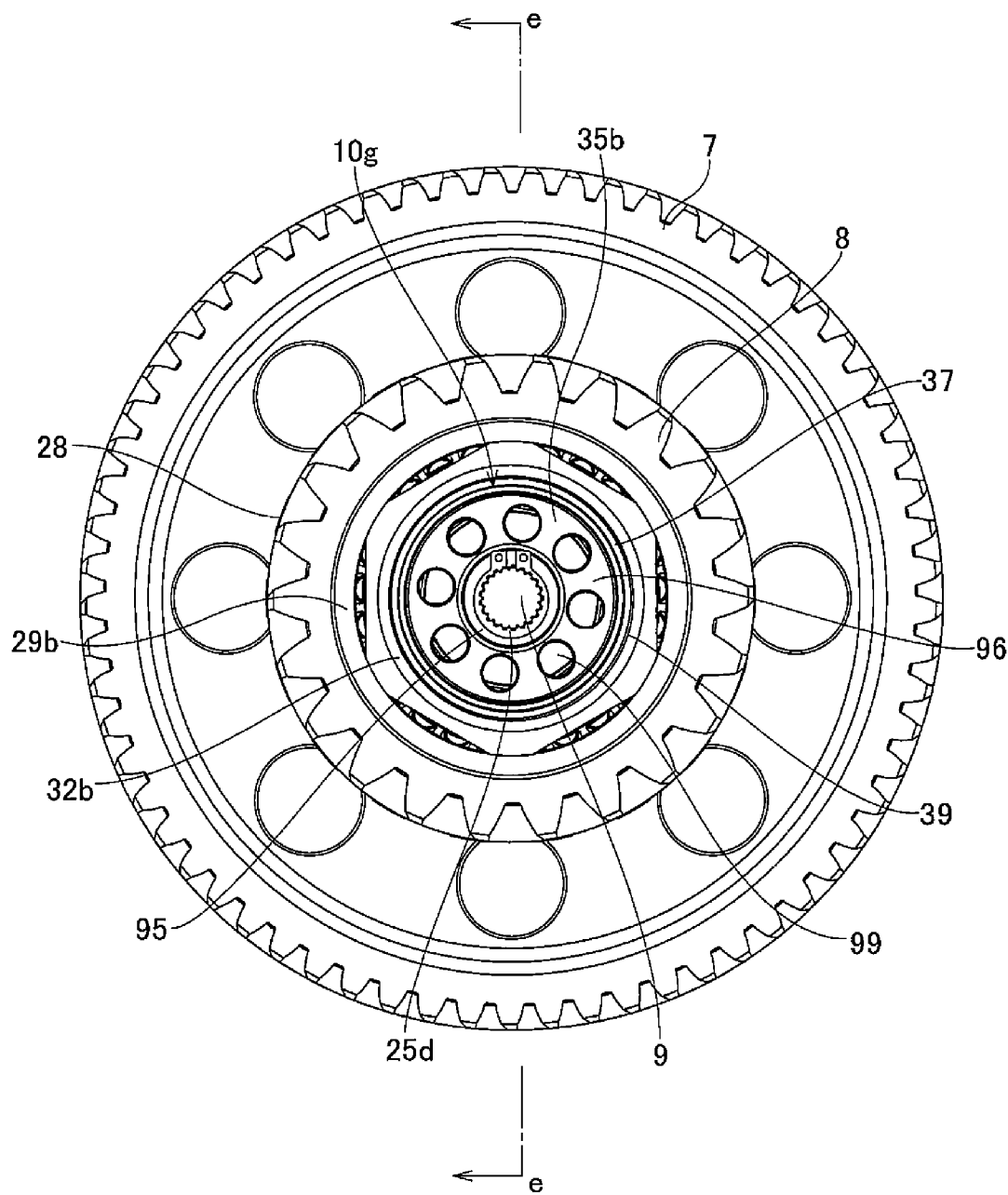
FIG. 48 illustrates a twenty-first example of an embodiment of the present invention, and is an end view with the housing and sensor unit omitted.
Figure 49:
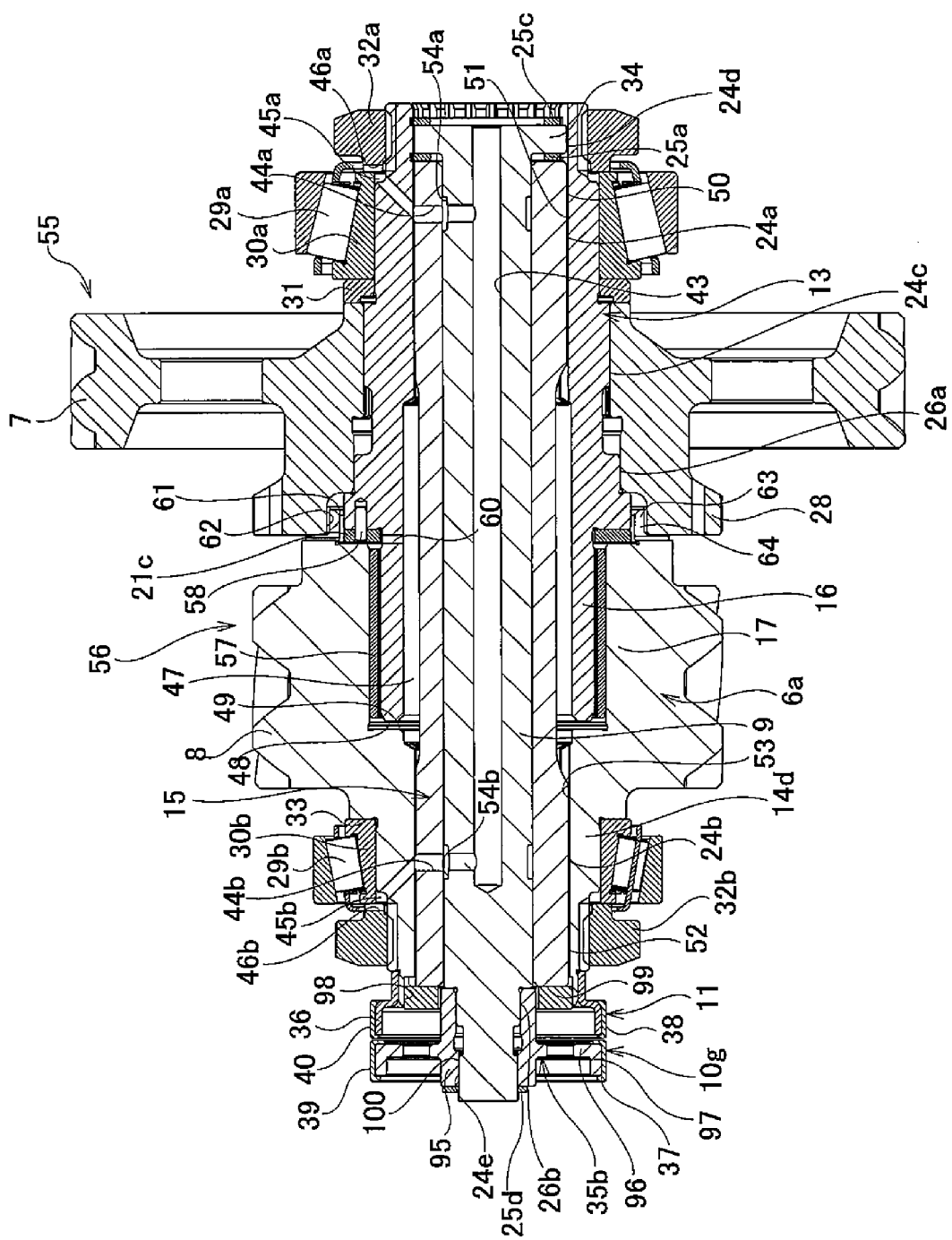
FIG. 49 is a cross-sectional view of section e-e in FIG. 48.
Figure 50:
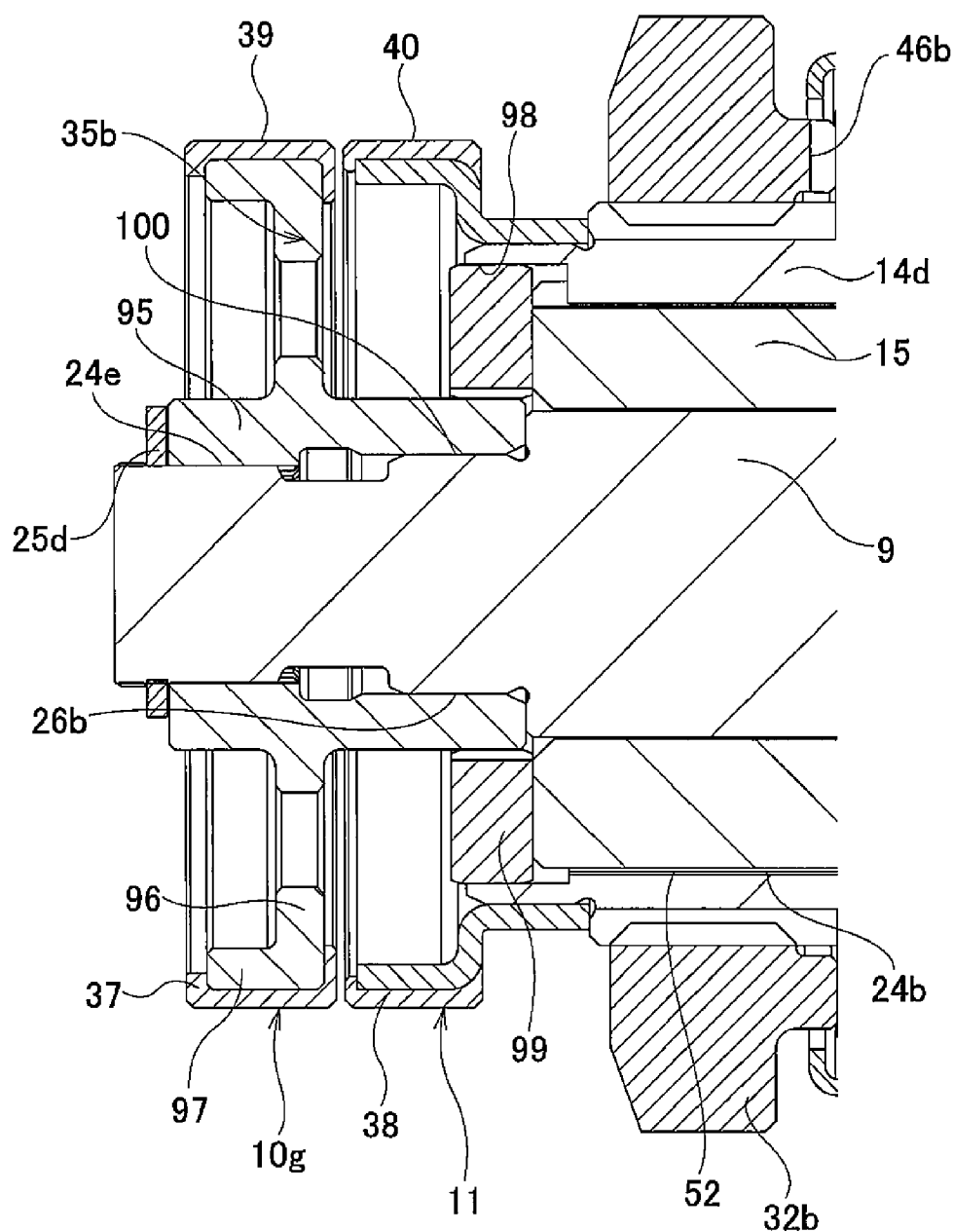
FIG. 50 is an enlarged view of the twenty-first example of an embodiment of the present invention, and illustrates the left end section in FIG. 49.

FIG. 48 to FIG. 50 illustrate a twenty-first example of an embodiment. The torque measurement device-equipped rotation transmission apparatus of this example, has construction for suppressing torque measurement error by keeping the amount of whirling with respect to the first encoder and second encoder when torque is being transmitted which leads to the torque measurement error small. In this example, the first encoder 10g is fastened to the other end section of the connecting shaft 9 so as to be concentric with the connecting shaft 9. The first encoder 10g has a metal core 35b that is made of a magnet metal, and a permanent magnet 37. The metal core 35b includes: a cylindrical shaped fitting cylinder 95 that fits with the other end section of the connecting shaft 9; an outward facing flange shaped annular section 96 that is provided around the middle section in the axial direction of the fitting cylinder 95; and a cylindrical section 97 that is provided in a direction from the outer-circumferential edge of the annular section 96 toward the other end side in the axial direction of the connecting shaft 9. Moreover, the permanent magnet 37 is fastened around the entire circumference of the outer-circumferential surface of the cylindrical section 97.

In this example, a sliding bearing 99 that is made of a material that slides easily such as oil-impregnated metal or synthetic resin is provided between a large-diameter section 98 that is provided around the inner-circumferential surface of the other end section of the output shaft 14d and the outer-circumferential surface of one end section (right end section in FIG. 48 to FIG. 50) of the fitting cylinder 95. The sliding bearing 99 is assembled as described in the following. First, the connecting shaft 9 is supported by the input shaft 13 by the outer-circumferential surface of the rim section 34 that is formed around one end section of the connecting shaft 9 engaging with the inner-circumferential surface of the other end section of the input shaft 13 by an involute spline engagement section 24d. In this state, a pair of retaining rings 25a, 25c that are secured to the inner-circumferential surface of the input shaft 13 hold the rim section 34 on both sides in the axial direction and prevent the connecting shaft 9 from displacement in the axial direction with respect to the input shaft 13. Next, a hollow tubular shaped torsion bar 15 is inserted into the inner-diameter sides of the input shaft 13 and output shaft 14d from an opening in the other end of the output shaft 14d. And then, by a first male involute spline section 50 that is provided on the outer-circumferential surface of one end section of the torsion bar 15 engaging with a first female involute spline section 50 that is provided on the inner-circumferential surface of the other half section of the input shaft 13, an involute spline engagement section 24a is formed, and by a second male involute spline section 52 that is provided on the outer-circumferential surface of the other end section of the torsion bar 15 engaging with a second female involute spline section 53 that is provided on the inner-circumferential surface of the other end section of the output shaft 14d, an involute spline engagement section 24b is formed. As a result, the torsion bar 15 is supported on the inner-diameter sides of the input shaft 13 and output shaft 14d. Next, the sliding bearing 99 is press-fitted into the large-diameter section of the output shaft 14d, and the surface on one side (surface on the right side in FIG. 49 and FIG. 50) of the sliding bearing 99 so as to be pressed to the surface of the other end section of the torsion bar 15. As a result, the torsion bar 15 is held on both sides in the axial direction between the retaining ring 25a and the sliding bearing 99, which prevents the torsion bar 15 from moving in the axial direction with respect to the input shaft 13 and the output shaft 14d. Subsequently, the metal core 36 of the second encoder 11 is fastened around the outside of the other end section of the output shaft 14d, and the second encoder 11 is supported with respect to the output shaft 14d so as to be concentric with the output shaft 14d and so as to rotate in synchronization with the output shaft 14d. Then, the fitting cylinder 95 of the metal core 35b of the first encoder 10g is fitted with a small-diameter section 100 that is provided on the other end section of the connecting shaft 9 so as to form a cylindrical fitting section 26b for maintaining concentricity and an involute engagement section 24e for preventing relative rotation, and the metal core 35b is prevented from displacement in the axial direction by a retaining ring 25d. As a result, the first encoder 10g is fastened to and supported by the input shaft 13 by way of the connecting shaft 9 so as to be concentric with the input shaft 13 and so as to be able to rotate in synchronization with the input shaft 13, and the outer-circumferential surface of one end section (right end section in FIG. 49) of the fitting cylinder 95 is made to slidingly contact with or closely face the inner-circumferential surface of the sliding bearing 99.

The order for assembling the torque measurement device-equipped rotation transmission apparatus of this example is not limited to the order described above. In other words, it is possible to insert the connecting shaft 9 into the inner-diameter side of the torsion bar 15 after the torsion bar 15 is supported on the inner-diameter side of the input shaft 13 and output shaft 14, or it is possible to support the rim section 34 of the connecting shaft 9 while being prevented from moving in the axial direction with respect to the input shaft 13 by the pair of retaining rings 25a, 25c after the sliding bearing 99 has been press-fitted into the other end section of the output shaft 14. Moreover, it is also possible to cause the outer-circumferential surface of the sliding bearing 99 to come into sliding contact with or to closely face the large-diameter section 98 of the output shaft 14 by press-fitting the sliding bearing 99 around the outer-circumferential surface of one end section of the fitting cylinder 95 of the metal core 35b of the first encoder 10g, and fitting the fitting cylinder 95 with the small-diameter section 100 of the connecting shaft 9.

In this example, by providing a sliding bearing 99 between the large-diameter section 98 that is provided on the inner-circumferential surface of the other end section of the output shaft 14d and the outer-circumferential surface of the one end section of the fitting cylinder 95 of the metal core 35b of the first encoder 10g, it is possible to keep the amount of whirling of the first encoder 10g with respect to the second encoder 11 liable to cause error in the torque measurement small. In other words, the inner-circumferential surface of the sliding bearing 99 that is press-fitted in the large-diameter section 98 is made to come in sliding contact with or to closely face the outer-circumferential surface of the fitting cylinder 95 that is fastened around the outside of the other end section of the connecting shaft 9, so the concentricity of the center of rotation of the first encoder 10g that is fastened to and supported by the other end section of the connecting shaft 9 and the center of rotation of the second encoder 11 that is fastened to and supported by the output shaft 14d can be improved. As a result, the amount of whirling of the first encoder 10g with respect to the second encoder 11 liable to cause measurement error of the torque can be kept small.

Furthermore, in this example, the one side surface of the sliding bearing 99 that is press-fitted into the large-diameter section 98 of the output shaft 14d is pressed against the surface of the other end section of the torsion bar 15. Therefore, when compared with construction in which the torsion bar is held on both sides in the axial direction by retaining rings, it is possible to more effectively prevent looseness in the axial direction of the torsion bar 15 with respect to the input shaft 13 and output shaft 14. Moreover, there is no need to provide a locking groove on the inner-circumferential surface of the other end section of the output shaft 14d for locking the retaining ring 25b, so it is possible to shorten the dimension in the axial direction of the output shaft 14d, and thus it is possible to made the torque measurement device-equipped rotation transmission apparatus more compact and lightweight. The other construction and functions are the same as those of the first example.

Twenty-Second Example

Figure 51:
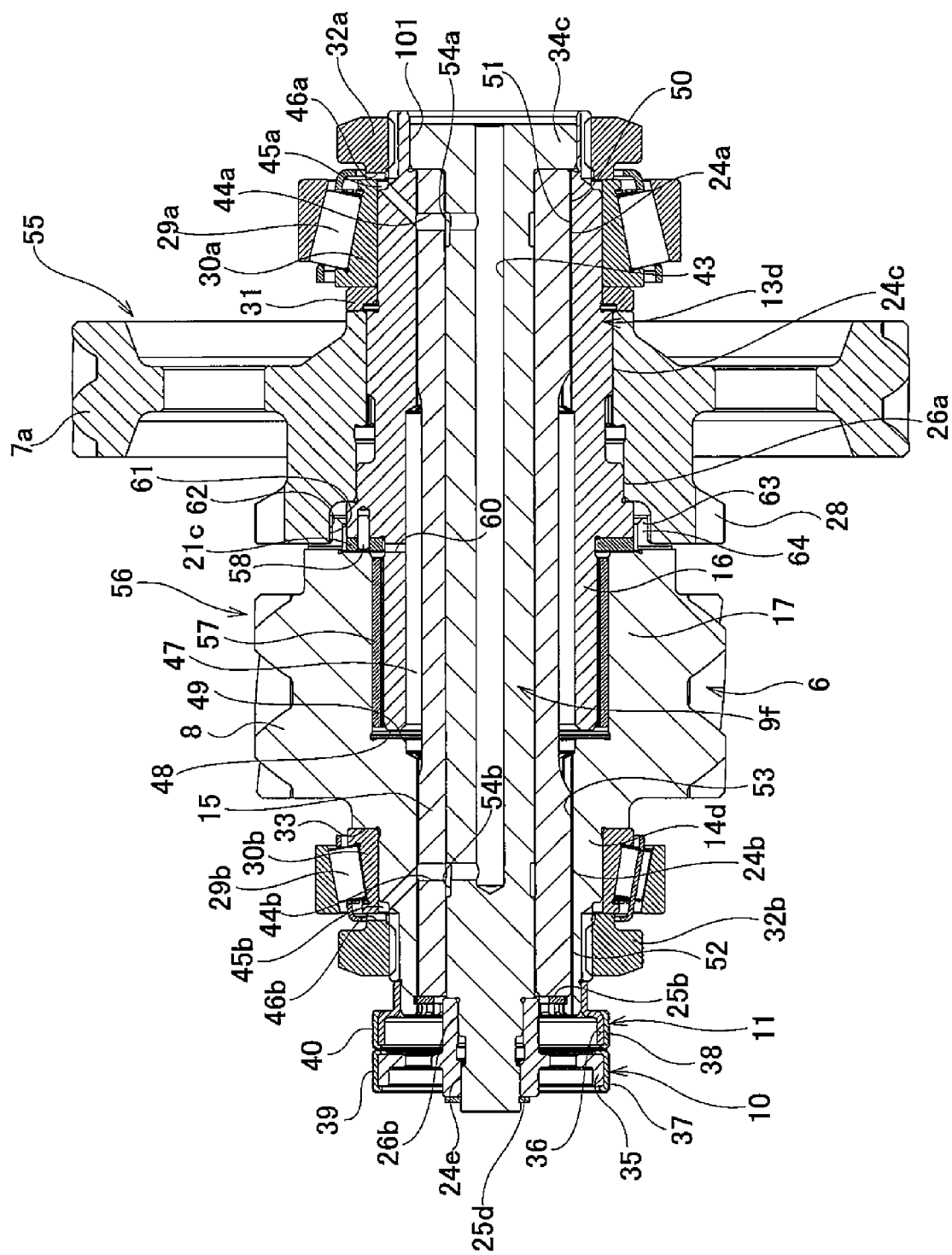
FIG. 51 is a view of a twenty-second example of an embodiment of the present invention, and is similar to FIG. 49.
Figure 52:
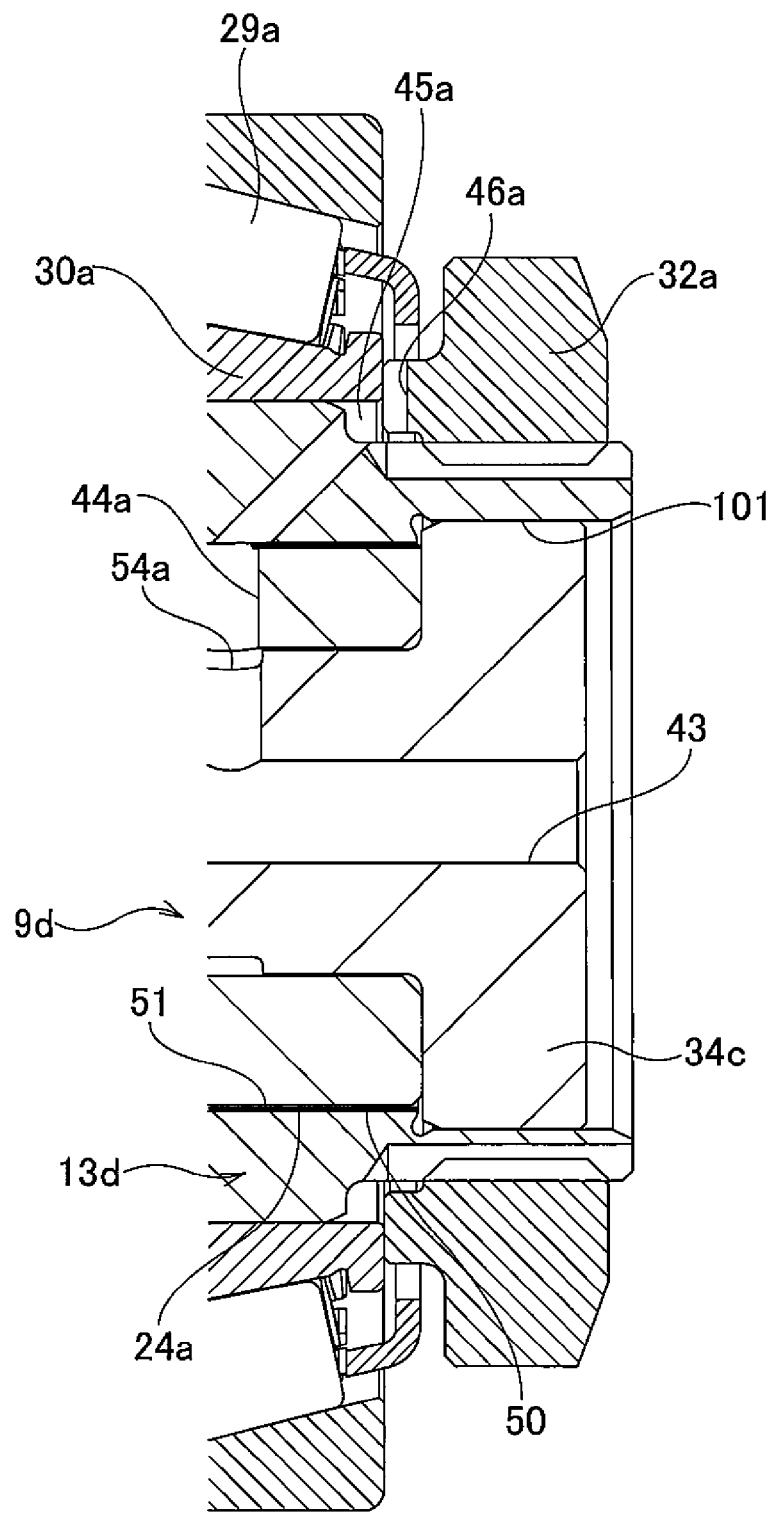
FIG. 52 is an enlarged view of the twenty-second example of an embodiment of the present invention, and illustrates the right end section in FIG. 51.

FIG. 51 and FIG. 52 illustrate a twenty-second example of an embodiment of the present invention. In this example, an outward facing flange shaped rim section 34c that is formed around the outer-circumferential surface of one end section of the connecting shaft 9f is press-fitted into a large-diameter section 101 that is provided on the inner-circumferential surface of the other end section of the input shaft 13d, and the connecting shaft 9f is supported by the input shaft 13d so as to be concentric with the input shaft 13d and so as to be able to rotate in synchronization with the input shaft 13d. The other side surface of the rim section 34c (the left side surface in FIG. 51 and FIG. 52) is pressed against the one end surface (the right end surface in FIG. 51 and FIG. 52) of the torsion bar 15.

In this example as well, it is possible to keep the amount of whirling of the first encoder 10 with respect to the second encoder 11 liable to cause torque measurement error small. In other words, the connecting shaft 9f is supported by the input shaft 13d by press-fitting the rim section 34c of the connecting shaft 9f into the large-diameter section 101 of the input shaft 13d. Therefore, when compared with construction in which the connecting shaft 9 (see FIG. 3) is supported by the input shaft 13 by way of an involute spline engagement section 24a, it is possible to further improve the concentricity of the center axis of the connecting shaft 9f, the center axis of the input shaft 13d and the center axis of the output shaft 14. As a result, the concentricity of the center of rotation of the first encoder 10 and the center of rotation of the second encoder 11 can be further improved, and it is possible to keep the amount of whirling of the first encoder 10 with respect to the second encoder 11 small.

Moreover, the other side surface of the rim section 34c that is press-fitted into the large-diameter section 101 of the input shaft 13 is pressed against the one side surface of the torsion bar 15, so when compared with construction in which the torsion bar 15 is held on both sides in the axial direction by retaining rings 25a, 25b that are secured to the inner-circumferential surfaces of the input shaft 13 and the output shaft 14, the torsion bar 15 is more effectively prevented from becoming loose in the axial direction with respect to the input shaft 13 and the output shaft 14. Furthermore, there is no need to provide locking grooves in the inner-circumferential surface of the input shaft 13d for locking the retaining rings 25a, 25c, so it is possible to shorten the dimension in the axial direction of the input shaft 13d, and thus it is possible to make the torque measurement device-equipped rotation transmission apparatus more lightweight and compact.

When implementing the present invention, the twenty-first and twenty-second examples can be implemented at the same time. In other words, together with installing a sliding bearing on the other end section of the output shaft, a rim section that is formed on one end section of the connecting shaft is press-fitted into the other end section of the input shaft. In construction in which the twenty-first and twenty-second examples are implemented at the same time, the amount of whirling of the first encoder with respect to the second encoder is kept small, and looseness of the torsion bar 15 in the axial direction of the input shaft 13d and output shaft 14d is even more effectively prevented. The other construction and functions are the same as those of the first example.

Twenty-Third Example

Figure 53:
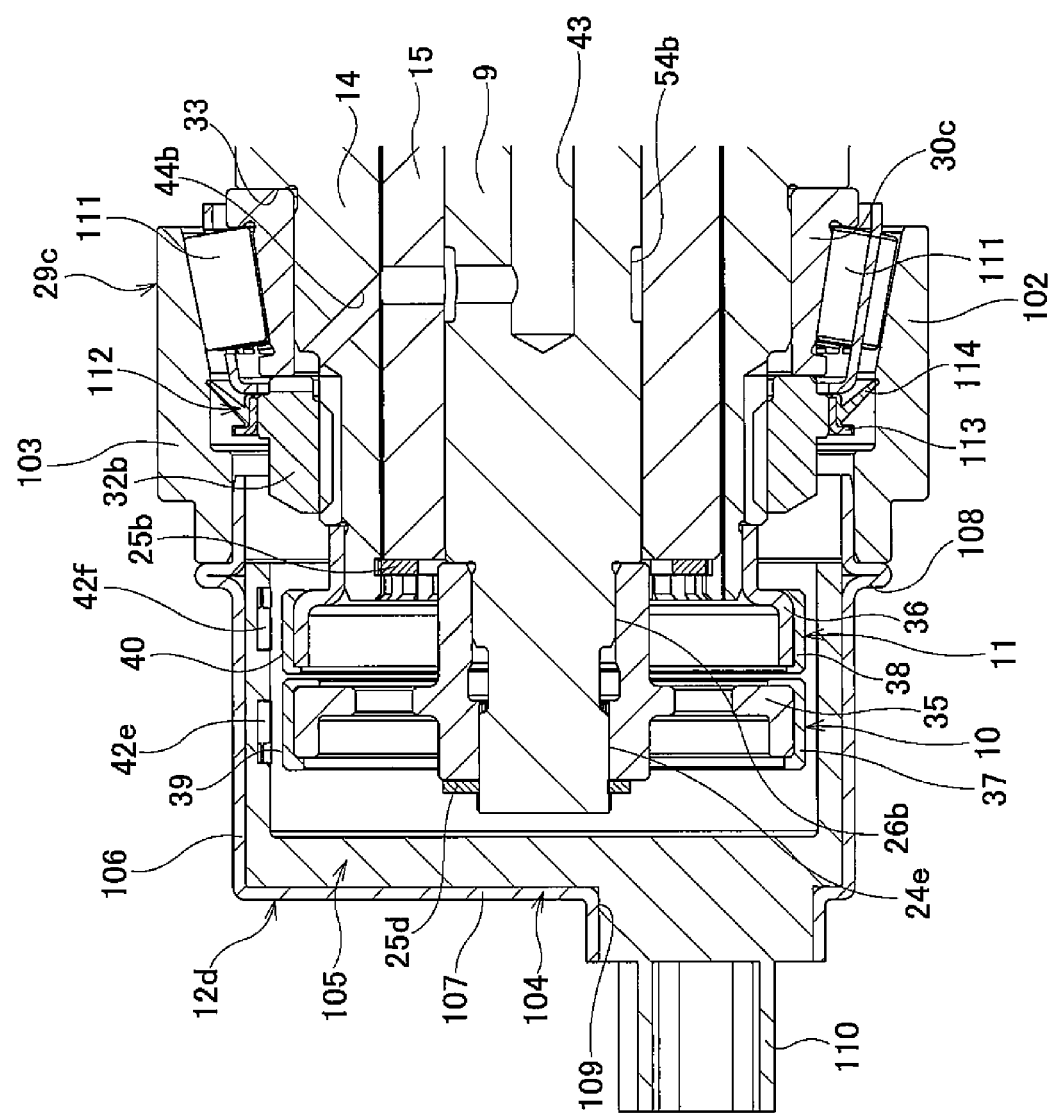
FIG. 53 is an enlarged view of a twenty-third example of an embodiment of the present invention, and corresponds to the left end section in FIG. 3.
Figure 54:
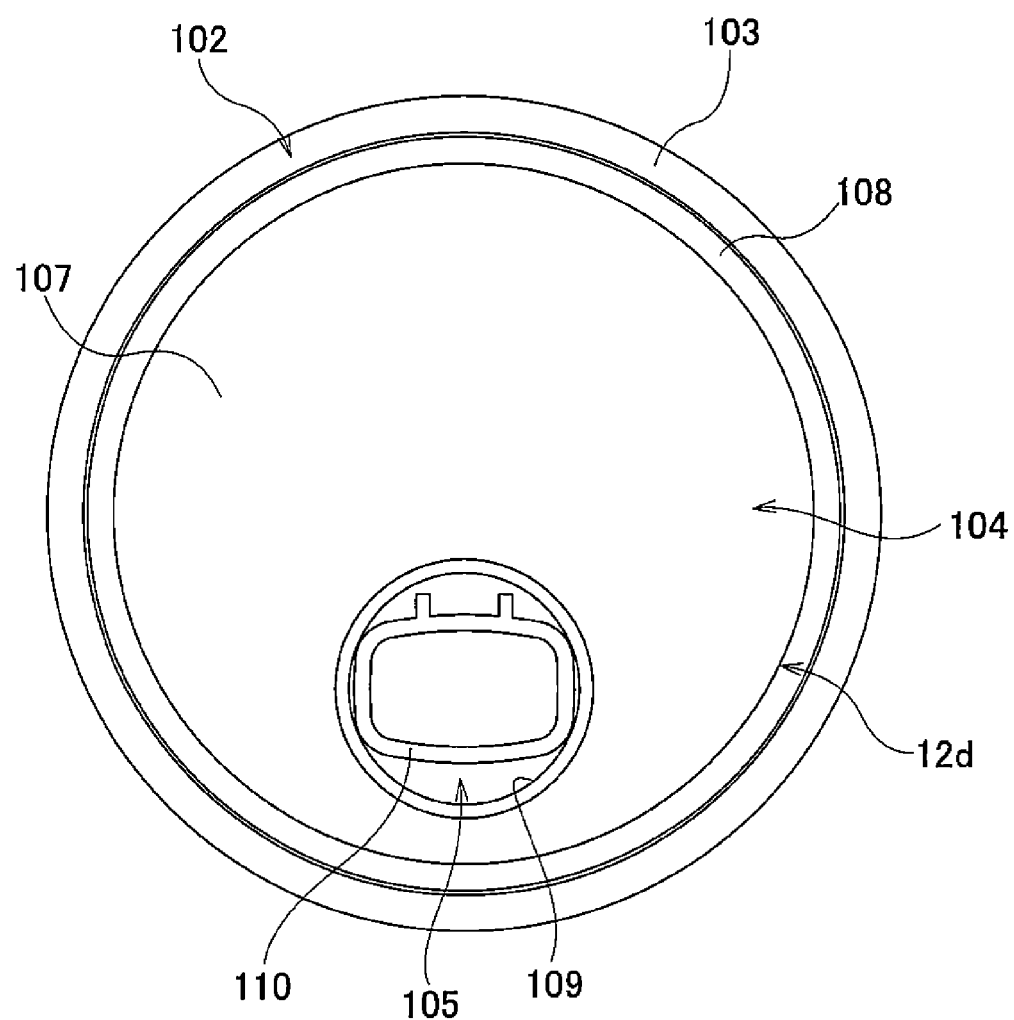
FIG. 54 is a view of the twenty-third example of an embodiment of the present invention as seen from the left in FIG. 53.

FIG. 53 and FIG. 54 illustrate a twenty-third example of an embodiment of the present invention. The torque measurement device-equipped rotation transmission apparatus of this example includes construction for simplifying positioning the sensor unit with respect to the first encoder and second encoder, and improving reliability of torque measurement. In this example, the output shaft 14, which is the other rotating shaft is rotatably supported with respect to the housing by a conical roller bearing 29c that is located between a portion near the other end of the outer-circumferential surface of the output shaft 14 and the inner-circumferential surface of the housing. Of the outer ring 102 of the conical roller bearing 29c, the half section on the other end side of the output shaft 14 in the axial direction includes an extension cylinder section 103 that protrudes further in the axial direction than the small-diameter side end section of the inner ring 30c of the conical roller bearing 29c. The inner-circumferential surface of the extension cylinder section 103 faces the outer-circumferential surface of a nut 32b that is screwed onto to the other end section of the outer-circumferential surface of the output shaft 14, and tightened.

In this example, the sensor unit 12d includes a sensor cover 104, a sensor holder 105, a first sensor 42e and a second sensor 42f. The sensor cover 104 is made of a metal plate, and is formed so as to have a complete cylindrical shape with a bottom, and includes a cover cylindrical section 106, and a cover bottom plate section 107 that covers the opening on the base end of the cover cylindrical section 106. An outward facing flange-shaped rim section 108 is provided on a portion near the tip end of the outer-circumferential surface of the cover cylindrical section 106, and a through hole 109 is provided in part of the cover bottom plate section 107 (portion near the outer circumference in the example). The sensor holder 105 is made of a synthetic resin, and is formed into a complete cylindrical shape with a bottom, and is fastened to and supported by the inner surface of the sensor cover 104 by an insert molding or adhesive. The first sensor 42e and second sensor 42f are embedded in a cylindrical shaped portion of the sensor holder 105 that is located on the inner-diameter side of the cover cylindrical section 106. Moreover, a connector 110 that is provided on part of the sensor holder 105 protrudes through the through hole 109 to the outside of the sensor cover 104. The connector 110 is the detachable end of a harness that obtains the detected signals from the first sensor 42e and second sensor 42f.

In this example, the sensor unit 12d is fastened to and supported by the housing by way of an outer ring 102. More specifically, by press-fitting the tip end section of the cover cylindrical section 106 of the sensor cover 104 to the inner-circumferential surface of the tip end section of the extension cylinder section 103 of the outer ring 102, the sensor cover 104 is fastened on the inside of the outer ring 102 with an interference fit. Moreover, by the side surface of a rim section 108 that is provided on a portion near the tip end of the outer-circumferential surface of the cover cylindrical section 106 coming in contact with the tip-end surface of the extension cylinder section 103, the sensor unit 12d can be positioned in the axial direction with respect to the outer ring 102. In this state, the first encoder 10 and the second encoder 11 are arranged in a space inside the sensor cover 104 so that the detecting section of the first sensor 42e faces the first detected section 39 of the first encoder 10, and the detecting section of the second sensor 42f faces the second detected section of the second encoder 11.

In this example, a seal ring 112 is placed between the space where the plural conical rollers 111 of the conical roller bearing 29c are located and the space on the inside of the sensor cover 104 where the first detected section 39 and the second detected section 40 are arranged, and this seal ring 112 functions as a sealing device for partitioning between these spaces. The seal ring 112 includes a circular ring-shaped metal core 113 that has an L-shaped cross section, and a circular ring-shaped seal member 114 that is reinforced by the metal core 113. The metal core 113 is fastened around the outer-circumferential surface of the tip end section of a nut 32b, which is a cylindrical surface, with an interference fit, and the tip-end edge of a seal lip of the seal member 114 comes in sliding contact with the inner-circumferential surface of the base end section of the extension cylinder section 103, which is also a cylindrical surface. As a result, lubrication oil that is supplied to the space where the conical rollers 111 are located and that includes foreign matter having magnetic properties such as iron powder is prevented from passing through the portion between the inner-circumferential surface of the extension cylinder section 103 and the outer-circumferential surface of the tip end section of the nut 32b and entering the space inside the sensor cover 104. When implementing the present invention, the sealing device is not limited to this seal ring 112, and various kinds of sealing devices can be used. For example, it is also possible to use a sealing device that has construction in which a metal core is fastened around the inner-circumferential surface of the extension cylinder section 103, and the tip-end edge of a seal lip of a seal member comes in sliding contact with the surface of the nut 32b (or output shaft 14). In any case, the sealing device preferably has good seal characteristics, and the sliding contact resistance between the tip-end edge of the seal lip and the opposing surface is kept low.

In this example, the sensor unit 12d is fastened to and supported by the outer ring 102 of the conical roller bearing 29c that is located between the output shaft 14 and housing. Therefore, when compared with construction in which the sensor unit 12 and the rotating-shaft unit 6 (see FIG. 1) that supports the first encoder 10 and the second encoder 11 are separately fastened to and supported by the housing, maintaining the positioning precision of the sensor unit 12d with respect to the first encoder 10 and second encoder 11 becomes simpler. Moreover, the sensor unit 12d and the rotating-shaft unit 6 are assembled in a specified positional relationship before being assembled inside the housing, and that positional relationship does not shift or move after that, so from this aspect as well, it is easy to maintain the positional relationship.

In this example, the first detected section 39 and second detected section 40, and the detecting sections of the first sensor 42e and second sensor 42f are arranged inside the sensor cover 104, and a seal ring 112 is placed between the space on the inside of the sensor cover 104 and the space where the plural conical rollers 111 of the conical roller bearing 29c are located, and functions as a partition between these spaces. Therefore, lubrication oil that includes foreign matter that has magnetic properties that exists inside the housing (including lubrication oil that is supplied to the space where the conical rollers 111 are located) is prevented from adhering to the first detected section 39 and second detected section 40, and the detecting sections of the first sensor 42e and the second sensor 42f. As a result, the reliability of torque measurement can be improved.

Furthermore, the first encoder 10 and second encoder 11 are stored in the space inside the sensor cover 104, so when assembling the sensor unit 12d and rotating shaft unit 6 (see FIG. 1) inside the housing after the sensor unit 12d and rotating shaft unit 6 have been assembled together, the first encoder 10 and second encoder 11 are prevented from bumping against part of the housing and becoming damaged. Moreover, it is also possible to inspect the output signals of the first sensor 42e and the second sensor 42f in the stage before assembling the elements other than the housing in the housing. In the completed state, even though the housing may be deformed, it is difficult for the positional relationship of the first detected section 39, the second detected section 40, and the detecting sections of the first sensor 42e and the second sensor 42f to shift. From this aspect as well, it is possible to further improve the reliability of torque measurement. The other construction and functions are the same as those of the first example.

Twenty-Fourth Example

Figure 55:
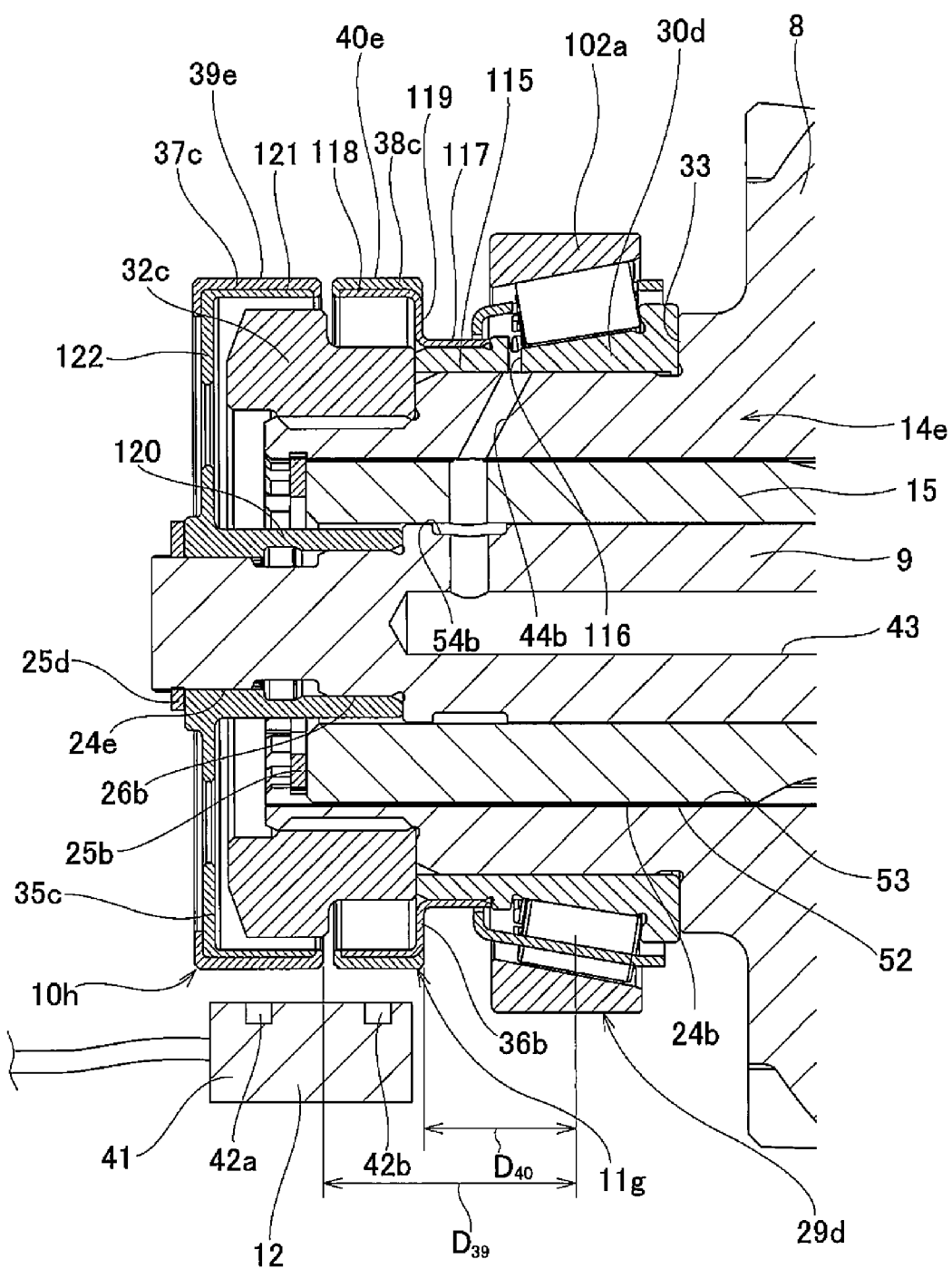
FIG. 55 is an enlarged view of a twenty-fourth example of an embodiment of the present invention, and corresponds to the left end section in FIG. 3.

FIG. 55 illustrates a twenty-fourth example of an embodiment of the present invention. The torque measurement device-equipped rotation transmission apparatus of this example includes construction that is able to improve the precision of torque measurement by keeping the displacement and the inclination in the radial direction of the second encoder that is fastened around the outside of the other end section of the output shaft small. In this example, the inner ring 30d of the conical roller bearing 29d for rotatable supporting the output shaft 14e, which is the other rotating shaft, with respect to the housing is fitted around the outside of a portion near the other end of the output shaft 14e, and the end surface of the large-diameter side of the inner ring 30d comes in contact with a stepped surface 33 that is formed on a portion near the other end of the outer-circumferential surface of the output shaft 14e. In this state, the nut 32c that is another component and is screwed onto the other end section of the outer-circumferential surface of the output shaft 14e and tightened, presses the end surface of the small-diameter end side of the inner ring 30d, such that the inner ring 30d is fitted and fastened around the outside of the output shaft 14e. Particularly, a cylindrical shaped extension cylinder 115 that protrudes in the axial direction from the inner-diameter side of the outer ring 102a of the conical roller bear 29d is integrally provided on the end section of the small-diameter side of the inner ring 30d, which is the end section on the other end side of the output shaft 14e. Moreover, a through hole 116 is provided in the radial direction in a portion near the end section of the small-diameter side of the inner ring 30c. It is possible to supply lubrication oil from an oil path 44b and through the through hole 116 into the inside of the conical roller bearing 29d.

In this example, the metal core 36b of the second encoder 11g is fastened around the outside of the extension cylinder 115. In other words, the second encoder 11g is fastened around the outside of a portion near the other end of the output shaft 14e by way of the extension cylinder 115 of the inner ring 30d. Moreover, the metal core 36b of the second encoder 11g is formed in a complete circular ring shaft having a crank shaped cross section, and includes a small-diameter cylindrical section 117 and a large-diameter cylindrical section 118 that are arranged so as to be concentric with each other, and an annular section 119 that connects end edges in the axial direction of the small-diameter cylindrical section 117 and large-diameter cylindrical section 118. A cylindrical shaped permanent magnet 38c is fastened around the outer-circumferential surface of the large-diameter cylindrical section 118. The small-diameter cylindrical section 117 of the metal core 36b of the second encoder 11g is fastened around the outside of the extension cylinder 115 of the inner ring 30d with an interference fit. The large-diameter cylindrical section 118 and the permanent magnet 38c are arranged on the outer-diameter side of one half section in the axial direction of the nut 32c (right half section in FIG. 55) so as to overlap in the radial direction the one half section in the axial direction of the nut 32c. In other words, the cylindrical shaped second detected section 40e, which is the outer-circumferential surface of the permanent magnet 38c, overlaps in the radial direction the one half section in the axial direction of the nut 32c (and other end section of the output shaft 14e) on the outer-diameter side of the one half section in the axial direction for the nut 32c.

The metal core 35c of the first encoder 10h is formed into a complete circular ring shape with a C-shaped cross section, and includes a small-diameter cylindrical section 120 and a large-diameter cylindrical section 121 that are arranged so as to be concentric with each other, and an annular section 122 that connects end sections in the axial direction of the small-diameter cylindrical section 120 and large-diameter cylindrical section 121. A cylindrical shaped permanent magnet 37c is fastened around the outer-circumferential surface of the large-diameter cylindrical section 121. The small-diameter cylindrical section 120 of the first encoder 10h is fastened around the outside of the other end section (left end section in FIG. 55) of the connecting shaft 9. The fitting section between the inner-circumferential surface of the small-diameter cylindrical section 120 and the outer-circumferential surface of the other end section of the connecting shaft 9 is formed by arranging in the axial direction a cylindrical fitting section 26b for maintaining concentricity, and an involute spline engagement section 24e for preventing relative rotation. Moreover, a retaining ring 25d that is secured to the outer-circumferential surface of the other end section of the connecting shaft 9 prevents the small-diameter cylindrical section 120 from coming apart from the connecting shaft 9. One end section in the axial direction (right end section in FIG. 55) and the middle section in the axial direction of the large-diameter cylindrical section 121 and permanent magnet 37c are arranged on the outer-diameter side of the other half section in the axial direction (left half section in FIG. 55) of the nut 32c, at positions that overlap in the radial direction that other half section in the axial direction. In other words, the one end section and the middle section in the axial direction of the cylindrical shaped first detected section 39e, which is the outer-circumferential surface of the permanent magnet 37c, are arranged on the outer-diameter side of the other half section in the axial direction of the nut 32c, at positions that overlap in the radial direction that other half section in the axial direction (or the other end section of the output shaft 14e).

In this example, it is possible to further improve the precision of torque measurement. In other words, the cylindrical shaped second detected section 40e of the second encoder 11g is arranged on the outer-diameter side of the one half section in the axial direction of the nut 32 at a position that overlaps in the radial direction that one half section in the axial direction, so it is possible to make the distance $D_{40}$ in the axial direction from the center section in the axial direction of the array of rolling bodies of the conical roller bearing 29d to the second detected section 40e relatively short. When torque is being transmitted, when a gear reaction force in the radial direction that acts on the output gear 8 is applied to the output shaft 14e, there is a possibility that a small amount of deflection will occur in the output shaft 14e with the conical roller bearing 29d that is assembled on a portion near the other end section of the output shaft 14e as a fulcrum, however, in this example, when torque is being transmitted, it is possible to keep the displacement and inclination in the radial direction of the second detected section 40e that occurs due to deflection of the output shaft 14e with the conical roller bearing 29d as a fulcrum small. Furthermore, in this example, the one end section and the middle section in the axial direction of the cylindrical shaped first detected section 39e of the first encoder 10h that is fastened around the outside of the other end section of the connecting shaft 9 are arranged on the outer-diameter side of the other half section in the axial direction of the nut 32c in positions that overlap in the radial direction that other half section in the axial direction. Therefore, it is possible to make the distance $D_{39}$ in the axial direction from the center section in the axial direction of the array of rolling bodies of the conical roller bearing 29d to the first detected section 39e relatively short. Consequently, even when the connecting shaft 9 may deflect with the conical roller bearing 29d as a fulcrum due to a gear reaction force in the radial direction when torque is being transmitted, it is possible to keep that displacement and inclination in the radial direction of the first detected section 39e that occurs due to this deflection small.

Therefore, in this example, even when the space between the first detected section 39e and the second detected section 40 and the tip-end surface of the sensor unit 12 is small, contact between the first detected section 39e and the second detected section 40e and the tip-end surface of the sensor unit 12 is prevented even when elastic deformation such as deflection occurs in parts due to gear reaction force in the radial direction that acts when torque is being transmitted. The precision of torque measurement improves the smaller the space between the first detected section 39e of the first encoder 10h and the second detected section 40e of the second encoder 11g and the detecting sections of the sensors 42a, 42b of the sensor unit 12 is, and the larger the amount of magnetic flux passing through the detecting sections of the sensors 42a, 42b is, and, in this example, it is possible to improve the precision of torque measurement by making the space between the first detected section 39e and the second detected section 40e and the detecting sections of the sensors 42a, 42b smaller while at the same time preventing contact (interference) between the second detected section 40e and the tip-end surface of the sensor unit 12. Moreover, in this example, it is possible to make shifting between the center of rotation of the first detected section 39e and the center of rotation of the second detected section 40e that is due to displacement and inclination in the radial direction of the first detected section 39e and second detected section 40e small. As a result, it is possible to improve the precision of torque measurement.

Furthermore, in this example, the one end section and the middle section in the axial direction of the first detected section 39e, and the second detected section 40e are arranged on the outer-diameter side of the nut 32c that is screwed onto and fastened to the outer-circumferential surface of the other end section of the output shaft 14e in positions that overlap the nut 32c in the radial direction. Therefore, when compared with construction in which the entire first detected section and second detected section are arranged in a portion that protrudes further toward the other side in the axial direction than the other end section of the output shaft, it is possible to shorten the dimension in the axial direction of the torque measurement device-equipped rotation transmission apparatus. As a result, the torque measurement device-equipped rotation transmission apparatus can be made more compact and lightweight.

Twenty-Fifth Example

Figure 56:
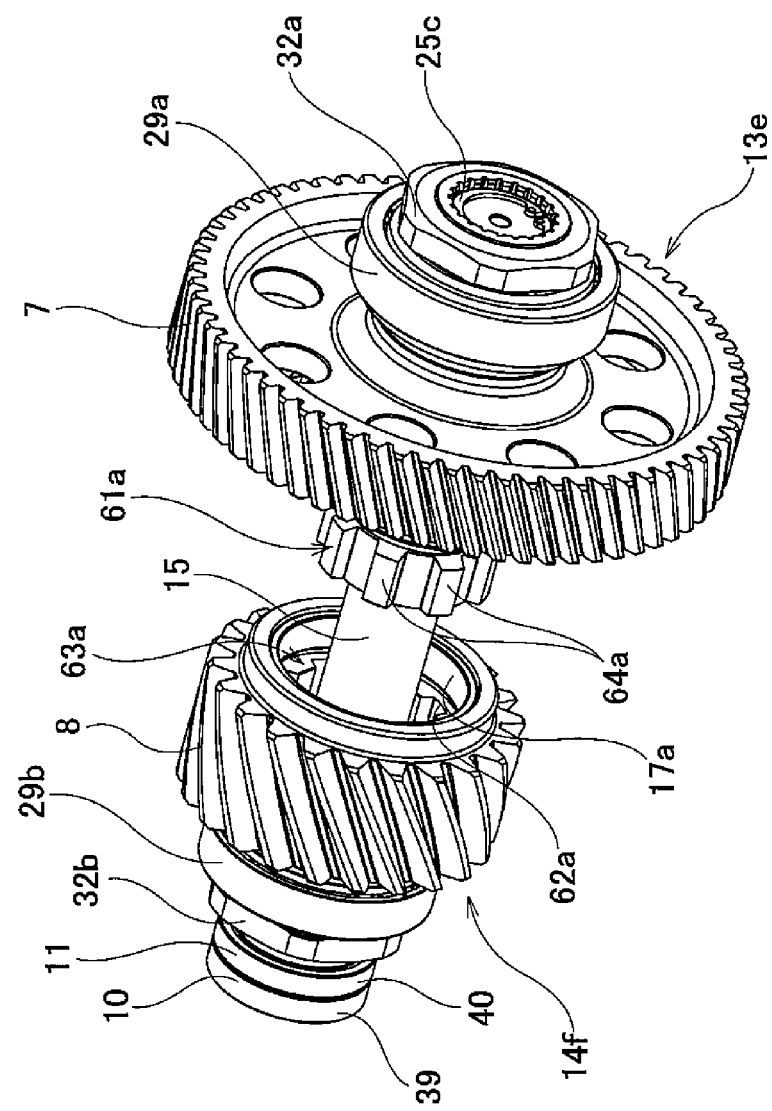
FIG. 56 is a perspective view illustrating a twenty-fifth example of an embodiment of the present invention.
Figure 57:
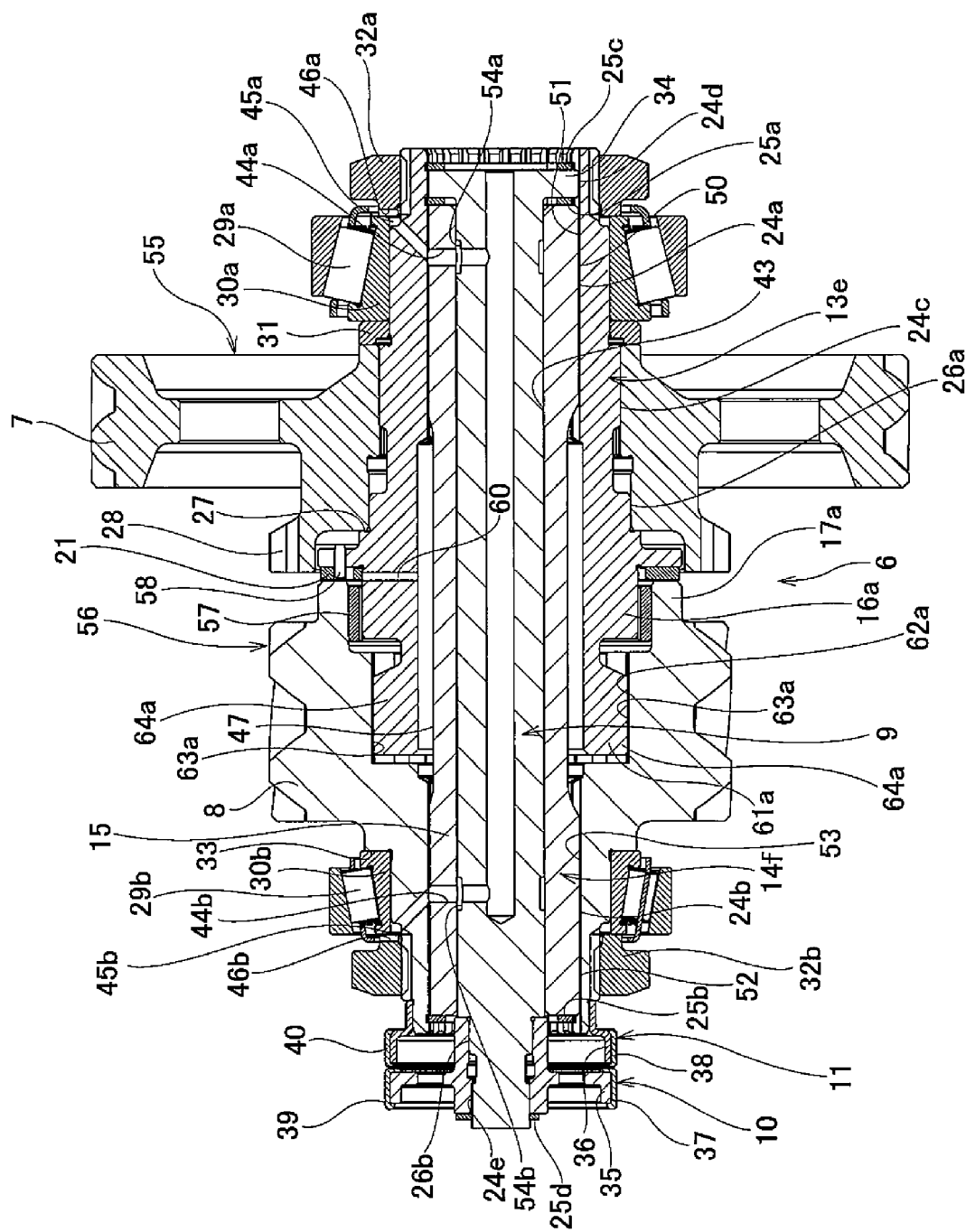
FIG. 57 is a cross-sectional view illustrating the twenty-fifth example of an embodiment of the present invention.
Figure 58:
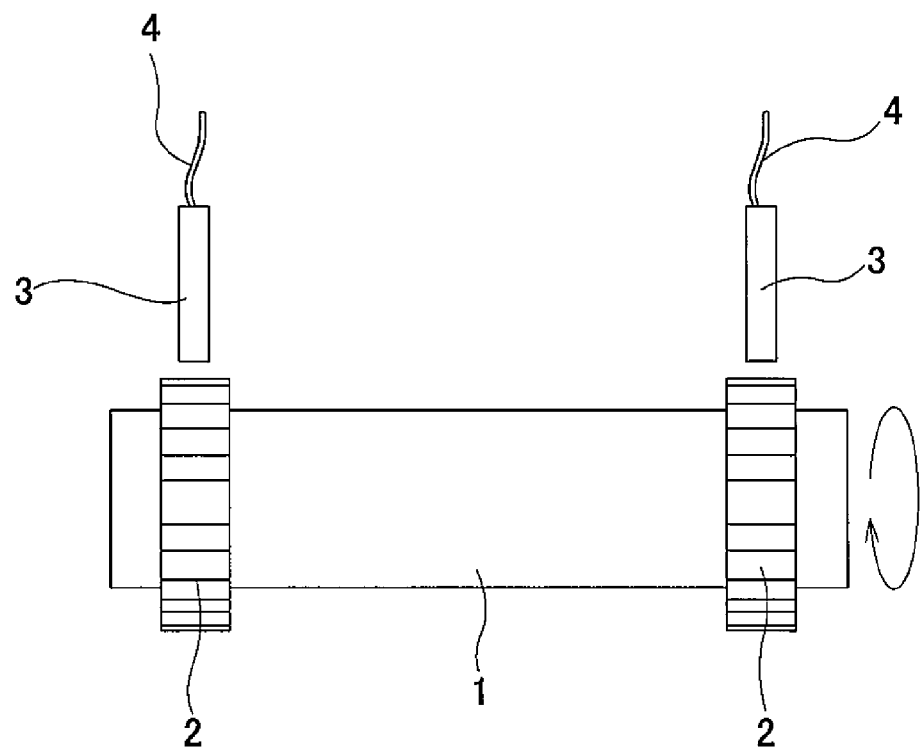
FIG. 58 is a side view illustrating an first example of conventional construction.
Figure 59:
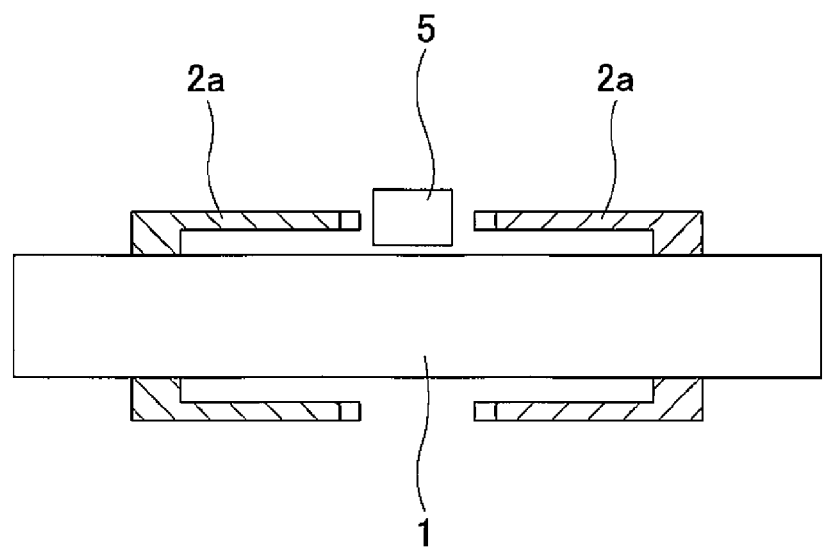
FIG. 59 is a side view illustrating a second example of conventional construction with part cut away.

FIG. 56 and FIG. 57 illustrate a twenty-fifth example of an embodiment of the present invention. In this example, an input-side stopper 61a that has an uneven shape (gear shape) in the circumferential direction is provided on the outer-circumferential surface of one end section of the input shaft 13e, and an input-side combining cylinder 16a is provided in a portion of the outer-circumferential surface of the one end section that is adjacent to the other side of the input-side stopper 61a. In other words, plural convex sections 64a that protrude outward in the radial direction are provided so as to be uniformly spaced in the circumferential direction. Moreover, an output-side combining cylinder 17a is provided on the inner-circumferential surface of one end section of the output shaft 14f, and an output-side stopper 63a that has an uneven shape (gear shape) in the circumferential direction is provided on a portion of the inner-circumferential surface of the one end section that is adjacent to the other side of the output-side combining cylinder 17a. In other words, plural (same number as the number of convex sections 64a) concave sections 62a that are recessed inward in the radial direction are provided on the inner-circumferential surface of the one end section of the output shaft 14f so as to be uniformly spaced in the circumferential direction. The input-side stopper 61a and output-side stopper 63a engage so that relative rotation is possible within a range of a specified angle, and the input-side combining cylinder 16a is inserted into the inner-diameter side of the output-side combining cylinder 17a by way of a sleeve bearing 57. In this example, it is easy to ensure the length in the axial direction of the engagement section between the input-side stopper 61a and the output-side stopper 63a. The other construction and functions are the same as in the first example.

INDUSTRIAL APPLICABILITY

The present invention, as long as there is a counter shaft and a counter gear, can be applied to various kinds of transmissions, such as an automatic transmission (AT), a continuously-variable transmission (CVT), and a manual transmission (MT). Moreover, the measured rotational speed and torque can be used for performing vehicle control other than transmission control. The motor that is located on the upstream side of the transmission does not absolutely need to be an internal-combustion engine such as a gasoline engine or diesel engine, and, for example, could be an electric motor that is used in a hybrid vehicle or electric automobile. In this way, the present invention can be widely applied to an automatic transmission of an automobile in which a transverse engine is installed, or some other kind of rotation transmission apparatus for transmitting torque by a rotating shaft. In the present invention, it is necessary that torque be measured, however it is not essential that the rotational speed be measured. In some constructions in which voltage is generated in a coil (induced electromotive force is used), correction that takes the rotational speed into consideration is necessary for measurement of the torque, however, even in a case such as this in which the rotation speed is necessary, it is possible to measure the rotational speed using separate and simple construction.

EXPLANATION OF REFERENCE NUMBERS

1 Rotating shaft
2, 2a Encoder
3 Sensor
4 Harness
5 Sensor unit
6, 6a, 6b Rotating-shaft unit
7 Input gear
8 Output gear
9, 9a, 9b, 9c, 9d, 9e, 9f Connecting shaft
10, 10a, 10b, 10c, 10d, 10e, 10f, 10g, 10h First encoder
11, 11a, 11b, 11c, 11d, 11e, 11f, 11g Second encoder
12, 12a, 12b, 12c, 12d Sensor unit
13, 13a, 13b, 13c, 13d, 13e Input shaft
14, 14a, 14b, 14c, 14d, 14e, 14f Output shaft
15, 15a, 15b, 15c Torsion bar
16, 16a Input-side combining cylinder
17, 17a Output-side combining cylinder
18 Radial needle bearing
19 Stepped surface
20 Tip-end surface
21 Thrust washer
22 Slit
23 Reinforcing cylindrical section
24a, 24b, 24c, 24d, 24e Involute spline engagement section
25a, 25b, 25c, 25d Retaining ring
26a, 26b Cylindrical surface fitting section
27 Stepped surface
28 Parking-lock gear
29a, 29b, 29c, 29d Conical roller bearing
30, 30b, 30c Inner ring
31 Spacer
32a, 32b, 32c Nut
33 Stepped surface
34, 34a, 34b, 34c Rim section
35, 35a, 35b, 35c Metal core
36, 36a, 36b Metal core
37, 37a, 37b, 37c Permanent magnet
38, 38a, 38b, 38c Permanent magnet
39, 39a, 39b, 39c, 39d, 39e First detected section
40, 40a, 40b, 40c, 40d, 40e Second detected section
41, 41a, 41b Holder
42a, 42b, 42c, 42d, 42e, 42f (First, Second) Sensor
43 Oil-inlet path
44a, 44b Oil path
45a, 45b Ring-shaped space
46a, 46b Oil groove
47 Cylindrical-shaped space
48 Tip-end surface
49 Stepped surface
50, 50a First male involute spline section 51 First female involute spline section
52, 52a Second male involute spline section
53 Second female involute spline section
54a, 54b Concave groove
55 Input-side rotating body
56 Output-side rotating body
57 Sleeve bearing
58 Pin
59 Engagement hole
60 Oil path
61, 61a Input-side stopper
62, 62a Concave section
63, 63a Output-side stopper
64, 64a Convex section
65a, 65b Through hole
66 Concave hole
67 Pin
68a, 68b Concave section
69 Convex section
70a, 70b Marking
71a, 71b Marking
72 First plating layer
73 Second plating layer
74 Cylindrical surface
75 Cylindrical surface
76 Convex section
77, 77a, 77b, 77c, 77d Tongue piece
78 Stator
79 Conducting wire
80 Coil
81 Core section
82 Rim section
83, 83a Guiding surface
84, 84a Guided surface
85 Torque-detection sleeve
86 Torque-detection uneven member
87 Torque-detection uneven section
88 Large-diameter cylindrical section
89 Small-diameter cylindrical section
90 Coil-sensor unit
91 Window hole
92 Main detector
93 Coil bobbin
94 Yoke member
95 Fitting cylinder
96 Annular section
97 Cylindrical section
98 Large-diameter section
99 Sliding bearing
100 Small-diameter section
101 Large-diameter section
102, 102a Outer ring
103 Extension cylinder section
104 Sensor cover
105 Sensor holder
106 Cover cylindrical section
107 Cover bottom plate section
108 Rim section
109 Through hole
110 Connector
111 Conical roller
112 Seal ring
113 Metal core
114 Seal member
115 Extension cylinder
116 Through hole
117 Small-diameter cylindrical section
118 Large-diameter cylindrical section
119 Annular section
120 Small-diameter cylindrical section
121 Large-diameter cylindrical section
122 Annular section

What is claimed is:

1. A torque measurement device-equipped rotation transmission apparatus, comprising:
a rotating-shaft unit,
a connecting shaft,
a first characteristic-changing member,
a second characteristic-changing member,
one sensor unit,
a first stopper section, and
a second stopper section,
the rotating-shaft unit comprising:
a first rotating body having: a hollow first rotating shaft rotatably supported by a portion that does not rotate even during use; and a first gear provided around the outer-circumferential surface of the first rotating shaft;
a second rotating body having: a hollow second rotating shaft arranged so as to be concentric with the first rotating shaft; and rotatably supported by the portion that does not rotate even during use, and a second gear provided around the outer-circumferential surface of the second rotating shaft; and
a hollow torsion bar arranged on the inner-diameter side of the first rotating shaft and second rotating shaft so as to be concentric with the first rotating shaft and second rotating shaft, and having: one end section connected to the first rotating shaft so that relative rotation is not possible; another end section connected to the second rotating shaft so that relative rotation is not possible; and a middle section in the axial direction undergoing elastic torsional deformation when torque is being transmitted, the dimension in the axial direction being greater than the space in the axial direction between the first gear and the second gear;
the connecting shaft arranged on the inner-diameter side of the torsion bar so as to be concentric with the torsion bar, and having: one end section connected to the first rotating shaft so that relative rotation is not possible; and another end section protruding in the axial direction from the other end section of the second rotating shaft and the torsion bar;
the first characteristic-changing member fastened to the other end section of the connecting shaft so as to be concentric with the connecting shaft, and having a circular ring shaped first detected section;
the second characteristic-changing member fastened to a distal end section of the second rotating shaft with respect to the first rotating shaft so as to be concentric with the second rotating shaft, and having a circular ring shaped second detected section arranged so as to closely face the first detected section in the axial direction or in the radial direction;
the first characteristic-changing member and the second characteristic-changing member constructed to move relative to each other in the direction of rotation due to the elastic torsional deformation of the middle section in the axial direction of the torsion bar occurring when the rotating shaft unit transmits torque;
the sensor unit supported by the portion that does not rotate even during use, and constructed to generate an output signal changing according to the rotation of the first detected section and the second detected section;

the first stopper section provided on part of the first rotating body;

the second stopper section provided on part of the second rotating body, and constructed to engage with the first stopper section so that torque can be transmitted only when the torsional angle of the torsion bar reaches a specified amount within the elastic range of the torsion bar; and the torque measurement device-equipped rotation transmission apparatus capable of measuring the torque that the rotating-shaft unit transmits according to the change in the output signal from the sensor unit due to relative displacement in the direction of rotation of the first characteristic-changing member and the second characteristic changing member.

2. The torque measurement device-equipped rotation transmission apparatus according to claim 1, wherein the outer-circumferential surface of the middle section in the axial direction of the connecting shaft is guided and supported by the inner-circumferential surface of the torsion bar.

3. The torque measurement device-equipped rotation transmission apparatus according to claim 1, wherein a sliding bearing is provided between the inner-circumferential surface of the other end section of the second rotating shaft and the outer-circumferential surface of the connecting shaft or fitting section of the first characteristic-changing member that fits with the connecting shaft.

4. The torque measurement device-equipped rotation transmission apparatus according to claim 1, wherein a rim section is provided around the outer-circumferential surface of the one end section of the connecting shaft, and by press-fitting the rim section with the inner-circumferential surface of a distal end section of the first rotating shaft with respect to the second rotating shaft, the connecting shaft is supported so that relative rotation with respect to the first rotating shaft is not possible.

5. The torque measurement device-equipped rotation transmission apparatus according to claim 1, wherein the second rotating shaft is rotatably supported with respect to the portion that does not rotate even during use by a rolling bearing that is located between a portion of the outer-circumferential surface of the second rotating shaft that is near the distal end with respect to the first rotating shaft and the portion that does not rotate even during use;

the sensor unit has a sensor cover that is fastened to and supported by the end section of the outer ring of the rolling bearing that is on the distal end side of the second rotating shaft; and the first characteristic-changing member and the second characteristic-changing member are arranged in a space inside the sensor cover.

6. The torque measurement device-equipped rotation transmission apparatus according to claim 5, wherein a seal device is located between a space where plural rolling bodies of the rolling bearing are located and the space inside the sensor cover, and is a partition between these spaces.

7. The torque measurement device-equipped rotation transmission apparatus according to claim 1, wherein the second rotating shaft is rotatably supported with respect to the portion that does not rotate even during use by a rolling bearing that is located between a portion of the outer-circumferential surface of the second rotating shaft that is near the distal end with respect to the first rotating shaft and the portion that does not rotate during use; and the second characteristic-changing member is fitted and fastened around the outside of an end section near the distal end of the second rotating shaft of the inner ring of the rolling bearing that is fastened around the outside of a portion near the distal end of the second rotating shaft.

8. The torque measurement device-equipped rotation transmission apparatus according to claim 7, wherein the second detected section of the second characteristic-changing member and at least one end section in the axial direction of the first detected section of the first characteristic-changing member are arranged on the outer-diameter side of the distal end of the second rotating shaft or another component that is fastened around the outside of that distal end in a position that overlaps in the radial direction the distal end of the second rotating shaft or the other component.

* * * * *